(12) United States Patent
Abe et al.

(10) Patent No.: US 8,113,976 B2
(45) Date of Patent: Feb. 14, 2012

(54) POWER PLANT

(75) Inventors: Noriyuki Abe, Saitama-ken (JP);
Shigemitsu Akutsu, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 436 days.

(21) Appl. No.: 12/310,369

(22) PCT Filed: Oct. 25, 2007

(86) PCT No.: PCT/JP2007/070788
§ 371 (c)(1),
(2), (4) Date: Feb. 23, 2009

(87) PCT Pub. No.: WO2008/050827
PCT Pub. Date: May 2, 2008

(65) Prior Publication Data
US 2009/0247341 A1 Oct. 1, 2009

(30) Foreign Application Priority Data

Oct. 25, 2006 (JP) .................................. 2006-290121
Oct. 23, 2007 (JP) .................................. 2007-275462

(51) Int. Cl.
*F16H 3/72* (2006.01)
*B60K 6/42* (2007.10)
*B60K 28/00* (2006.10)

(52) U.S. Cl. .......................... 475/5; 180/65.22; 180/285

(58) Field of Classification Search ............... 180/65.21, 180/65.22, 65.285; 475/5; 477/3; 310/102 R, 310/112, 113

See application file for complete search history.

(56) References Cited

U.S. PATENT DOCUMENTS
5,903,113 A * 5/1999 Yamada et al. .................. 318/10
(Continued)

FOREIGN PATENT DOCUMENTS
FR 2 834 248 A1 7/2003
(Continued)

OTHER PUBLICATIONS

European Search Report application No. 07830522.4 dated Apr. 29, 2010.

*Primary Examiner* — J. Allen Shriver, II
*Assistant Examiner* — James M Dolak
(74) *Attorney, Agent, or Firm* — Squire Sanders (US) LLP

(57) ABSTRACT

To provide a power plant which is capable of improving the driving efficiency and electric power-generating efficiency thereof. A first transmission 20 is connected between the output shaft 3a of an internal combustion engine 3 and driven parts DW and DW, which are connected to each other. A generator-motor 30 includes a stator 32 for generating magnetic fields and first and second rotors 31 and 33, and carries out energy input and output between the stator 32 and the first and second rotors 31 and 33 during generation of rotating magnetic fields. Along with the energy input and output, the rotating magnetic fields and the first and second rotors 31 and 33 rotate while maintaining such a linear speed relationship that the difference between the rotational speed of the magnetic fields and that of the second rotor 33, and the difference between the rotational speed of the second rotor 33 and that of the first rotor 31 are equal to each other. One of the first and second rotors 31 and 33 is connected between the output shaft 3a of the engine 3 and the first transmission 20, and the other to the driven parts DW and DW.

9 Claims, 56 Drawing Sheets

U.S. PATENT DOCUMENTS

| | | | |
|---|---|---|---|
| 6,232,733 B1 * | 5/2001 | Obayashi et al. | 318/432 |
| 6,472,788 B1 * | 10/2002 | Nakano | 310/114 |
| 6,710,492 B2 * | 3/2004 | Minagawa | 310/113 |
| RE38,790 E * | 9/2005 | Maeda et al. | 290/40 C |
| 7,117,965 B2 * | 10/2006 | Yatabe et al. | 180/65.235 |
| 7,219,757 B2 * | 5/2007 | Tomita et al. | 180/65.275 |
| 7,291,080 B2 * | 11/2007 | Minagawa et al. | 475/5 |
| 2004/0084234 A1 | 5/2004 | Yatabe et al. | |
| 2004/0124021 A1 | 7/2004 | Shirai et al. | |
| 2005/0140230 A1 * | 6/2005 | Johnson et al. | 310/112 |

FOREIGN PATENT DOCUMENTS

| | | |
|---|---|---|
| JP | 08-111963 | 4/1996 |
| JP | 10-248205 | 9/1998 |
| JP | 10-248205 A | 9/1998 |
| JP | 2001-095186 | 4/2001 |
| JP | 2004-159412 | 6/2004 |
| JP | 2004-175320 | 6/2004 |

* cited by examiner

F I G. 4
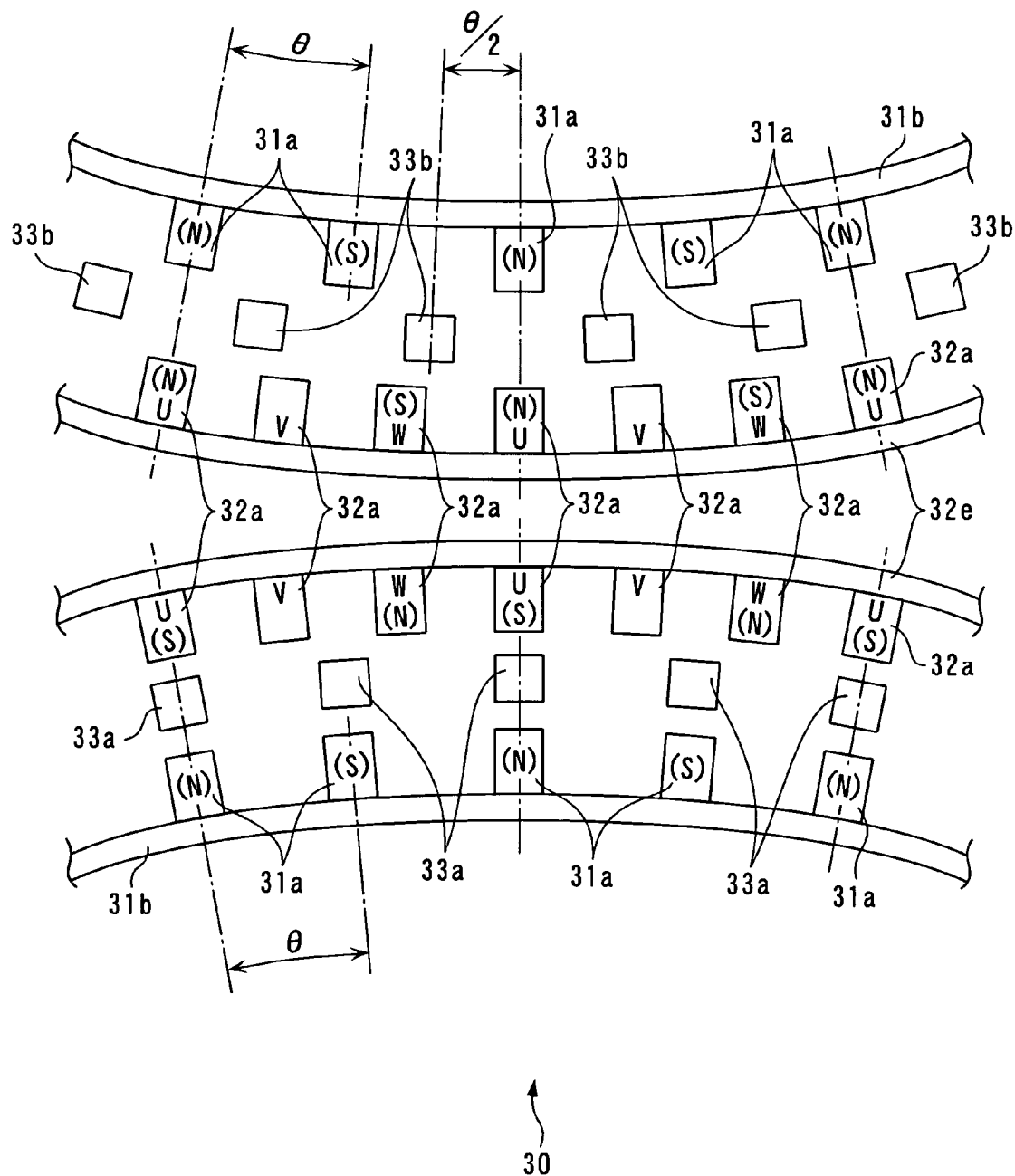

FIG. 8
(a)
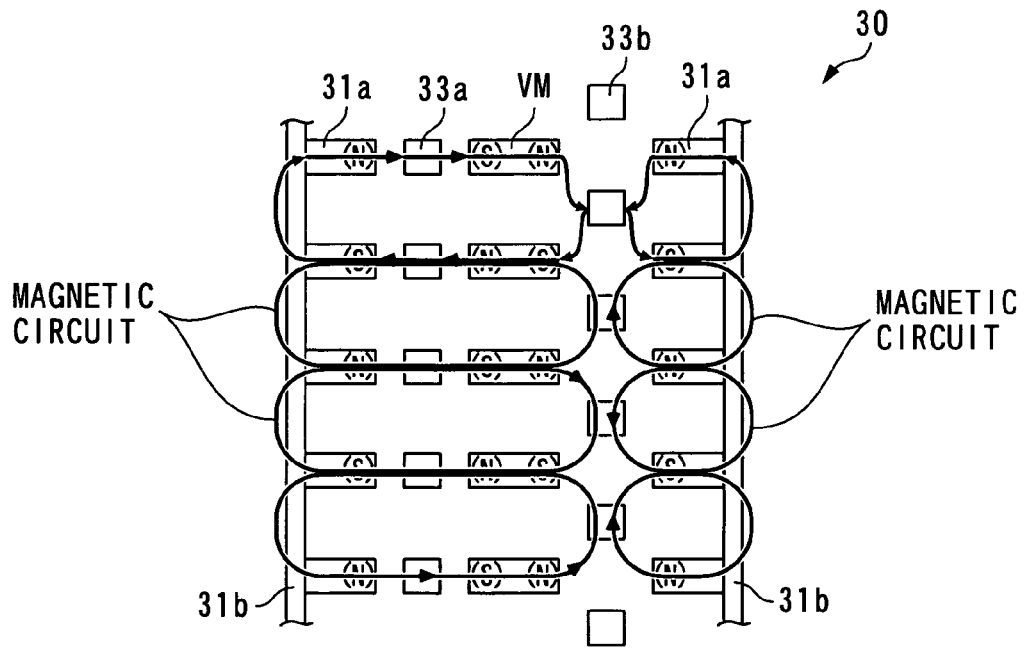
(b)
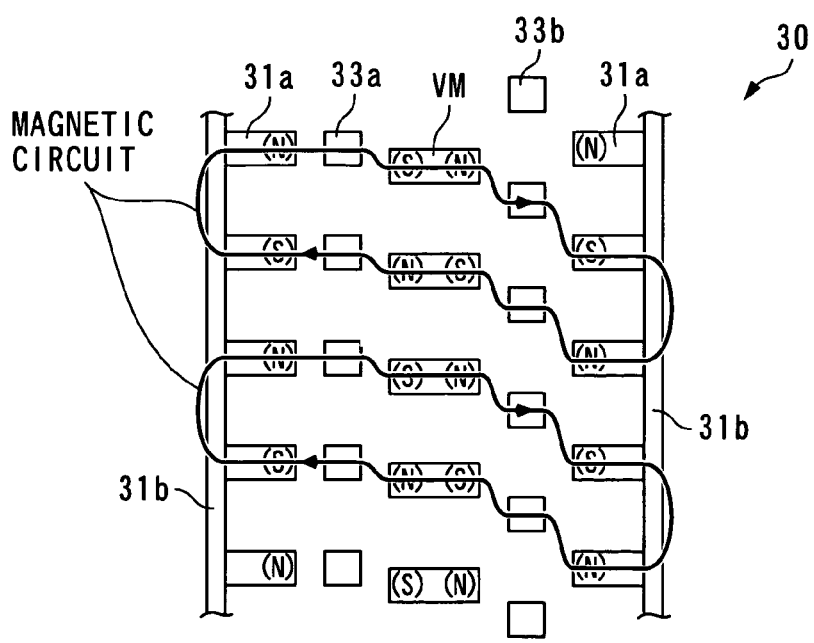

FIG. 10
(a)
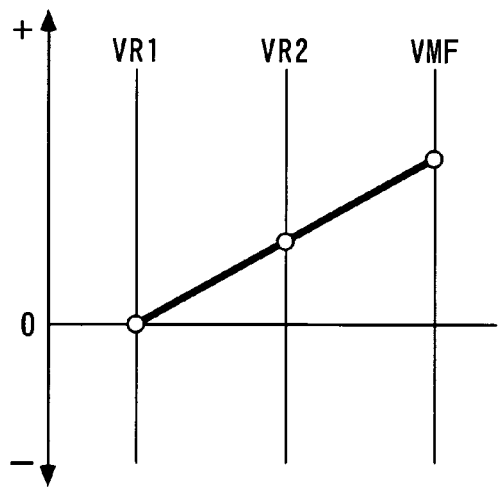
(b)
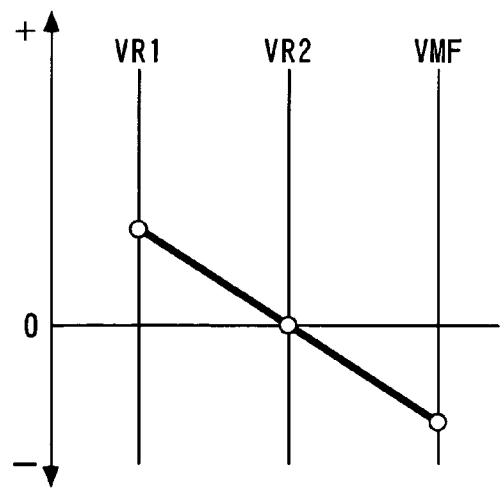
(c)
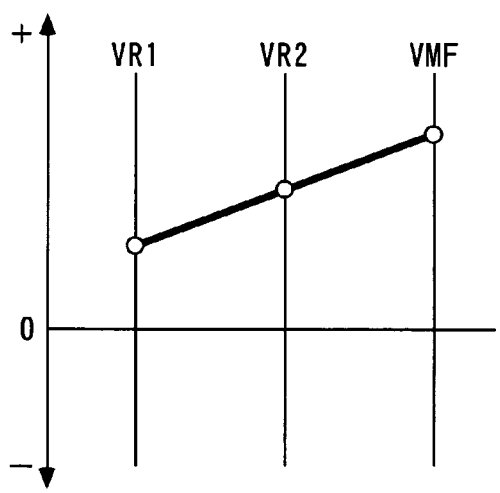
(d)
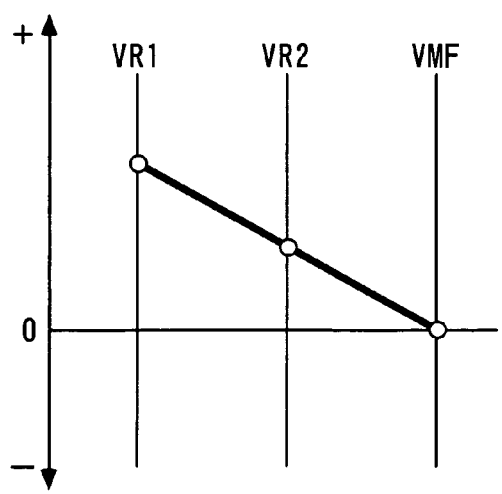

FIG. 12
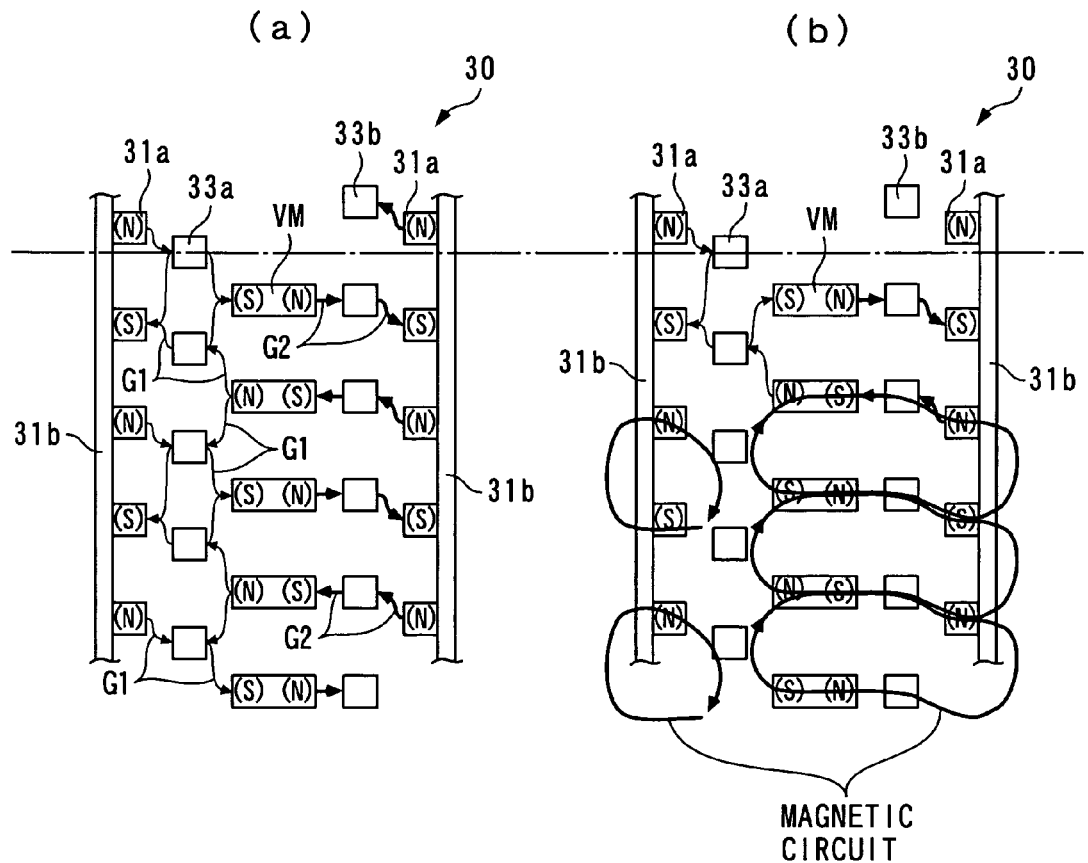
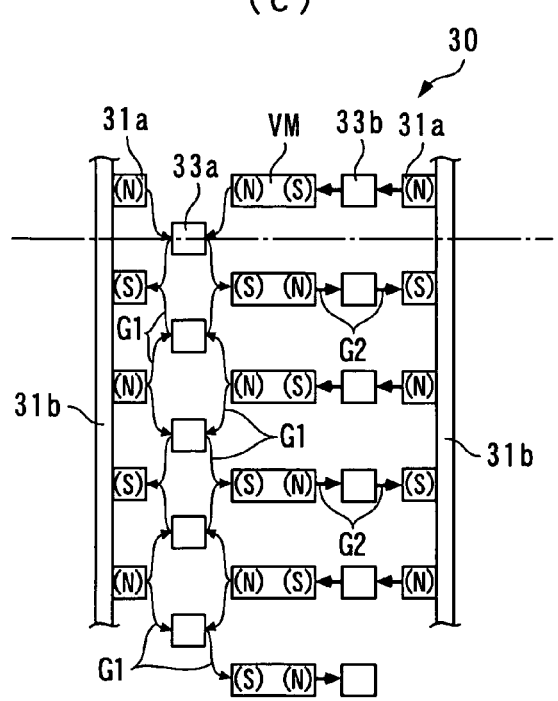

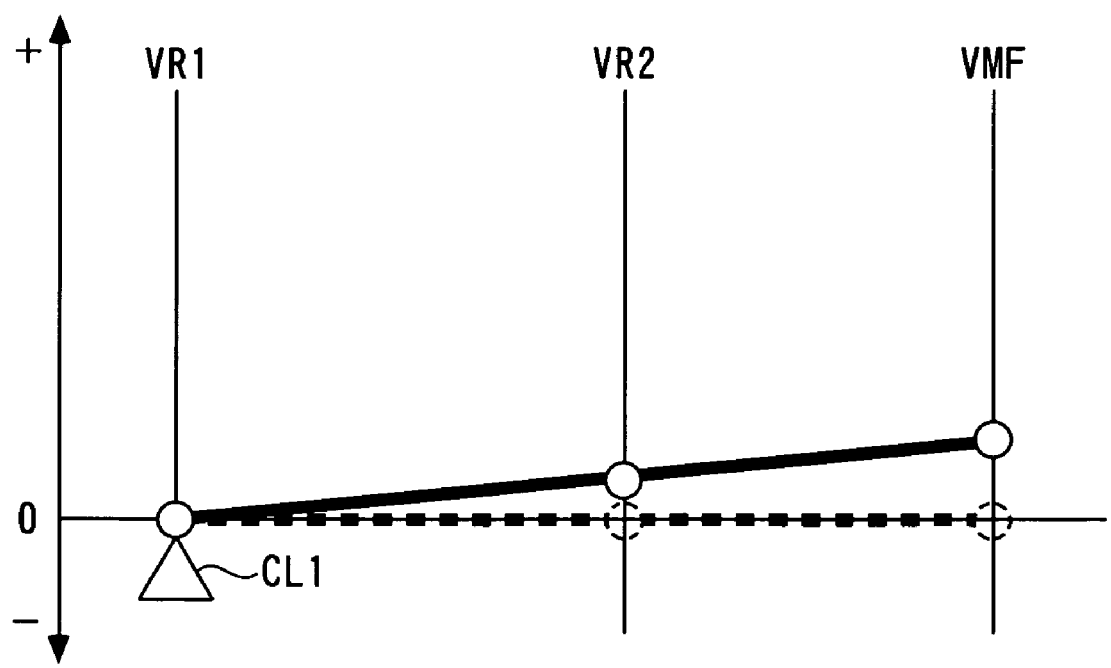
F I G. 1 4

FIG. 16
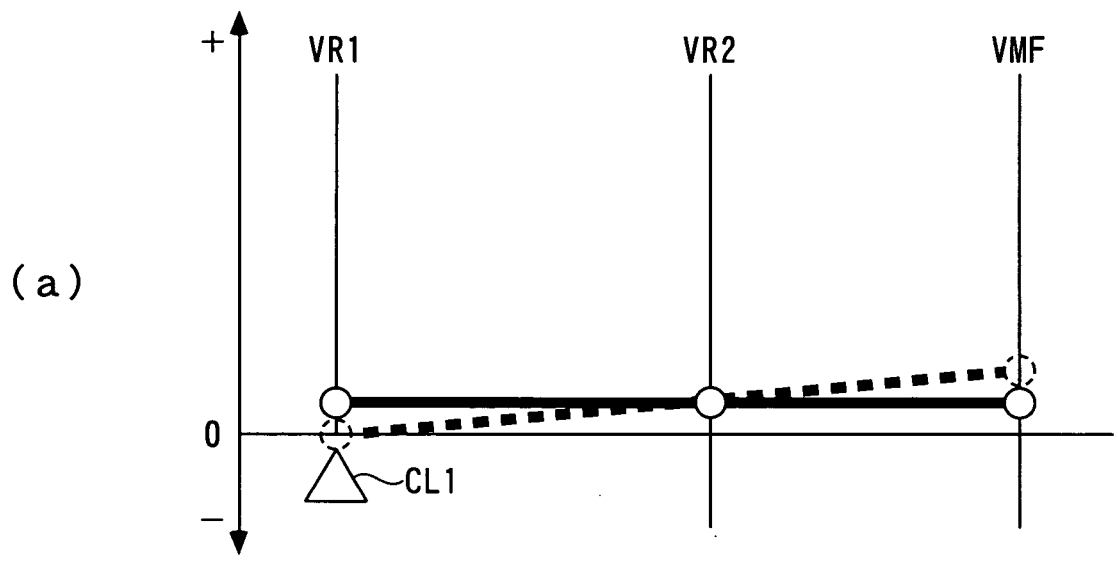
(a)
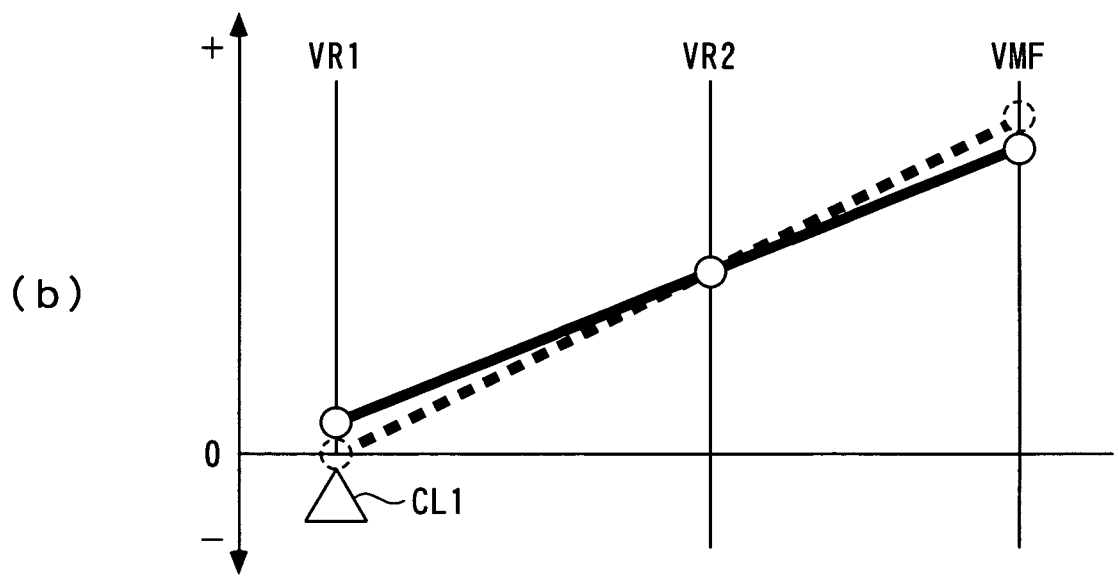
(b)

POWER PLANT

BACKGROUND OF THE INVENTION

1. Field of the Invention

The present invention relates to a power plant for driving a driven part, and more particularly to a power plant including an internal combustion engine and a generator-motor as power sources.

2. Description of the Related Art

Conventionally, as the power plant of this kind, one disclosed in Patent Literature 1 is known. This power plant is for driving drive wheels of a vehicle, and is equipped with an internal combustion engine and a generator-motor as power sources, and a stepless transmission and a planetary gear unit for transmitting power to the drive wheels. The planetary gear unit is a general single pinion type that has a sun gear, a ring gear, and a carrier, and the sun gear and the ring gear are connected to the drive wheels via a high clutch and a low clutch, respectively. The engine is connected to the carrier via a main shaft, and the main shaft is connected to an input pulley of the stepless transmission. Further, the generator-motor, the output pulley of the stepless transmission, and the sun gear are connected to each other via an auxiliary shaft.

The power plant configured as above has operation modes one of which is a torque circulation mode mainly used during low-speed traveling. In the torque circulation mode, the aforementioned high clutch is disengaged to thereby disconnect between the sun gear and the drive wheels, and the low clutch is engaged to connect between the ring gear and the drive wheels. This causes the torque of the engine to be transmitted to the carrier via the main shaft, and the torque of the generator-motor to be transmitted to the carrier via the auxiliary shaft, the stepless transmission, and the main shaft. Further, the torque transmitted to the carrier is distributed between the ring gear and the sun gear, and torque distributed to the ring gear is transmitted to the drive wheels. On the other hand, torque distributed to the sun gear is transmitted to the auxiliary shaft, and after being combined with the torque of the generator-motor, it is transmitted to the main shaft via the stepless transmission, and further after being combined with the torque of the engine, it is transmitted to the carrier. As described above, in the torque circulation mode, the power from the engine and that of the generator-motor are transmitted to the drive wheels while circulating through the stepless transmission and the planetary gear unit.

As described above, in the conventional power plant, since during operation in the torque circulation mode, the transmission of power from the engine and the generator-motor to the drive wheels is carried out necessarily via the planetary gear unit, and hence due to power transmission loss caused by mechanical mating of teeth of gears at the planetary gear unit, the driving efficiency of the power plant is reduced. Further, the power from the generator-motor is necessarily transmitted via the stepless transmission in addition to the planetary gear unit, and hence the driving efficiency of the power plant is further reduced due to power transmission loss at the stepless transmission.

Further, during the operation in the torque circulation mode, also when electric power is generated by the generator-motor using the power from the drive wheels, the transmission of power from the drive wheels to the generator-motor is performed necessarily via the planetary gear unit and the stepless transmission, and hence it is impossible to obtain a sufficient electric power-generating efficiency due to power transmission losses at the planetary gear unit and the stepless transmission. Further, during the operation in the torque circulation mode, when electric power is generated by the generator-motor using the power from the engine, the electric power generation is performed using power distributed to the sun gear via the carrier. Thus, the transmission of power from the engine to the generator-motor is performed necessarily via the planetary gear unit, and hence in this case as well, it is impossible to obtain a sufficient electric power-generating efficiency due to power transmission losses at the planetary gear unit.

Further, due to the use of the planetary gear unit, which is a complicated mechanism in which a plurality of gears and shafts are combined, the construction of the power plant is very complicated. Further, due to the backlash between teeth of gears of the planetary gear unit, it is impossible to control the rotational speed of the drive wheels in a fine-grained manner.

The present invention has been made to provide a solution to the above-described problems, and an object thereof is to provide a power plant which is capable of improving the driving efficiency and the electric power-generating efficiency thereof.

[Patent Literature 1]

Japanese Laid-Open Patent Publication (Kokai) No. 2004-175320.

SUMMARY OF THE INVENTION

To attain the object, one embodiment provides a power plant 1, 1A to 1C, 1G to 1J for driving a, driven part (drive wheels DW and DW in the embodiment (the same applies hereinafter in this section)), comprising an internal combustion engine 3 having an output shaft (crankshaft 3a), the output shaft being connected to the driven part, a first transmission (stepless transmission 20) connected between the output shaft of the engine 3 and the driven part, for changing speed of power from the engine 3 and transmitting the power to the driven part, and a generator-motor 30 including an immovable stator 32 for generating a rotating magnetic field, a first rotor 31 provided in a manner opposed to the stator 32 and formed of a magnet, and a second rotor 33 disposed between the stator 32 and the first rotor 31 and formed of a soft magnetic material, for inputting and outputting energy between the stator 32 and the first rotor 31 and the second rotor 33 via a magnetic circuit formed according to generation of the rotating magnetic field, the rotating magnetic field and the first and second rotors 31 and 33 rotating along with the input and output of the energy while holding such a linear speed relationship in which a difference between a rotational speed of the rotating magnetic field and a rotational speed of the second rotor 33, and a difference between a rotational speed of the second rotor 33 and a rotational speed of the first rotor 31 become equal to each other, wherein one of the first and second rotors 31 and 33 of the generator-motor 30 is connected between the output shaft of the engine 3 and the first transmission, and the other thereof is connected to the driven part.

According to the power plan, the output shaft of the engine is connected to the drive part via the first transmission, and one of the first and second rotors of the generator-motor (hereinafter referred to as "one rotor") is connected between the output shaft of the engine and the first transmission, and the other of the first and second rotors (hereinafter referred to as "the other rotor") is connected to the driven part. Therefore, the speed of the power from the engine transmitted to the driven part is changed by the first transmission. Further, the generator-motor carries out energy input and output between the stator and the first and second rotors via a magnetic circuit formed by generation of the rotating magnetic field of the stator. Along with the energy input and output, the rotating magnetic field and the first and second rotors rotate while maintaining such a linear speed relationship in which the difference between the rotational speed of the magnetic fields and that of the second rotor, and the difference between the rotational speed of the second rotor and that of the first rotor are equal to each other.

The linear speed relationship between the three of the rotating magnetic field and the first and second rotors corresponds to the speed relationship between one and the other of the sun gear and ring gear of the planetary gear unit, and the carrier supporting the planetary gears (hereinafter, these are referred to as "the three elements"). Therefore, the relationship in the input and output of energy between the stator and the first and second rotors is the same as that between the three elements of the planetary gear unit.

As described above, the engine is connected to the driven part via the one rotor and the first transmission and hence it is possible to completely avoid power transmission loss at the planetary gear unit which is caused in the case of the conventional power plant in which the engine is connected to the driven part via the planetary gear unit, and thereby improve the driving efficiency of the engine for driving the driven part. Further, since the engine is connected to the driven part via the one rotor and the first transmission (hereinafter these elements are referred to as the "the first path"), and further during generation of the rotating magnetic field, the engine is connected to the driven part via the one rotor, the magnetic circuit, and the other rotor (hereinafter, these elements are referred to as "the second path"). In this second path, the power transmission is performed in a contactless manner by input and output of energy between the first and second rotors via the magnetic circuit, and hence the power transmission efficiency is high. Thus, as the path for connecting the engine and the driven part, the power plant has, in addition to the first path including the first transmission, the second path which does not include the first transmission and is high in power transmission efficiency. Therefore, in the second path, the connection between the engine and the driven part is established without using the transmission, whereby compared with the case in which power is transmitted from the engine to the driven part necessarily via the transmission, it is possible to suppress power transmission loss at the transmission. Further, the power plant has the first and second paths which are parallel to each other, depending on the operating state of the driven part, it is possible to select the optimum one of the first and second paths, and set the ratio of energy transmitted to the driven part via the first and second paths such that the optimum efficiency is obtained.

Further, the one rotor and the other rotor can be connected to the driven part without using the planetary gear unit, whereby differently from the conventional power plant in which the connection is established via the planetary gear unit, there is no power transmission loss occurring at the planetary gear unit, and hence it is possible to increase both the driving efficiency of the generator-motor in driving the driven part and the electric power-generating efficiency of the generator-motor in generating electric power using the power of the driven part. Further, for example, the other rotor is connected to the driven part without using the transmission, and the power transmission between the generator-motor and the driven part is performed via the other rotor connected to the driven part in such a manner, whereby compared with the conventional case of the power transmission being necessarily performed via the transmission, it is possible to suppress power transmission loss at the transmission. This makes it possible to further increase the driving efficiency and the electric power-generating efficiency mentioned above. Further, during the driving of the driven part by the engine, when the electric power generation is performed by the generator-motor using part of the power from the engine, differently from the conventional cases using the planetary gear unit, it is possible to increase the electric power-generating efficiency without causing the power transmission loss at the planetary gear unit.

Further, compared with the conventional cases using the planetary gear unit, it is possible to simplify the construction, and accurately control the speed of the driven part without being affected by the backlash between teeth of the gears.

One embodiment includes the power plant 1, 1A to 1C, 1G to 1J, wherein the first transmission is formed by a stepless transmission 20 that is capable of steplessly changing a transmission ratio.

As described hereinabove, in the generator-motor according to the present invention, the stator and the first and second rotors rotate while maintaining a linear speed relationship during the input and output of energy caused by occurrence of the rotating magnetic field. Therefore, as the ratio between the rotational speed of the first rotor and that of the second rotor changes, the ratio between the rotational speed of the second rotor and that of the rotating magnetic field also changes.

Further, the one rotor is connected to the driven part via the first transmission and the other rotor is connected to the driven part. Therefore, as the transmission ratio of the first transmission changes, the ratio between the rotational speed of the one rotor and that of the other rotor changes and at the same time, the ratio between the rotational speed of the other rotor and that of the rotating magnetic field also changes based on the relationship between the speed relationship between the rotating magnetic filed and the first and second rotors. Further, the rotational speeds of one and the other of the rotors correspond to the rotational speed of the engine and that of the driven part. From the above, by changing the transmission ratio of the first transmission, it is possible to change the ratio between the rotational speed of the driven part and that of the engine, and at the same time the rotational speed of the driven part and that of the rotating magnetic field as well.

According to the present invention, since the stepless transmission is used as the first transmission, it is possible to steplessly control the ratio of the rotational speed of the engine to that of the driven part and the ratio of the rotational speed of the rotating magnetic field to that of the driven part, as desired, whereby it is possible to drive the driven part while controlling the outputs from the engine and the generator-motor such that excellent efficiencies of the engine and the generator-motor can be obtained. Therefore, it is possible to increase the driving efficiency of the power plant in its entirety.

One embodiment includes the power plant 1B, 1I, further comprising a second transmission (transmission 70) connected between the other of the first and second rotors 31 and 33 and the driven part, for changing speed of power from the other and transmitting the power to the driven part.

With this arrangement, the other rotor of the generator-motor is connected to the driven part via the second transmission. Therefore, for example, when load on the driven part is very large, the transmission ratio of the second transmission is controlled to be reduced, whereby it is possible to increase torque transmitted from the other rotor to the driven part. This makes it possible to reduce the size of the other rotor, which in turn makes it possible to reduce the size and costs of the generator-motor. Further, for example, when the speed of the driven part is very high, the transmission ratio of the second transmission is controlled to be increased, whereby it is possible to lower the rotational speed of the other rotor with respect to the speed of the driven part. This makes it possible to prevent failure of the generator-motor due to the rotational speed of the other rotor becoming too high. In a case where the other rotor is the first rotor formed of a magnet, this arrangement is particularly effective since the strength of the magnet is lower than that of the soft magnetic material so that the above inconvenience is liable to occur. Further, by controlling the transmission ratio of the second transmission, the rotational speed of the other rotor can be properly controlled with respect to the speed of the driven part, thereby making it possible to enhance the driving efficiency of the generator-motor in driving the driven part and the electric power-generating efficiency thereof.

One embodiment includes the power plant 1C, 1J, further comprising a third transmission (transmission 80) connected between the output shaft of the engine 3 and the one of the first and second rotors 31 and 33, for changing speed of power from the engine 3 and transmitting the power to the one.

With this arrangement, the one rotor of the generator-motor is connected to the engine via the third transmission. Therefore, for example, when the rotational speed of the engine is very high, the transmission ratio of the third transmission is controlled to be reduced, whereby it is possible to lower the rotational speed of the one rotor with respect to the rotational speed of the engine. This makes it possible to prevent failure of the generator-motor due to the rotational speed of the one rotor becoming too high. If the one rotor is the first rotor formed of a magnet, the above inconvenience is liable to occur, and hence this arrangement is particularly effective since.

One embodiment includes the power plant 1, 1A to 1C, 1G to 1J, further comprising a first clutch (clutch CL3) for connecting and disconnecting between the one of the first and second rotors 31 and 33 and the driven part.

With this arrangement, the connection between the one rotor connected between the engine and the first transmission and the driven part is interrupted by the first clutch, whereby the power transmission between the generator-motor and the driven part can be carried out only via the other rotor. Therefore, when the other rotor is connected to the driven part without using the transmission, it is possible to completely prevent power transmission loss at the transmission, and further increase the driving efficiency and the electric power-generating efficiency of the generator-motor.

Further, as described above, the relationship in the input and output of energy between the stator and the first and second rotors is the same as that between the three elements of the planetary gear unit. Therefore, by causing the first clutch to interrupt the connection between the one rotor and the driven part, and controlling the rotating magnetic field generated by the stator, it is possible to progressively increase torque transmitted from the engine to the driven part via one and the other of the rotors. Therefore, even when the friction of the driven part is very large, the driven part at rest can be driven without causing engine stall, and hence it is possible to establish the connection between the engine and the driven part without using a friction start clutch. Such a friction start clutch requires a large amount of energy for operation thereof, and if the power from the engine is converted into oil pressure or the like for use as a drive source of the friction start clutch, the fuel economy of the engine is degraded. Therefore, according to the present invention, compared with such a case, it is possible to enhance the fuel economy of the engine.

One embodiment includes the power plant 1, 1A to 1C, 1G to 1J, further comprising a brake mechanism (one-way clutch CL1, casing CA) for limiting or inhibiting rotation of the one of the first and second rotors 31 and 33 such that the output shaft of the engine 3 does not rotate in a reverse direction.

With this arrangement, the brake mechanism limits or inhibits rotation of the one rotor such that the output shaft of the engine does not rotate in the reverse direction. Thus, the rotation of the one rotor corresponding to one of the three elements of the planetary gear unit is limited or inhibited by the brake mechanism and further the connection between the one rotor and the driven part is interrupted by the aforementioned first clutch, whereby the aforementioned electric power-converted power from the stator is transmitted to the other rotor corresponding to another of the three elements of the planetary gear unit, and then further to the driven part. Therefore, it is possible to properly drive the driven part by the power from the generator-motor while limiting or inhibiting the reverse rotation of the output shaft of the engine connected to the one rotor.

One embodiment includes the power plant 1, 1A to 1C, 1G and 1J, further comprising a rotor lock mechanism (electromagnetic brake CL2, clutch CL4, electromagnetic brake CL5) for holding the other of the first and second rotors 31 and 33 unrotatable.

With this arrangement, it is possible to transmit the electric power-converted power to the one rotor corresponding to one of the three elements of the planetary gear unit without driving the driven part, by holding the other rotor corresponding to another of the three elements of the planetary gear unit unrotatable by the lock mechanism. Further, while the one rotor is connected to the other rotor held unrotatable, via the driven part, the output shaft of the engine can be rotated by the electric power-converted power transmitted to the one rotor as described above, by causing the first clutch to disconnect between the one rotor and the driven part. Further, in this case, by controlling the direction of rotation of the rotating magnetic field generated by the stator, it is possible to rotate the output shaft of the engine in the normal direction. As described above, it is possible to rotate the output shaft of the engine in the normal direction without driving the driven part, which in turn makes it possible to start the engine.

One embodiment includes the power plant 1A to 1C, 1H to 1J, further comprising a normal/reverse rotation-switching mechanism 60 connected between the other of the first and second rotors 31 and 33 and the driven part, for selectively switching a direction of rotation of the driven part rotated by power transmitted from the other to one of a direction of normal rotation and a direction of reverse rotation.

With this arrangement, the connection between the one rotor and the driven part is established and interrupted by the first clutch. The other rotor is connected to the driven part via the normal/reverse rotation-switching mechanism. Therefore, when the driven part is driven using power from the other rotor, it is possible to selectively cause the normal and reverse rotations of the driven part. Specifically, the connection between the one rotor and the driven part is interrupted by the first clutch, while the power from the other rotor is transmitted to the driven part via the normal/reverse rotation-switching mechanism. Further, the direction of rotation of the driven part is switched by the normal/reverse rotation-switching mechanism, whereby it is possible to selectively cause the normal rotation and reverse rotation of the driven part. Further, even when the friction of the driven part is large, it is possible to transmit the power from the engine to the driven part via one and the other of the rotors without using the friction start clutch, to cause the driven part at rest to rotate in the normal or reverse rotation without causing engine stall.

One embodiment includes the power plant 1A to 1C, 1H to 1J, wherein the normal/reverse rotation-switching mechanism 60 comprises a planetary gear unit PS including a sun gear S, a ring gear R, and a carrier C for rotatably supporting planetary gears P in mesh with the sun gear S and the ring gear R, one of the sun gear S and the ring gear R being connected to the other of the first and second rotors 31 and 33, and the other of the sun gear S and the ring gear R being connected to the driven part, a second clutch (clutch CL4) for connecting and disconnecting between the one of the sun gear S and the ring gear R and the carrier C, and a carrier lock mechanism (electromagnetic brake CL5) for holding the carrier C unrotatable.

With this arrangement, one of the sun gear and the ring gear (hereinafter referred to as "the one gear") of the planetary gear unit is connected to the other rotor, and the other of the sun gear and the ring gear (hereinafter referred to as "the other gear") of the planetary gear unit is connected to the driven part. Further, the second clutch connects or disconnects between the one gear and the carrier, and the carrier is held unrotatable by the carrier lock mechanism. Therefore, when the power from the other rotor is transmitted to the driven part via the normal/reverse rotation-switching mechanism, the one gear and the carrier are connected by the second clutch, and the rotation of the carrier is permitted by the carrier lock mechanism, whereby the one gear, the carrier, and the other gear rotate in unison in the same direction. Therefore, in this case, by connecting the elements such that the driven part rotates normally or reversely, it is possible to cause the driven part to rotate normally or reversely. Further, the one gear, the carrier, and the other gear rotate in unison as described above, and hence it is possible to transmit the power from the other rotor to the driven part without causing power transmission loss at the planetary gear unit due to meshing of the gears.

Further, the second clutch disconnects between the one gear and the carrier, and the carrier lock mechanism holds the carrier unrotatable, whereby the power from the other rotor is transmitted to the driven part via the one gear, the planetary gears, and the other gear. In doing this, since the carrier is held unrotatable as described above, the other gear rotates in a direction reverse to the direction of rotation of the one gear. As a consequence, as described heretofore, when the one gear, the carrier, and the other gear rotate in unison in the same direction, if the elements are connected such that the driven part rotates normally or reversely, the other gear rotates in a direction reverse to the direction of rotation of the one gear as described above, whereby it is possible to cause the driven part to rotate normally or reversely. As described hereinabove, the normal/reverse rotation-switching mechanism can be formed relatively simply by combining the planetary gear unit, the second clutch, and the carrier lock mechanism.

One embodiment includes the power plant 1, 1A to 1C, wherein the first rotor 31 is connected between the output shaft of the engine 3 and the first transmission, and the second rotor 33 is connected to the driven part.

As described hereinbefore, the relationship in the input and output of energy between the stator and the first and second rotors is the same as that between one and the other of the sun gear and ring gear of the planetary gear unit, and the carrier. Therefore, according to the present invention, when the engine is assisted by the generator-motor, the torque of the engine and that of the generator-motor are transmitted to the driven part in the following manner:

When the electric power is supplied to the stator, the rotating magnetic field is generated by the stator, and the supplied electric power is converted into mechanical power (hereinafter, this mechanical power is hereinafter referred to as "electric power-converted power"), and is transmitted to the second rotor via the magnetic circuit. Accordingly, part of the torque of the engine transmitted to the first transmission is extracted (hereinafter this extracted torque is referred to as "the extracted torque) such that the extracted torque is balanced with the torque transmitted to the second rotor by this supply of electric power (hereinafter referred to as "the driving equivalent torque"), and is transmitted to the second rotor via the first rotor and the magnetic circuit. Thus, the combined torque formed by combining the driving equivalent torque and the extracted torque is transmitted to the second rotor, and the combined torque is transmitted to the driven part. Further, in addition to the combined torque, remaining torque formed by subtracting the extracted torque from the torque of the engine is also transmitted to the driven part. As a consequence, torque equal in magnitude to the sum of the torque of the engine and the driving equivalent torque is transmitted to the driven part.

As described above, during assist by the generator-motor, power corresponding to the extracted torque can be transmitted to the driven part without via the first transmission, and hence it is possible to suppress power transmission loss at the first transmission. Therefore, when the second rotor is connected to the driven part without using the transmission, it is possible to further increase the driving efficiency of the power plant in its entirety. Further, it is possible to reduce the torque transmitted to the first transmission, by the torque corresponding to the extracted torque, and hence, by employing a transmission adapted to the reduced transmission torque as the first transmission, it is possible to attain the high efficiency and reduced size of the first transmission, which in turn makes it possible to attain further improvement of the driving efficiency of the power plant in its entirety, and the reduction of the size thereof.

To attain the above object, one embodiment provides a power plant 1D to 1F, 1K to 1M for driving a driven part (drive wheels DW and DW in the embodiment (the same applies hereinafter in this section)), comprising an internal combustion engine 3 having an output shaft (crankshaft 3a), a generator-motor 30 including an immovable stator 32 for generating a rotating magnetic field, a first rotor 31 provided in a manner opposed to the stator 32 and formed of a magnet, and a second rotor 33 disposed between the stator 32 and the first rotor 31 and formed of a soft magnetic material, for inputting and outputting energy between the stator 32 and the first rotor 31 and the second rotor 33 via a magnetic circuit formed according to generation of the rotating magnetic field, the rotating magnetic field and the first and second rotors 31 and 33 rotating along with the input and output of the energy while holding such a linear speed relationship in which a difference between a rotational speed of the rotating magnetic field and a rotational speed of the second rotor 33, and a difference between a rotational speed of the second rotor 33 and a rotational speed of the first rotor 31 become equal to each other, one of the first and second rotors 31 and 33 being connected to the output shaft of the engine 3, and connected to the driven part without using the transmission, the other of the first and second rotors 31 and 33 being connected to the driven part, and a first clutch (clutch CL3) for connecting and disconnecting between the one of the first and second rotors 31 and 33 and the driven part.

According to this power unit, the output shaft of the engine is connected to one of the first and second rotors of the generator-motor, that is, the one rotor. The one rotor is connected to the driven part without using the transmission.

Further, the other of the first and second rotors, that is, the other rotor is connected to the driven part. Furthermore, in this generator-motor, energy is input and output between the stator and the first and second rotors via the magnetic circuit formed by generation of the rotating magnetic field by the stator, and along with this energy input and output, the rotating magnetic field and the first and second rotors rotate while holding such a linear speed relationship in which the difference between the rotational speed of the rotating magnetic field and the rotational speed of the second rotor, and the difference between the rotational speed of the second rotor and the rotational speed of the first rotor become equal to each other. Therefore, the relationship in the input and output of energy between the stator and the first and second rotors is the same as that between the aforementioned three elements of the planetary gear unit.

As described above, since the engine is connected to the driven part via the one rotor, it is possible to completely avoid power transmission loss at the planetary gear unit which is caused in the case of the conventional power plant in which the engine is connected to the driven part via the planetary gear unit, and thereby improve the driving efficiency of the engine in driving the driven part. In this case, since the one rotor is connected to the driven part without using the transmission, the engine can be connected to the driven part completely without via the transmission, by connecting the engine to the one rotor without using the transmission. This makes it possible to transmit the power from the engine to the driven part without causing power transmission loss at the transmission, thereby making it possible to further enhance the driving efficiency of the engine in driving the driven part.

Further, according to the present invention, the speed of power transmitted e.g. from the engine to the driven part can be steplessly changed without using the transmission. Specifically, the connection between the one rotor and the driven part is interrupted by the first clutch, to thereby generate the rotating magnetic field by the generator-motor. This connects the output shaft of the engine to the driven part via the one rotor, the magnetic circuit, and the other rotor. Further, by controlling the rotational speed of the rotating magnetic field, the rotational speed of the other rotor to which the driven part is connected can be steplessly controlled as desired with respect to the rotational speed of the one rotor to which the engine is connected, and therefore it is possible to steplessly change the speed of the power transmitted from the engine to the driven part.

Further, for example, the one rotor and the other rotor can be connected to the driven part without via the planetary gear unit, whereby differently from the case of the conventional power plant in which the rotors are connected to the driven part via the planetary gear unit, it is possible to prevent power transmission loss from being caused at the planetary gear unit. This makes it possible to enhance both the driving efficiency of the generator-motor in driving the driven part and the electric power-generating efficiency of the generator-motor in electric power generation using the power of the driven part. Furthermore, for example, by connecting the other rotor to the driven part without using the transmission, differently from the conventional case of the power transmission being necessarily performed via the transmission, it is possible to perform power transmission between the generator-motor and the driven part without causing power transmission loss at the transmission. This makes it possible to further enhance the above-mentioned driving efficiency and electric power-generating efficiency. Further, also when electric power generation is performed by the generator-motor using part of the power from the engine during driving of the driven part by the engine, differently from the conventional cases using the planetary gear unit, there is no power transmission loss caused at the planetary gear unit, which makes it possible to enhance the electric power-generating efficiency of the generator-motor.

Furthermore, compared with the conventional cases using the planetary gear unit, it is possible to simplify the construction of the power plant, and accurately control the speed of the driven part without being affected by the backlash between teeth of the gears.

Further, by interrupting the connection between the one rotor and the driven part using the first clutch, and controlling the rotating magnetic field generated by the stator, it is possible to progressively increase the power transmitted from the engine to the driven part via one and the other of the rotors. Therefore, even when the friction of the driven part is very large, it is possible to transmit the power from the engine to the driven part without using the friction start clutch, to thereby drive the driven part at rest without causing engine stall. In addition, compared with the case where the engine is used as the drive source of the friction start clutch, it is possible to improve the fuel economy of the engine.

As described above, according to an embodiment of the present invention, it is possible to obtain the same effects as obtained by the power plant incorporating the first transmission. Further, the one rotor is connected to the driven part without using the transmission, that is, the first transmission is omitted, which makes it possible to reduce the size and costs of the power plant by the size and costs of the omitted first transmission.

One embodiment includes the power plant 1E, 1L, further comprising a first transmission (transmission 70) connected between the other of the first and second rotors 31 and 33 and the driven part, for changing speed of power from the other and transmitting the power to the driven part.

With this arrangement, the other rotor of the generator-motor is connected to the driven part via the first transmission. Therefore, for example, by controlling the transmission ratio of the first transmission according to load on the driven part and the rotational speed thereof, it is possible to reduce the size and costs of the generator-motor and prevent failure of the generator-motor due to the rotational speed of the other rotor becoming too high. If the other rotor is the first rotor formed of a magnet, the above-mentioned inconvenience is liable to occur, and hence the arrangement is particularly effective. Further, by controlling the transmission ratio of the first transmission, it is possible to properly control the rotational speed of the other rotor with respect to the speed of the driven part, thereby making it possible to enhance the driving efficiency and electric power-generating efficiency of the generator-motor.

One embodiment includes the power plant 1F, 1M, further comprising a second transmission (transmission 80) connected between the output shaft of the engine 3 and the one of the first and second rotors 31 and 33, for changing speed of power from the engine 3 and transmitting the power to the one.

With this arrangement, the one rotor of the generator-motor is connected to the engine via the second transmission. Therefore, for example, by controlling the transmission ratio of the second transmission such that it is reduced when the rotational speed of the engine is very high, the rotational speed of the one rotor can be lowered with respect to the rotational speed of the engine. This makes it possible to prevent failure of the generator-motor due to the rotational speed of the one rotor becoming too high. If the one rotor is the first rotor formed of a magnet, the above-mentioned inconvenience is liable to occur, and hence the arrangement is particularly effective.

One embodiment includes the power plant 1D to 1F, 1K to 1M, further comprising a brake mechanism (one-way clutch CL1, casing CA) for limiting or inhibiting rotation of the one of the first and second rotors 31 and 33 such that the output shaft of the engine 3 does not rotate in a reverse direction.

With this arrangement, the brake mechanism limits or inhibits the rotation of the one rotor such that the output shaft of the engine does not rotate in a reverse direction. Thus, by limiting or inhibiting the rotation of the one rotor using the brake mechanism, and further interrupting the connection between the one rotor and the driven part using the first clutch, the aforementioned electric power-converted power from the stator can be transmitted to the other rotor, and further to the driven part. This makes it possible to properly drive the driven part by the power from the generator-motor while limiting or inhibiting the reverse rotation of the output shaft of the engine.

One embodiment includes the power plant 1D to 1F, 1K to 1M, further comprising a rotor lock mechanism (clutch CL4, electromagnetic brake CL5) for holding the other of the first and second rotors 31 and 33 unrotatable.

With this arrangement, by holding the other rotor unrotatable by the rotor lock mechanism, interrupting the connection between the one rotor and the driven part, using the first clutch, and controlling the direction of rotation of the rotating magnetic field generated by the stator, it is possible to cause the output shaft of the engine to rotate in the normal direction without driving the driven part, which in turn makes it possible to start the engine.

One embodiment includes the power plant 1D to 1F, 1K to 1M, further comprising a normal/reverse rotation-switching mechanism 60 connected between the other of the first and second rotors 31 and 33 and the driven part, for selectively switching a direction of rotation of the driven part rotated by power transmitted from the other to one of a direction of normal rotation and a direction of reverse rotation.

With this arrangement, the connection between the one rotor and the driven part is established and interrupted by the first clutch, and the other rotor is connected to the driven part via the normal/reverse rotation-switching mechanism. Therefore, by disconnecting between the one rotor and the driven part by the first clutch, and transmitting power from the other rotor to the driven part via the normal/reverse rotation-switching mechanism, and further switching the direction of rotation of the driven part by the normal/reverse rotation-switching mechanism, it is possible to selectively rotate the driven part in the normal and reverse directions. Further, even when the friction of the driven part is large, it is possible to transmit the power from the engine to the driven part via one and the other of the rotors without using the friction start clutch, to cause the driven part at rest to rotate in the normal or reverse direction without causing engine stall.

One embodiment includes the power plant 1D to 1F, 1K to 1M, wherein the normal/reverse rotation-switching mechanism 60 comprises a planetary gear unit PS including a sun gear S, a ring gear R, and a carrier C for rotatably supporting planetary gears P in mesh with the sun gear S and the ring gear R, one of the sun gear S and the ring gear R being connected to the other of the first and second rotors 31 and 33, and the other of the sun gear S and the ring gear R being connected to the driven part, a second clutch (clutch CL4) for connecting and disconnecting between the one of the sun gear S and the ring gear R and the carrier C, and a carrier lock mechanism (electromagnetic brake CL5) for holding the carrier C unrotatable.

With this arrangement, it is possible to cause the driven part to rotate in the normal or reverse direction without causing power transmission loss in the planetary gear unit due to meshing of the gears. Further, it is possible to relatively simply form the normal/reverse rotation-switching mechanism by combining the planetary gear unit, the second clutch, and the carrier lock mechanism.

One embodiment includes the power plant 1D to 1F, wherein the first rotor 31 is connected to the output shaft of the engine 3, and connected to the driven part without using the transmission, the second rotor 33 being connected to the driven part.

With this arrangement, the first rotor corresponding to the sun gear or the ring gear of the planetary gear unit is connected to the engine. Therefore, in transmitting the power from the engine to the driven part via the first and second rotors, by interrupting the connection between the one rotor, i.e. the first rotor and the driven part using the above-described first clutch, and generating the rotating magnetic field, it is possible to cause the second rotor corresponding to the carrier of the planetary gear unit to combine both of torque from the stator and torque of the engine transmitted to the first rotor as positive torque, and transmit the combined torque to the driven part. This makes it possible to transmit larger torque to the driven part.

BRIEF DESCRIPTION OF THE DRAWINGS

[FIG. 4] A development view of part of a cross-section of the generator-motor taken on line A-A of FIG. 3 during generation of first and second rotating magnetic fields.

[FIG. 8] Diagrams each showing magnetic circuits formed when the generator-motor is in operation.

[FIG. 10] A diagram illustrating examples of speed diagrams representing the relationship between the magnetic field rotational speed VMF and the first and second rotor rotational speeds VR1 and VR2, in respective cases of (a) the first rotor being made unrotatable, (b), the second rotor being made unrotatable, (c) both the first and second rotors being rotating, and (d) the magnetic field rotational speed VMF being equal to 0.

[FIG. 12] Diagrams which are useful in explaining a continuation of the operation in FIG. 11.

[FIG. 14] A speed diagram showing an example of the magnetic field rotational speed VMF, and the first and second rotor rotational speeds VR1 and VR2 in the power plant shown in FIG. 1 at an EV standing start.

[FIG. 16] A speed diagram showing an example of the magnetic field rotational speed VMF, and the first and second rotor rotational speeds VR1 and VR2 in the power plant shown in FIG. 1 at the ENG start during the EV traveling, in respective cases of (a) the vehicle speed being relatively low, and (b) the vehicle speed being relatively high.

BEST MODE FOR CARRYING OUT THE INVENTION

Figure 1:
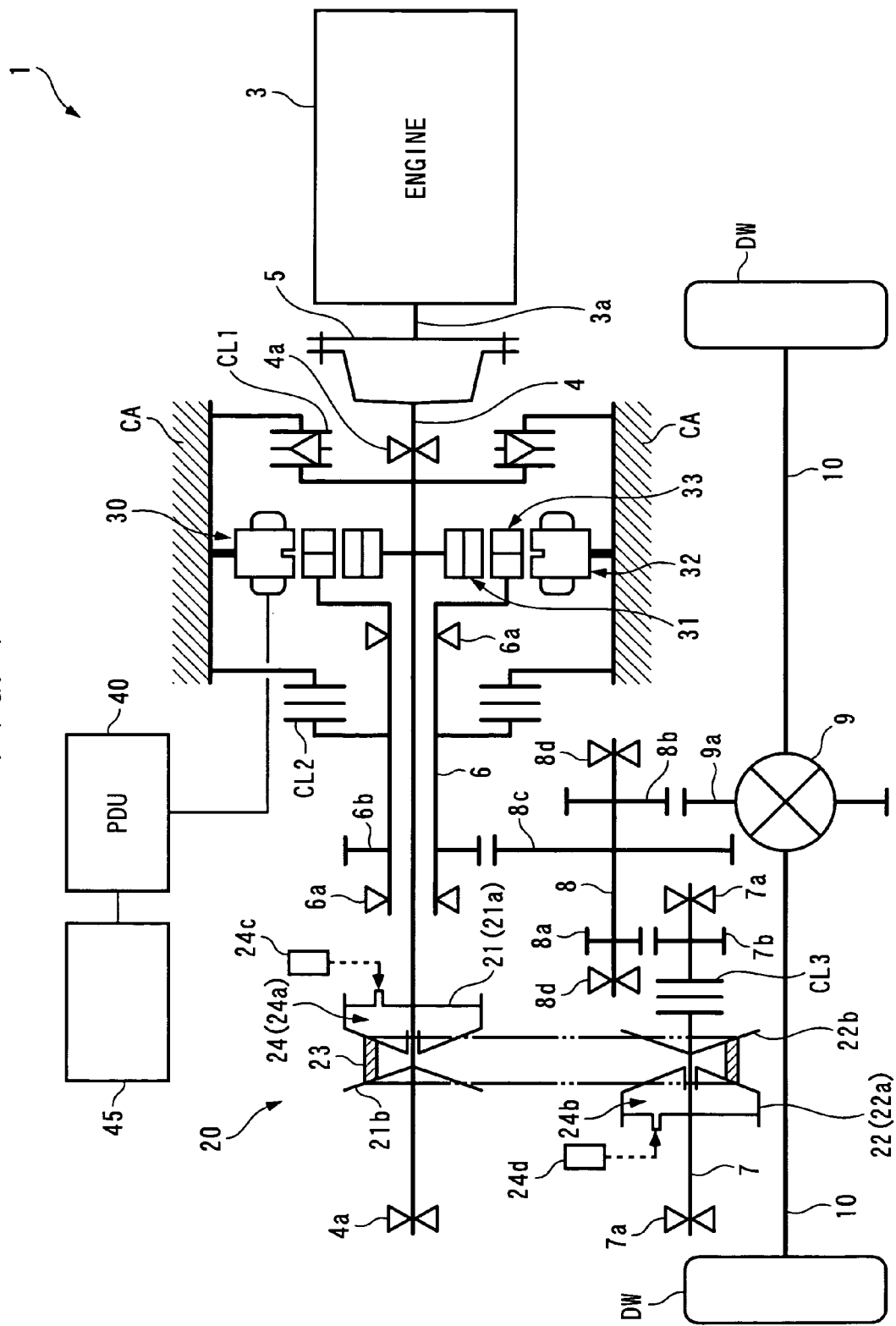
[FIG. 1] A schematic diagram of a power plant according to a first embodiment.

The present invention will now be described in detail with reference to the drawings showing a preferred embodiment thereof. It should be noted that in the figures, hatching for portions illustrating cross-sections are omitted for convenience. FIG. 1 schematically shows a power plant 1 according to a first embodiment of the present embodiment. The power plant 1 is for driving drive wheels DW and DW (driven parts) of a vehicle (not shown), and includes an internal combustion engine 3 and a generator-motor 30 as power sources, a stepless transmission 20 (first transmission) for transmitting a driving force to the drive wheels DW and DW, a differential gear mechanism 9, and drive shafts 10 and 10.

The internal combustion engine (hereinafter referred to as "the engine") 3 is e.g. a gasoline engine, and has a crankshaft 3a (output shaft) to which is connected a first main shaft 4 via a flywheel 5. The first main shaft 4 is supported by a bearing 4a such that it is rotatable concentrically with the crankshaft 3a. Further, the first main shaft 4 is provided with a one-way clutch CL1 (brake mechanism). The one-way clutch CL1 is configured such that it connects between the first main shaft 4 and a casing CA (brake mechanism) configured to be unrotatable, when such power as causes the crankshaft 3a, to which is connected the first main shaft 4, to rotate in the reverse direction, acts on the crankshaft 3a, but it disconnects between the first main shaft 4 and the casing CA when such power as causes the crankshaft 3a to rotate in the normal direction, acts on the crankshaft 3a. More specifically, the one-way clutch CL1 and the casing CA permit rotation of the first main shaft 4 only when it rotates in the same direction as the crankshaft 3a, but inhibit the first main shaft 4 from rotating in a direction reverse to that of the crankshaft 3a.

Further, the intake pipe (not shown) of the engine 3 is provided with a throttle valve (not shown). The opening degree of the throttle valve (hereinafter referred to as "the throttle valve opening") is controlled by an ECU 2, described hereinafter, whereby the amount of intake air drawn into the engine 3 is controlled.

The stepless transmission 20 is a so-called belt type, and is comprised of a drive pulley 21, a driven pulley 22, a transmission belt 23, and a variable pulley width mechanism 24.

The drive pulley 21 has a DR movable part 21a and a DR fixed part 21b which are frustoconical and opposed to each other. The DR movable part 21a is mounted on the first main shaft 4 in a manner axially movable but unrotatable relative to the first main shaft 4. The DR fixed part 21b is fixed to the first main shaft 4. Further, the opposed surfaces of the DR movable part 21a and the DR fixed part 21b are formed as inclined surfaces, whereby a V-shaped belt groove is formed between the DR movable part 21a and the DR fixed part 21b so as to receive the transmission belt 23 such that it extends therearound.

The driven pulley 22 is configured similarly to the drive pulley 21. More specifically, the driven pulley 22 has a DN movable part 22a and a DN fixed part 22b which are frustoconical and opposed to each other. The DN movable part 22a is mounted on an auxiliary shaft 7 in a manner axially movable but unrotatable relative to the auxiliary shaft 7. The DN fixed part 22b is fixed to the auxiliary shaft 7. The auxiliary shaft 7 is rotatably supported by a pair of bearings 7a and 7a, and extend parallel with the first main shaft 4. Further, the opposed surfaces of the DN movable part 22a and the DN fixed part 22b are formed as inclined surfaces, whereby a V-shaped belt groove is formed therebetween. The transmission belt 23 is made of metal, and extends around the two pulleys 21 and 22 in a state fitted in the respective belt grooves thereof.

The variable pulley width mechanism 24 changes the pulley widths of the two pulleys 21 and 22, to thereby change the effective diameters thereof. The variable pulley width mechanism 24 includes a DR oil chamber 24a and a DN oil chamber 24b which are respectively formed within the DR movable part 21a and the DN movable part 22a, and a DR electromagnetic valve 24c and a DN electromagnetic valve 24d which control respective oil pressures supplied from an oil pressure pump, not shown, to the oil chambers 24a and 24b. The electromagnetic valves 24c and 24d have its valve opening controlled by the ECU 2 (see FIG. 2).

With the arrangement described above, in the stepless transmission 20, the oil pressures supplied to the two oil chambers 24a and 24b are controlled by controlling the valve opening degrees of the two electromagnetic valves 24c and 24d by the ECU 2, whereby the two movable parts 21a and 22a are axially driven, respectively. This steplessly changes the respective effective diameters of the two pulleys 21 and 22, to thereby steplessly control transmission ratio of the stepless transmission 20.

Further, the aforementioned auxiliary shaft 7 has a gear 7b fixed thereto, which is in mesh with a first idler gear 8a fixed to an idler shaft 8. The idler shaft 8 is rotatably supported on a pair of bearings 8d and 8d. Further, the idler shaft 8 has a second idler gear 8b fixed thereto, which is in mesh with a gear 9a of the differential gear mechanism 9. Further, the differential gear mechanism 9 is connected to the drive wheels DW and DW via the drive shafts 10 and 10, respectively.

With the arrangement described above, the crankshaft 3a of the engine 3 is mechanically connected to the drive wheels DW and DW via the first main shaft 4, the stepless transmission 20, the auxiliary shaft 7, the gear 7b, the first idler gear 8a, the idler shaft 8, the second idler gear 8b, the gear 9a, the differential gear mechanism 9, and the drive shafts 10 and 10.

Therefore, by controlling the stepless transmission 20, the power from the engine 3 is transmitted to the drive wheels DW and DW while having the speed thereof steplessly changed. Hereinafter, a sequence of the component elements from the first main shaft 4 to the drive shafts 10 and 10 is referred to as "the first power transmission path" as deemed appropriate.

Further, the clutch CL3 (first clutch) is provided in the auxiliary shaft 7 between the driven pulley 22 and the gear 7b. The clutch CL3 is of a friction multi-disc clutch using the engine 3 as a drive source, and includes an input shaft (not shown) connected to a portion of the auxiliary shaft 7 toward the pulley 22, and an output shaft (not shown) connected to a portion of the auxiliary shaft 7 toward the gear 7b. The degree of engagement of the clutch CL3 is controlled by the ECU 2, whereby the connection between the stepless transmission 20 and the drive wheels DW and DW is established and interrupted.

Figure 3:
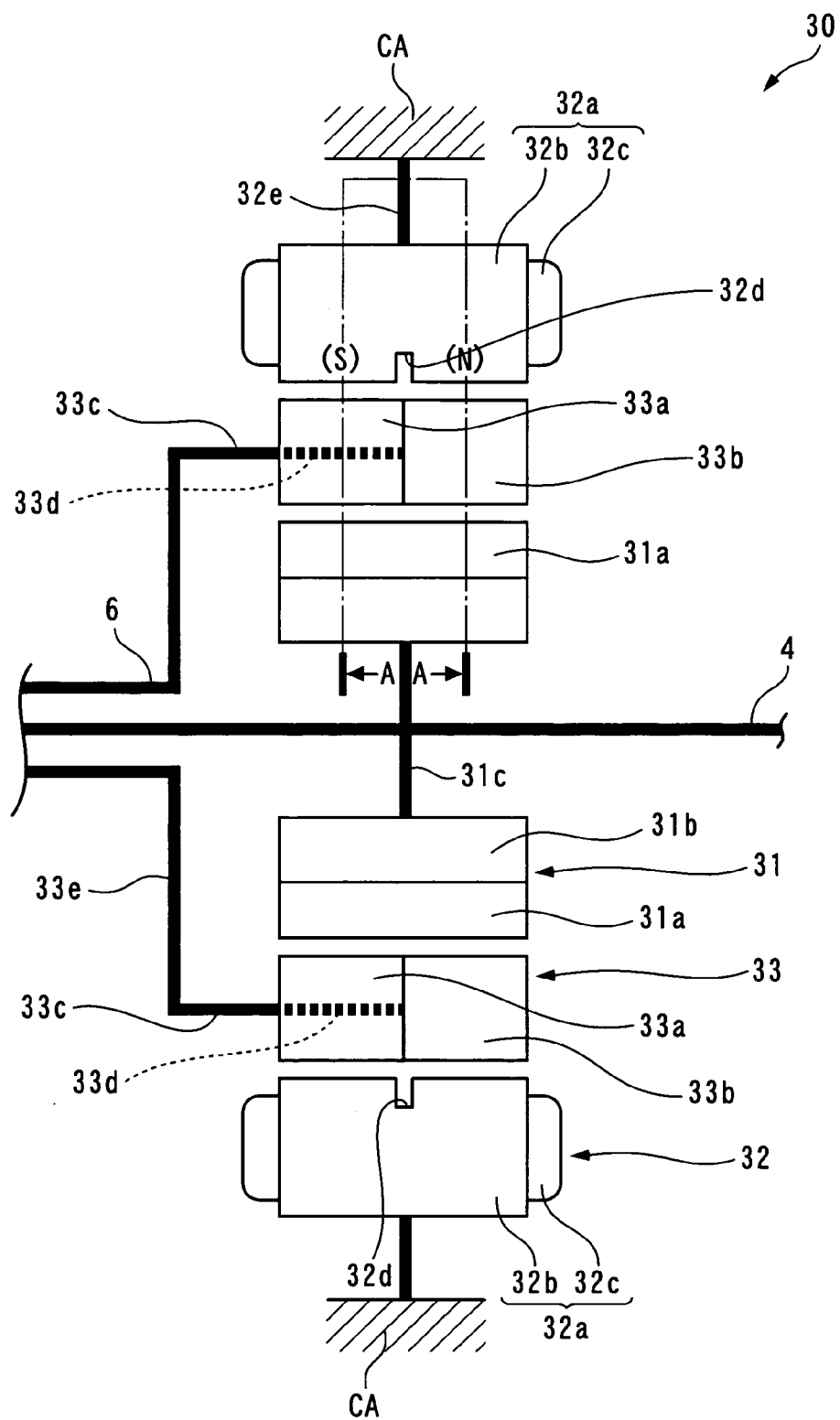
[FIG. 3] An enlarged cross-sectional view of a generator-motor.

As shown in FIGS. 1 and 3, the generator-motor 30 is comprised of a first rotor 31, a stator 32 disposed in a manner opposed to the first rotor 31, and a second rotor 33 disposed between the two 31 and 32 at predetermined spaced intervals. The first rotor 31, the second rotor 33, and the stator 32 are radially arranged from the inner side in the mentioned order. Hereinafter, the left side and the right side as viewed in FIG. 3 will be referred to as "left" and "right" as deemed appropriate.

The first rotor 31 has 2n permanent magnets 31a. The permanent magnets 31a are mounted on the outer peripheral surface of an annular fixing portion 31b in a state arranged at equal intervals in the circumferential direction of the first main shaft 4 (hereinafter simply referred to as "in the circumferential direction" or "circumferentially"). Each permanent magnet 31a has a generally sector-shaped cross-section orthogonal to the axial direction of the first main shaft 4 (hereinafter simply referred to as "in the axial direction" or "axially"), and slightly extends in the axial direction. The above-mentioned fixing portion 31b is formed of a soft magnetic material element, such as iron, and has an inner peripheral surface thereof attached to the outer peripheral surface of a disk-shaped flange 31c integrally concentrically formed with the first main shaft 4. With the above arrangement, the permanent magnets 31a are rotatable in unison with the first main shaft 4.

Further, as shown in FIG. 4, a central angle formed by each two permanent magnets 31a circumferentially adjacent to each other about the first main shaft 4 is a predetermined angle θ. Further, the two permanent magnets 31a circumferentially adjacent to each other have polarities different from each other. Hereafter, respective magnetic poles on the left side and the right side of the permanent magnet 31a are referred to as "the first magnetic pole" and "the second magnetic pole", respectively.

The stator 32 generates rotating magnetic fields, and has 3n armatures 32a arranged at equal intervals in the circumferential direction. Each armature 32a is comprised of an iron core 32b, a coil 32c wound around the iron core 32b, and so forth. The iron core 32b has a generally sector-shaped cross-section orthogonal to the axial direction, and has approximately the same axial length as that of the permanent magnet 31a. An axially central portion of the inner peripheral surface of the iron core 32b is formed with a circumferentially extending groove 32d. The 3n coils 32c form n sets of three-phase coils of U-phase coils, V-phase coils, and W-phase coils (see FIG. 4). Further, the armature 32a are mounted on the case CA via an annular fixing portion 32e such that the armatures 32a are immovable. Due to the numbers and the arrangements of the armatures 32a and the permanent magnets 31a, when the center of a certain armature 32a circumferentially coincides with the center of a certain permanent magnet 31a, the center of every three armatures 32a from the armature 32a, and the center of every two permanent magnets 31a from the permanent magnet 31a circumferentially coincides with each other.

Furthermore, each armature 32a is connected to a battery 45 and the ECU 2 via a PDU 40, and the PDU 40 is formed by an electric circuit, such as an inverter. Further, the armature 32a is configured such that when it is supplied with electric power from a battery 45 or generate electric power, as described hereinafter, magnetic poles having different polarities from each other are generated on the left and right ends of the iron core 32b, respectively. Further, in accordance with generation of these magnetic poles, first and second rotating magnetic fields are generated between the left portion of the first rotor 31 (on the first magnetic pole side) and the left end of the iron core 32b, and between the right portion of the first rotor 31 (on the second magnetic pole side) and the right end of the iron core 32b in a circumferentially rotating manner, respectively. Hereinafter, the magnetic poles generated on the left and right ends of the iron core 32b are referred to as "the first armature magnetic pole" and "the second armature magnetic pole". Further, the number of the first armature magnetic poles and that of the second armature magnetic poles are the same as the number of the magnetic poles of the permanent magnets 31a, that is, 2n, respectively.

The second rotor 33 has a plurality of first cores 33a and a plurality of second cores 33b. The first and second cores 33a and 33b are arranged at equal intervals in the circumferential direction, respectively, and the numbers of 33a and 33b are both set to the same number as that of the permanent magnets 31a that is, 2n. Each first core 33a is formed by laminating soft magnetic material elements, such as a plurality of steel plates, such that it has a generally sector-shaped cross-section orthogonal to the axial direction, and extends by a length approximately equal to a half of the length of the permanent magnet 31a in the axial direction. Similarly to the first core 33a, each second core 33b is formed by laminating a plurality of steel plates, such that it has a generally sector-shaped cross-section orthogonal to the axial direction, and extends by a length approximately equal to a half of the length of the permanent magnet 31a in the axial direction.

Further, the first cores 33a are each axially arranged between the left portion of the first rotor 31 (on the first magnetic pole side) and the left portion of the stator 32 (on the first armature magnetic pole side), and the second cores 33b are each axially arranged between the right portion of the first rotor 31 (on the second magnetic pole side) and the right portion of the stator 32 (on the second armature magnetic pole side). Furthermore, the second cores 33b are circumferentially alternately arranged with respect to the first cores 33a, and the center of the second cores 33b is displaced by a half of the aforementioned predetermined angle θ from the center of the first cores 33a.

The first and second cores 33a and 33b are mounted on an outer end of a disk-shaped flange 33e by bar-shaped connecting portions 33c and 33d slightly extending in the axial direction, respectively. The flange 33e is integrally concentrically fitted on a second main shaft 6. The second main shaft 6 is formed to be hollow, and is rotatably supported on a pair of bearings 6a and 6a. The first main shaft 4 is rotatably concentrically fitted in the second main shaft 6. With this arrangement, the first and second cores 33a and 33b are rotatable in unison with the second main shaft 6.

Further, the second main shaft 6 is provided with an electromagnetic brake CL2 (second rotor lock mechanism). The electromagnetic brake CL2 is turned on or off by the ECU 2, and holds the second main shaft 6 unrotatable when in the ON state, but permits the rotation thereof when in the OFF state. Further, the second main shaft 6 has a gear 6b fixed thereto which is in mesh with a third idler gear 8c fixed to the idler shaft 8. With this arrangement, the second rotor 33 of the generator-motor 30 is mechanically connected to the drive wheels DW and DW via the second main shaft 6, the gear 6b, the third idler gear 8c, the idler shaft 8, the second idler gear 8b, the gear 9a, the differential gear mechanism 9, and the drive shafts 10 and 10. Hereinafter, a sequence of component elements from the second main shaft 6 to the drive shafts 10 and 10 will be referred to as "the second power transmission path") as deemed appropriate.

In the generator-motor 30 configured as above, as shown in FIG. 4, during generation of the first and second rotating magnetic fields, when the polarity of each first armature magnetic pole is different from the polarity of an opposed (closest) one of the first magnetic poles, the polarity of each second armature magnetic pole is the same as the polarity of an opposed (closest) one of the second magnetic poles. Further, when each first core 33a is in a position between each first magnetic pole and each first armature magnetic pole, each second core 33b is in a position between a pair of second armature magnetic poles circumferentially adjacent to each other and a pair of second magnetic poles circumferentially adjacent to each other. Furthermore, although not shown, during generation of the first and second rotating magnetic fields, when the polarity of each second armature magnetic pole is different from the polarity of an opposed (closest) one of the second magnetic poles, the polarity of each first armature magnetic pole is the same as the polarity of an opposed (closest) one of the first magnetic poles. Further, when each second core 33b is in a position between each second magnetic pole and each second armature magnetic pole, each first core 33a is in a position between a pair of first armature magnetic poles circumferentially adjacent to each other, and a pair of first magnetic poles circumferentially adjacent to each other.

Figure 5:
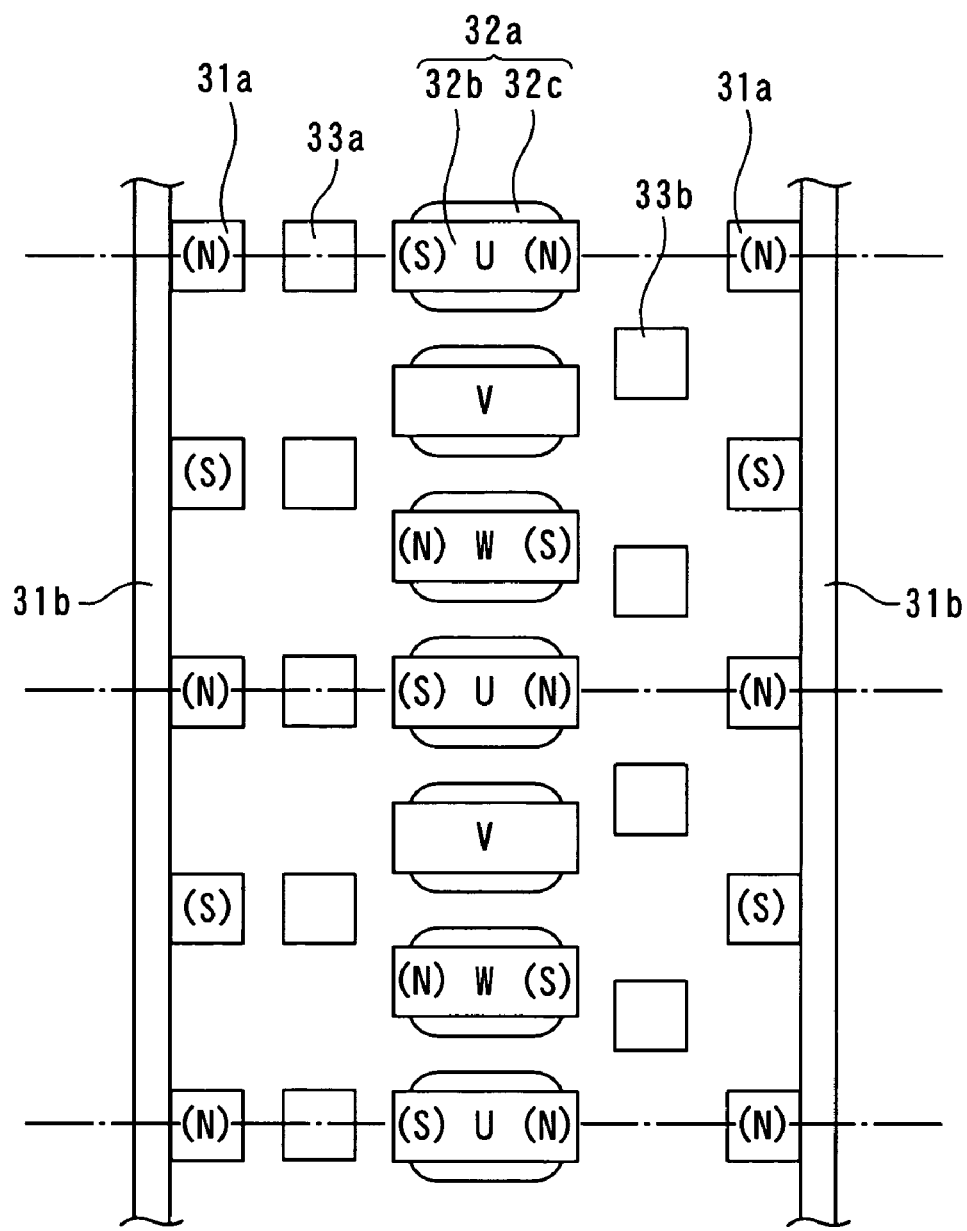
[FIG. 5] A diagram showing an arrangement functionally equivalent to the arrangement of the FIG. 4 development view.

The generator-motor 30 can be also regarded as a planetary gear which inputs and outputs torque by two members and inputs and outputs electric power by one member. The following description is given of this point based on the operation of the generator-motor 30. It should be noted that although in FIG. 4, the armatures 32a and the fixing portion 32e are shown as if they were divided into two other parts since FIG. 4 is shown as a development view, actually, they are integrally formed with each other, so that the arrangement in FIG. 4 can be shown as in FIG. 5 as equivalent thereto. Therefore, hereinafter, the operation of the generator-motor 30 is described assuming that the permanent magnets 31a, the armatures 32a, and the first and second cores 33a and 33b are arranged as shown in FIG. 5.

Further, for convenience of description, the operation of the generator-motor 30 is described by replacing the motion of the first and second rotating magnetic fields by an equivalent physical motion of 2n imaginary permanent magnets (hereinafter referred to as "the imaginary magnets") VM, equal in number to the permanent magnets 31a. Further, the description will be given assuming that a magnetic pole at a left-side portion of each imaginary magnet VM (on the first magnetic pole side), and a magnetic pole at a right-side portion of the imaginary magnet VM (on the second magnetic pole side) are regarded as first and second armature magnetic poles, respectively, and that rotating magnetic fields generated between the left-side portion of the imaginary magnet VM and the left portion of the first rotor 31 (on the first magnetic pole side), and between the right-side portion of the imaginary magnet VM and the right portion of the first rotor 31 (on the second magnetic pole side) are regarded as first and second rotating magnetic fields. Furthermore, hereinafter, the left-side portion and the right-side portion of the permanent magnet 31a are referred to as "the first magnet portion" and "the second magnet portion".

First, a description will be given of the operation of the generator-motor 30 in a state where the first rotor 31 is made unrotatable, and the first and second rotating magnetic fields are generated by the supply of electric power to the armatures 32a.

As shown in FIG. 6(a), the first and second rotating magnetic fields are generated in a manner rotated downward, as viewed in the figure, from a state in which each first core 33a is opposed to each first magnet portion, and each second core 33b is in a position between each adjacent two of the second magnet portions. At the start of the generation of the first and second rotating magnetic fields, the polarity of each first armature magnetic pole is made different from the polarity of each opposed one of the first magnetic poles, and the polarity of each second armature magnetic pole is made the same as the polarity of each opposed one of the second magnetic poles.

Since the first cores 33a are disposed as described above, they are magnetized by the first magnetic poles and the first armature magnetic poles, and magnetic lines G1 of force (hereinafter referred to as "the first magnetic force lines G1") are generated between the first magnetic poles, the first cores 33a, and the first armature magnetic poles. Similarly, since the second cores 33b are disposed as described above, they are magnetized by the second armature magnetic poles and the second magnetic poles, and magnetic lines G2 of force (hereinafter referred to as "the second magnetic force lines G2") are generated between the first armature magnetic poles, the second cores 33b, and the second magnetic poles.

In the state shown in FIG. 6(a), the first magnetic force lines G1 are generated such that they each connect the first magnetic pole, the first core 33a, and the first armature magnetic pole, and the second magnetic force lines G2 are generated such that they connect each circumferentially adjacent two second armature magnetic poles and the second core 33b located therebetween, and connect each circumferentially adjacent two second magnetic poles and the second core 33b located therebetween. As a result, in this state, magnetic circuits as shown in FIG. 8(a) are formed. In this state, since the first magnetic force lines G1 are linear, no magnetic forces for circumferentially rotating the first core 33a act on the first core 33a. Further, the two second magnetic force lines G2 between the circumferentially adjacent two second armature magnetic poles and the second core 33b are equal to each other in the degree of bend thereof and in the total magnetic flux amount. Similarly, the two second magnetic force lines G2 between the circumferentially adjacent two second magnetic poles and the second core 33b are equal to each other in the degree of bend thereof and in the total magnetic flux amount. As a consequence, the second magnetic force lines G2 are balanced. Therefore, no magnetic forces for circumferentially rotating the second core 33b act on the second core 33b, either.

When the imaginary magnets VM rotate from positions shown in FIG. 6(a) to positions shown in FIG. 6(b), the second magnetic force lines G2 are generated such that they each connect between the second armature magnetic pole, the second core 33b, and the second magnetic pole, and the first magnetic force lines G1 between the first cores 33a and the first armature magnetic poles are bent. As a result, magnetic circuits are formed by the first magnetic force lines G1 and the second magnetic force lines G2, as shown in FIG. 8(b).

In this state, since the degree of bend of each first magnetic line G1 is small but the total magnetic flux amount thereof is large, a relatively large magnetic force acts on the first core 33a. This causes the first cores 33a to be driven by relatively large driving forces in the direction of rotation of the imaginary magnets VM, that is, the direction of rotation of the first and second magnetic fields (hereinafter referred to "the magnetic field rotation direction"), whereby the second rotor 33 rotates in the magnetic field rotation direction. Further, since the degree of bend of the second magnetic force line G2 is large but the total magnetic flux amount thereof is small, a relatively small magnetic force acts on the second core 33b. This causes the second cores 33b to be driven by relatively small driving forces in the magnetic field rotation direction, whereby the second rotor 33 rotates in the magnetic field rotation direction.

Figure 6:
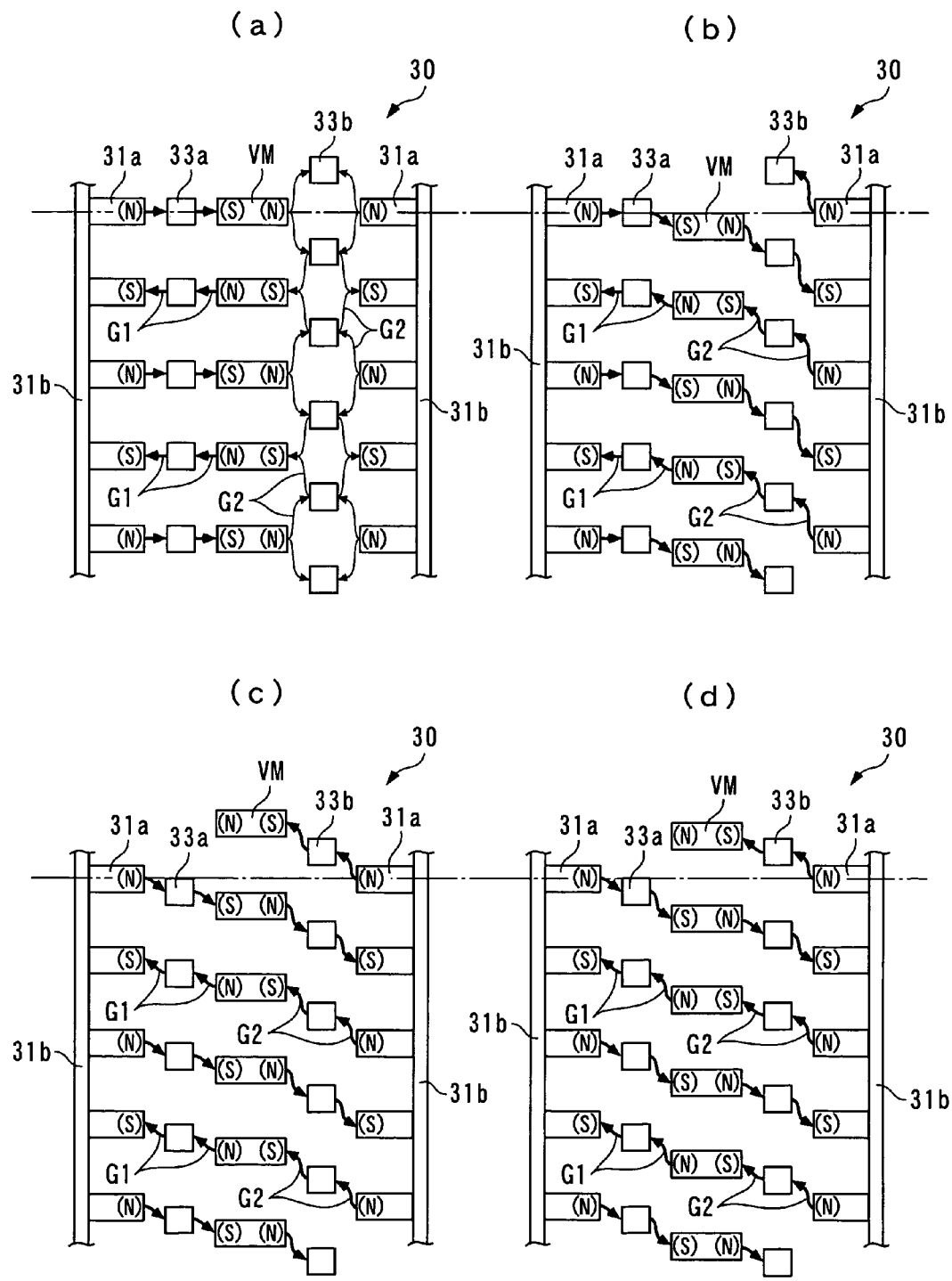
[FIG. 6] Diagrams which are useful in explaining the operation of the generator-motor in the case where the first and second rotating magnetic fields are generated while a first rotor is held unrotatable.
Figure 7:
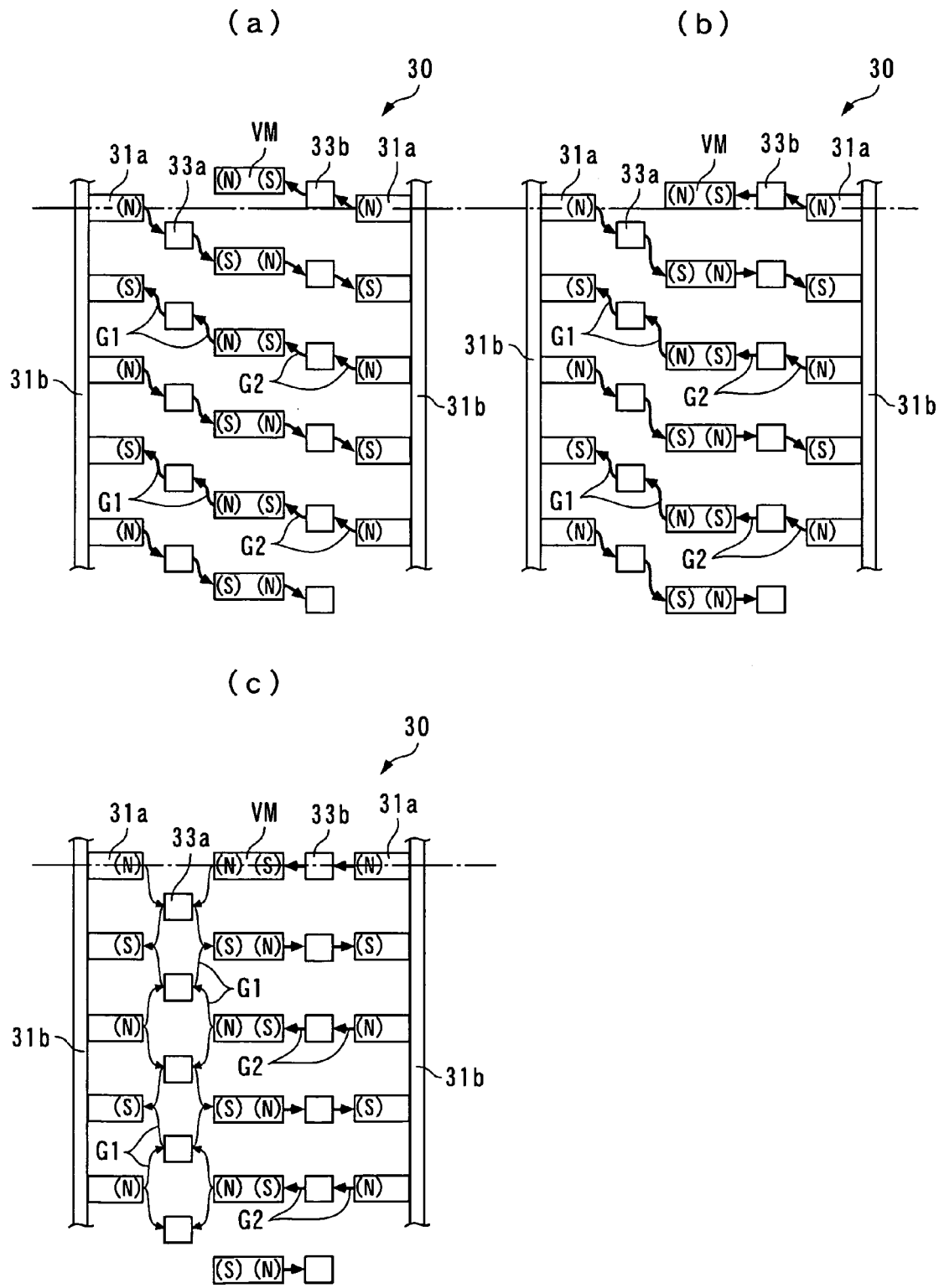
[FIG. 7] Diagrams which are useful in explaining a continuation of the operation in FIG. 6.

Then, when the imaginary magnets VM rotate from the positions shown in FIG. 6(b) to respective positions shown in FIGS. 6(c) and 6 (d), and FIGS. 7(a) and 7 (b), in the mentioned order, the first and second cores 33a and 33b are driven in the magnetic field rotation direction by magnetic forces caused by the first and second magnetic force lines G1 and G2, whereby the second rotor 33 rotates in the magnetic field rotation direction. During the time, the first magnetic force lines G1 increase in the degree of bend thereof but decrease in the total magnetic flux amount thereof, whereby the magnetic forces acting on the first cores 33a progressively decrease to progressively reduce the driving forces for driving the first cores 33a in the magnetic field rotation direction. Further, the second magnetic force lines G2 decrease in the degree of bend thereof but increase in the total magnetic flux amount thereof, whereby the magnetic forces acting on the second cores 33b progressively increase to progressively increase the driving forces for driving the second cores 33b in the magnetic field rotation direction.

Then, while the imaginary magnets VM rotate from the positions shown in FIG. 7(b) to the positions shown FIG. 7(c), the second magnetic force lines G2 are bent, and the total magnetic flux amounts thereof become close to their maximum, whereby the strongest magnetic forces act on the second cores 33b to maximize the driving forces acting on the second cores 33b. After that, as shown in FIG. 7(c), when the imaginary magnets VM each move to a position opposed to the first and second magnet portions, the respective polarities of the first armature magnetic pole and the first magnetic pole opposed to each other become identical to each other, and the first core 33a is positioned between circumferentially adjacent two pairs of first armature magnetic poles and first magnetic poles, each pair having the same polarity. In this state, since the degree of bend of the first magnetic force line G1 is large but the total magnetic flux amount thereof is small, no magnetic force for rotating the first core 33a in the magnetic field rotation direction acts on the first core 33a. Further, second armature magnetic poles and second magnetic poles opposed to each other come to have polarities different from each other.

From this state, when the imaginary magnets VM further rotate, the first and second cores 33a and 33b are driven in the magnetic field rotation direction by the magnetic forces caused by the first and second magnetic force lines G1 and G2, whereby the second rotor 33 rotates in the magnetic field rotation direction. At this time, while the imaginary magnets VM rotate to the positions shown FIG. 6(a), inversely to the above, since the first magnetic force lines G1 decrease in the degree of bend thereof but increase in the total magnetic flux amount thereof, the magnetic forces acting on the first cores 33a increase to increase the driving forces acing on the first cores 33a. On the other hand, since the second magnetic force lines G2 increase in the degree of bend thereof but decrease in the total magnetic flux amount thereof, the magnetic forces acting on the second cores 33b decrease to reduce the driving force acing on the second core 33b.

Figure 9:
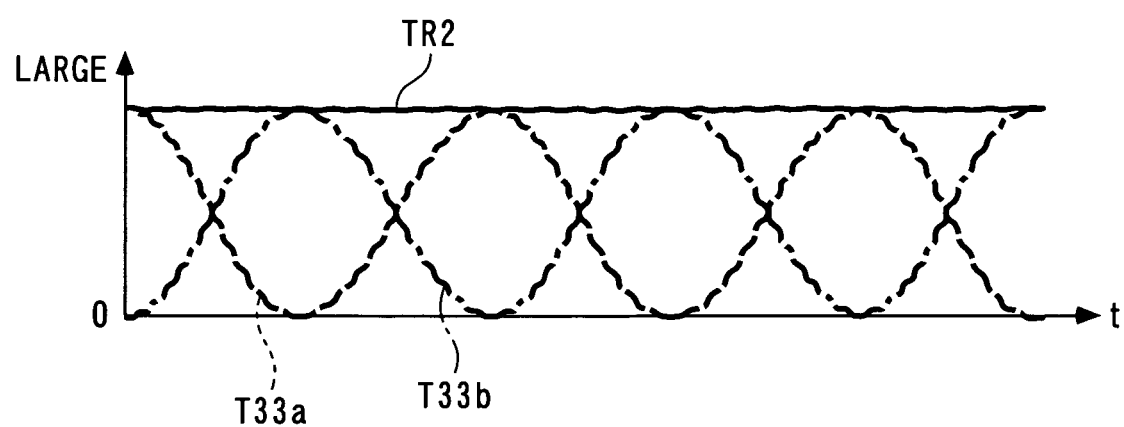
[FIG. 9] A schematic diagram illustrating torque transmitted to a second rotor when the first and second rotating magnetic fields are generated while holding the first rotor unrotatable.

As described above, the second rotor 33 rotates in the magnetic field rotation direction, while the driving forces acting on the respective first and second core 33a and 33b repeatedly increase and decrease by turns in accordance with the rotations of the imaginary magnets VM, that is, the rotations of the first and second rotating magnetic fields. In this case, assuming that the torques transmitted via the first and second cores 33a and 33b are denoted by T33a and T33b, the relationship between a torque TR2 transmitted to the second rotor 33 (hereinafter referred to as "the second rotor transmission torque") and the two torques T33a and T33b is approximately as shown in FIG. 9. As shown in the figure, the two torques T33a and T33b change approximately sinusoidally at the same repetition period, and phases thereof are displaced from each other by a half period. Further, since the second rotor 33 has the first and second core 33a and 33b connected thereto, the second rotor transmission torque TR2 is equal to the sum of the two torques T33a and T33b that change as described above, and becomes approximately constant.

The first core 33a is positioned at an intermediate location between the first magnetic pole and the first armature magnetic pole connected by the first magnetic force line G1, by the action of the magnetic forces caused by the first and second magnetic force lines G1 and G2, and at the same time the second rotor 33 rotates while keeping the position of the second core 33b at an intermediate location between the second magnetic pole and the second armature magnetic pole connected by the second magnetic force line G2. Therefore, between the rotational speed VMF of the first and second rotating magnetic fields (hereinafter referred to as "the magnetic field rotational speed"), a rotational speed VR1 of the first rotor 31 (hereinafter referred to as "the first rotor rotational speed"), and a rotational speed VR2 of the second rotor 33 (hereinafter referred to as "the second rotor rotational speed"), there is satisfied the following equation (1):

$$VR2=(VMF+VR1)/2 \tag{1}$$

By changing the equation (1), there is obtained the following equation (1)':

$$VMF-VR2=VR2-VR1 \tag{1'}$$

As is clear from these equations (1) and (1)', the second rotor rotational speed VR2 is equal to the average speed of the magnetic field rotational speed VMF and the first rotor rotational speed VR1. In other words, the difference between the magnetic field rotational speed VMF and the second rotor rotational speed VR2 is equal to the difference between the second rotor rotational speed VR2 and the first rotor rotational speed VR1.

Therefore, when the aforementioned first rotor rotational speed VR1 is equal to a value of 0, VR2=VMF/2 holds, and the relationship between the magnetic rotational speed VMF, and the first and second rotor rotational speeds VR1 and VR2 can be expressed as shown in FIG. 10(a). It should be noted that although in each of FIG. 10(a) and other speed diagrams, described hereinafter, actually, vertical lines intersecting a horizontal line indicative of a value of 0 are for representing the velocities of parameters, and the distance between a white circle shown on each vertical line and the horizontal line corresponds to the velocity of each parameter, a symbol indicative of the velocity of each parameter is shown on one end of the vertical line for convenience.

Further, in this case, the second rotor rotational speed VR2 is reduced to ½ of the magnetic field rotational speed VMF, and hence, assuming that torque equivalent to the power supplied to the stator 32 and the magnetic field rotational speed VMF is a driving equivalent torque TSE, the second transmission torque TR2 becomes a twofold of the driving equivalent torque TSE. In short, there holds the following equation (2):

$$TR2 = TSE \cdot 2 \qquad (2)$$

As described above, when the electric power is supplied to the stator 32 in a state where the first rotor 31 is made unrotatable, all the electric power is transmitted to the second rotor 33 as power.

Next, a description will be given of an operation in the case where the first and second rotating magnetic fields are generated by the power supplied to the armatures 32a, with the second rotor 33 made unrotatable.

Figure 11:
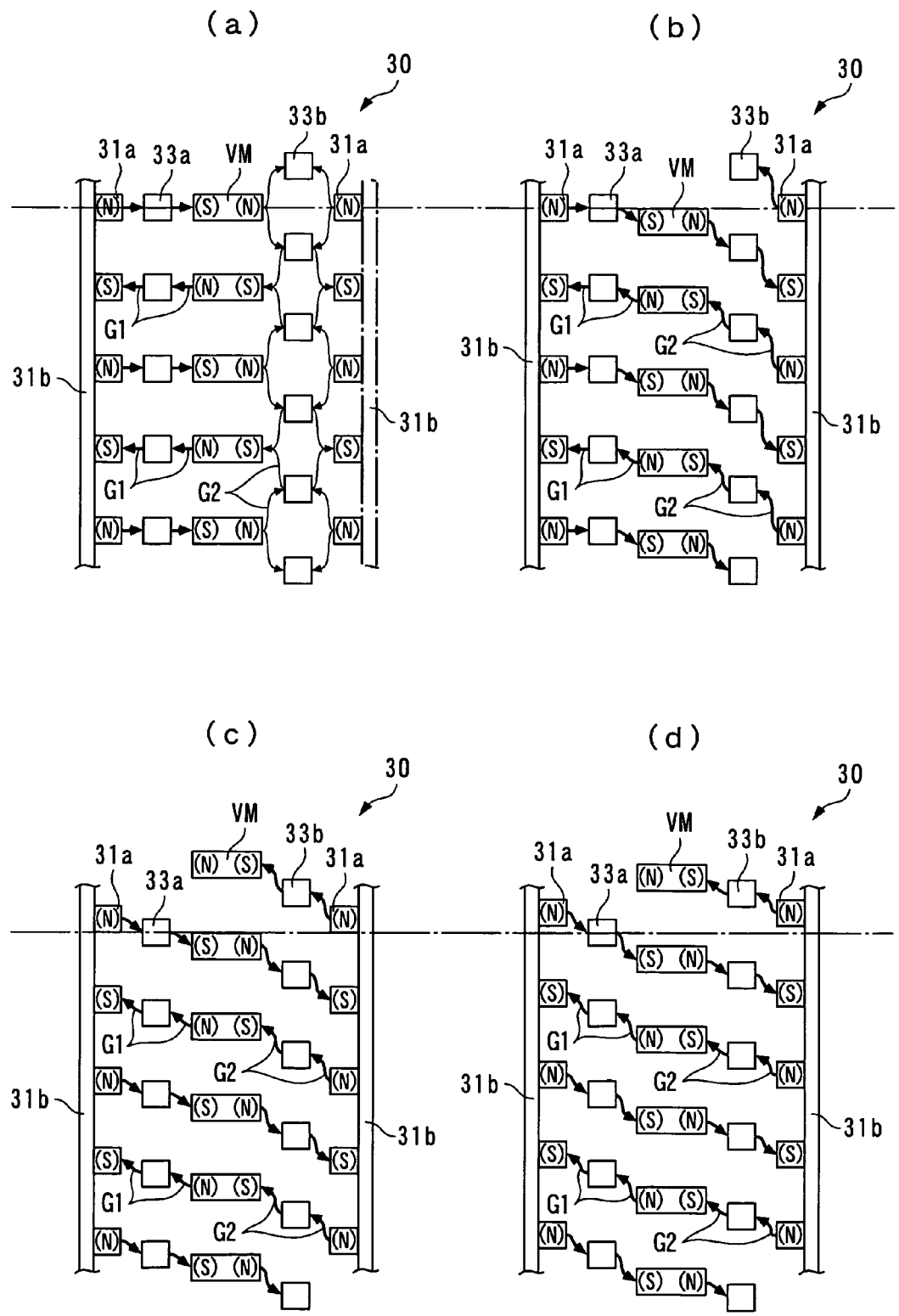
[FIG. 11] Diagrams which are useful in explaining the operation of the generator-motor when the first and second rotating magnetic fields are generated while holding the second rotor unrotatable.

In this case as well, as shown in FIG. 11(a), the first and second rotating magnetic fields are generated in a manner rotated downward, as viewed in the figure, from a state in which each first core 33a is opposed to each first magnet portion, and each second core 33b is in a position between each adjacent two of the second magnet portions. At the start of the generation of the first and second rotating magnetic fields, the polarity of each first armature magnetic pole is made different from the polarity of an opposed one of the first magnetic poles, and the polarity of each second armature magnetic pole is made the same as the polarity of an opposed one of the second magnetic poles. In this state, magnetic circuits as shown in FIG. 8(a) are formed.

Then, when the imaginary magnet VM rotates from the position shown in FIG. 11(a) to the position shown in FIG. 11(b), the first magnetic force line G1 between the first core 33a and the first armature magnetic pole is bent, and accordingly, the second armature magnetic pole becomes closer to the second core 33b, whereby the second magnetic force line G2 connecting between the second armature magnetic pole, the second core 33b, and the second magnetic pole is generated. As a consequence, the magnetic circuit as shown in FIG. 8(b) is formed.

In this state, although the total magnetic flux amounts of the first magnetic force lines G1 between the first magnetic poles and the first cores 33a are large, the first magnetic force lines G1 are straight, and hence no magnetic forces are generated which cause the first magnet portions to rotate with respect to the first cores 33a. Further, although the distance between second magnetic poles and the second armature magnetic poles having a polarity different from that of the second magnetic poles is relatively large, to make the total magnetic flux amounts of the second magnetic force lines G2 between the second cores 33b and the second magnetic poles relatively small, the degree of bend of the second magnetic force lines G2 is large, whereby magnetic forces that make the second magnet portions closer to the second cores 33b act on the second magnet portions. This causes the permanent magnets 31a to be driven in the direction of rotation of the imaginary magnets VM, that is, in a direction (upward, as viewed in FIG. 11) opposite to the direction of rotations of the magnetic field rotation direction, and be rotated toward positions shown in FIG. 11(c). In accordance with this, the first rotors 31 rotate in an direction opposite to the magnetic field rotation direction.

While the permanent magnets 31a rotate from the positions shown in FIG. 11(b) toward the positions shown in FIG. 11(c), the imaginary magnets VM rotate toward positions shown in FIG. 11(d). As described above, although the second magnet portions become closer to the second cores 33b to make the degree of bend of the second magnetic force lines G2 between the second cores 33b and the second magnetic poles smaller, the imaginary magnets VM become further closer to the second cores 33b, which increases the total magnetic flux amounts of the second magnetic force lines G2. As a result, in this case as well, the magnetic forces that make the second magnet portions closer to the second cores 33b act on the second magnet portions, whereby the permanent magnets 31a are driven in the direction opposite to the magnetic field rotation direction.

Further, as the permanent magnets 31a rotate in the direction opposite to the magnetic field rotation direction, the first magnetic force lines G1 between the first magnetic poles and the first cores 33a are bent, whereby magnetic forces that make the first magnet portions closer to the first cores 33a act on the first magnet portions. In this state, however, a magnetic force caused by the first magnetic force line G1 is smaller than the aforementioned magnetic force caused by the second magnetic force line G2, since the degree of bend of the first magnetic force line G1 is smaller than that of the second magnetic force line G2. As a result, a magnetic force corresponding to the difference between the two magnetic forces drives the permanent magnet 31a in the direction opposite to the magnetic field rotation direction.

Referring to FIG. 11(d), when the distance between the first magnetic pole and the first core 33a, and the distance between the second core 33b and the second magnetic pole have become approximately equal to each other, the total magnetic flux amount and the degree of bend of the first magnetic force line G1 between the first magnetic pole and the first core 33a become approximately equal to the total magnetic flux amount and the degree of bend of the second magnetic force line G2 between the second core 33b and the second magnetic pole, respectively. As a result, the magnetic forces caused by the first and second magnetic force lines G1 and G2 are approximately balanced, whereby the permanent magnet 31a is temporarily placed in an undriven state.

From this state, when the imaginary magnets VM rotate to positions shown in FIG. 12(a), the state of generation of the first magnetic force lines G1 is changed to form magnetic circuits as shown in FIG. 12(b). Accordingly, the magnetic forces caused by the first magnetic force lines G1 almost cease to act on the first magnet portions such that the magnetic forces make the first magnet portions closer to the first cores 33a, and therefore the permanent magnets 31a are driven by the magnetic forces caused by the second magnetic force lines G2, to positions shown in FIG. 12(c), in the direction opposite to the magnetic field rotation direction.

Then, when the imaginary magnets VM slightly rotate from the positions shown in FIG. 12(c), inversely to the above, the magnetic forces caused by the first magnetic force lines G1 between the first magnetic poles and the first cores 33a act on the first magnet portions such that the magnetic forces make the first magnet portions closer to the first cores 33a, whereby the permanent magnets 31a are driven in the direction opposite to the magnetic field rotation direction, to rotate the first rotor 31 in the direction opposite to the magnetic field rotation direction. Then, when the imaginary magnets VM further rotate, the permanent magnets 31a are driven in the direction opposite to the magnetic field rotation direction, by respective magnetic forces corresponding to the differences between the magnetic forces caused by the first magnetic force lines G1 between the first magnetic poles and the first cores 33a, and the magnetic forces caused by the second magnetic force lines G2 between the second cores 33b and the second magnetic poles. After that, when the magnetic forces caused by the second magnetic force lines G2 almost ceases to act on the second magnet portions such that the magnetic force makes the second magnet portions closer to the first cores 33a, the permanent magnets 31a are driven by the magnetic forces caused by the first magnetic force lines G1 in the direction opposite to the magnetic field rotation direction.

As described hereinabove, in accordance with the rotations of the first and second rotating magnetic fields, the magnetic forces caused by the first magnetic force lines G1 between the first magnetic poles and the first cores 33a, the magnetic forces caused by the second magnetic force lines G2 between the second cores 33b and the second magnetic poles, and the magnetic forces corresponding to the differences between the above magnetic forces alternately act on the permanent magnets 31a, i.e. on the first rotor 31, whereby the first rotor 31 is rotated in the direction opposite to the magnetic field rotation direction. Further, the magnetic forces, that is, the driving forces thus act on the first rotor 31 alternately, whereby the torque TR1 transmitted to the first rotor 31 (hereinafter referred to as "the first rotor transmission torque") is made approximately constant.

Further, the relationship between the magnetic field rotational speed VMF at this time and the rotational speeds VR1 and VR2 of the first and second rotors can be expressed as VR1=−VMF by setting VR2=0 in the aforementioned equation (1), and is shown as in FIG. 10(b). Thus, the first rotor 31 rotates in the reverse direction at the same speed as that of the first and second rotating magnetic fields. Further, in this case, the first rotor transmitting torque TR1 becomes equal to the driving equivalent torque TSE, and there is satisfied the following equation (3):

$$TR1=TSE \qquad (3)$$

Further, if none of the magnetic field rotational speed VMF and the first and second rotor rotational speeds VR1 and VR2 are equal to 0, e.g. if the first and second rotating magnetic fields are generated in a state in which the first and/or second rotors 31 and 33 are caused to rotate by inputting power thereto, the aforementioned general formula (1) holds between the magnetic field rotational speed VMF and the first and second rotor rotational speeds VR1 and VR2 as it is and the speed relationship between the three is expressed as shown in FIG. 10(c).

Further, if the second rotor 33 is rotated by input of power, and the magnetic field rotational speed VMF is controlled to 0, the power (energy) input to the second rotor 33 is not transmitted to the stator 32, but is all transmitted to the first rotor 31 via the magnetic forces caused by the first and second magnetic force lines G1 and G2. Similarly, by causing the first rotor 31 to rotate by input of power, and the magnetic field rotational speed VMF is controlled to 0, the power (energy) input to the first rotor 31 is not transmitted to the stator 32 but all transmitted to the second rotor 33 via the magnetic forces caused by the first and second magnetic force lines G1 and G2.

Further, the relationship between the magnetic field rotational speed VMF and the first and second rotor rotational speeds VR1 and VR2 is expressed as VR1=2·VR2 by setting VMF=0 in the aforementioned equation (1), and is expressed as shown in FIG. 10(d). Further, the relationship of TR1=TR2/2 holds between the first and second rotor transmitting torques TR1 and TR2.

Further, in the generator-motor 30, even in the case of electric power being not supplied to the stator 32, induced electric motive force is generated in the armatures 32a to generate electric power, if with respect to the armatures 32a, the permanent magnets 31a are rotated by input of power to the first rotor 31 or the first and second cores 33a and 33b are rotated by input of power to the second core 33. If the first and second magnetic rotating fields are generated in accordance with this electric power generation, the aforementioned equation (1) holds.

Further, between the magnetic field rotational speed VMF and the first and second rotor rotational speeds VR1 and VR2, the relationship as expressed by the aforementioned equations (1) and (1)' and FIGS. 10(a) to 10(d) is always satisfied, and the speed relationship between the three corresponds to the speed relationship between one and the other of the ring gear and sun gear of the planetary gear unit, and the carrier supporting the planetary gears. Further, such a speed relationship is obtained not only during the supply of electric power to the stator 32, but also during the generation of electric power, and hence the generator-motor 30 can be regarded as a planetary gear unit which inputs and outputs torque by two members and inputs and outputs electric power by one member.

Further, if power is supplied to the first rotor 31 and at the same time electric power is supplied to the stator 32, when the directions of the rotations of the first rotor 31, the second rotor 33, and the first and second rotating magnetic fields are identical to each other, the driving equivalent torque TSE output from the stator 32 and the first rotor transmitting torque TR1 input to the first rotor 31 are combined and transmitted to the second rotor 33 as the second rotor transmitting torque TR2. That is, the relationship between the driving equivalent torque TSE and the first and second rotor transmitting torques TR1 and TR2 satisfies the following equation:

$$TR2=TSE+TR1 \qquad (4)$$

However, in this case, as shown in the aforementioned equation (1)', the difference between the magnetic field rotational speed VMF and the second rotor rotational speed VR2 and the difference between the second rotor rotational speed VR2 and the first rotor rotational speed VR1 are equal to each other, and hence the torque combining ratio between the driving equivalent torque TSE and the first rotor transmitting torque TR1 is 1:1. Therefore, the energy combining ratio (between electric power and power) is equal to the ratio between the magnetic field rotational speed VMF and the first rotor rotational speed VR1.

Further, if power is input to the second rotor 33 and at the same time, the electric power generation is performed by the stator 32 using part of the power, when the directions of the rotations of the first rotor 31, the second rotor 33, and the first and second rotating magnetic fields are identical to each other, assuming that torque equivalent to the electric power generated by the stator 32 and the magnetic field rotational speed VMF is defined as power-generating equivalent torque TGE, the relationship between the power-generating equivalent torque TGE and the first and second rotor transmitting torques TR1 and TR2 satisfy the following equation (5):

$$TR2=TGE+TR1 \qquad (5)$$

In this case, as is clear from the equation (5), the second rotor transmitting torque TR2 is divided and is output as the power-generating equivalent torque TGE and the first rotor transmitting torque TR1. Further, as shown in the aforementioned equation (1)', the difference between the magnetic field rotational speed VMF and the second rotor rotational speed VR2 and the difference between the second rotor rotational speed VR2 and the first rotor rotational speed VR1 are equal to each other, and hence the torque distribution ratio in this case is 1:1. Accordingly, the energy distribution ratio (between electric power and power) is equal to the ratio between the magnetic field rotational speed VMF and the first rotor rotational speed VR1.

Through the control of the PDU 40, the ECU 2 controls the electric power supplied to the stator 32 and the magnetic field rotational speed VMF of the first and second rotating magnetic fields generated by the supply of electric power. Further, through the control of the PDU 40, the ECU 2 controls the electric power generated by the stator 32 and the magnetic field rotational speed VMF of the first and second rotating magnetic fields generated by the electric power generation.

Figure 2:
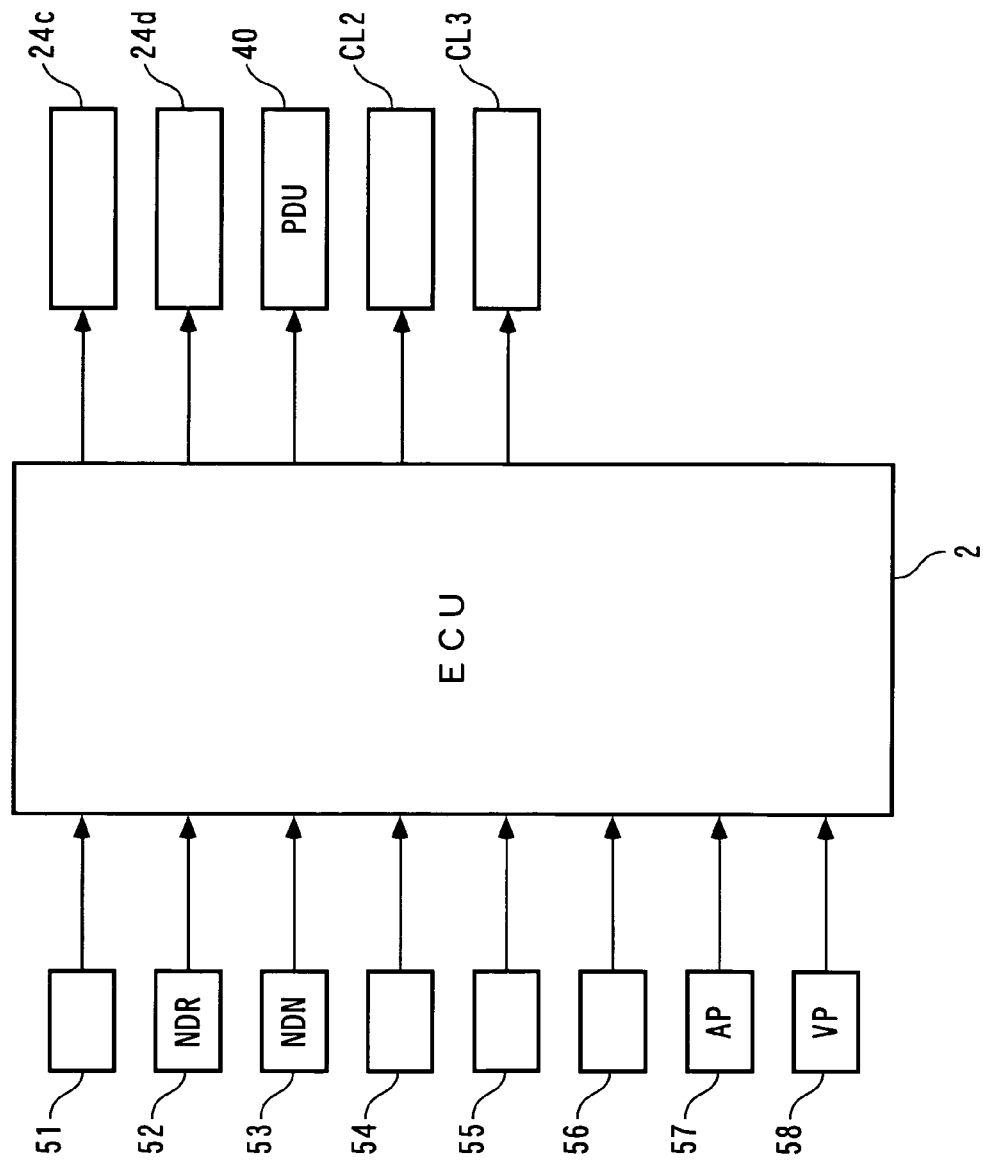
[FIG. 2] A block diagram of a control system for controlling the power plant shown in FIG. 1.

Further, as shown in FIG. 2, a crank angle sensor 51 detects the crank angle position of the crankshaft 3a, and delivers a signal indicative of the sensed crank angle position to the ECU 2. The ECU 2 calculates engine speed NE based on the crank angle position, Further, a DR pulley speed rotational speed sensor 52 and a DN pulley rotational speed sensor 53 delivers a detection signal indicative of a drive-side pulley rotational speed NDR as the rotational speed of the aforementioned drive pulley 21 and a detection signal indicative of a driven-side pulley rotational speed NDN as the rotational speed of the aforementioned driven pulley 22 to the ECU 2. The ECU 2 calculates a transmission ratio RATIO (=NDR/NDN) of the stepless transmission 20 based on the drive-side pulley rotational speed NDR and the driven-side pulley rotational speed NDN.

Further, a first rotational angle sensor 54 and a second rotational speed sensor 55 deliver respective detection signals indicative of rotational angle positions of the first and second rotors 31 and 33 to the ECU 2. The ECU 2 calculates the first and second rotor rotational speeds VR1 and VR2 based on the respective detected rotational angle positions of the first and second rotors 31 and 33. Further, a current-voltage sensor 56 delivers a detection signal indicative of current-voltage values input to and output from the battery 45 to the ECU 2. The ECU 2 calculates a remaining charge SOC of the battery 45 based on the detection signal.

Further, an accelerator pedal opening sensor 57 deliver a detection signal indicative of an accelerator pedal opening AP as a stepped-on amount of an accelerator pedal, not shown, of the vehicle to the ECU 2, and a vehicle speed sensor 58 delivers a detection signal indicative of a vehicle speed VP to the ECU 2.

The ECU 2 is implemented by a microcomputer comprised of an I/O interface, a CPU, a RAM, and a ROM, and controls the operation of the power plant 1 based on the detection signals from the aforementioned sensors 51 to 58.

Next, a description will be given of the operation of the power plant 1 controlled by the ECU 2 at the standing start or during traveling of the vehicle. First, a description will be given of the operation during a creep operation and at the start of the vehicle. During the creep operation, the vehicle basically uses only the generator-motor 30 as a drive source thereof. Hereinafter, the above creep operation will be referred to as "the EV creep operation". By controlling the electromagnetic brake CL2 to the OFF state, the rotation of the second main shaft 6 and the second rotor 33 integrally formed therewith is permitted, by disengaging the clutch CL3, the stepless transmission 20 is disconnected from the drive wheels DW and DW, whereby the first rotor 31 is disconnected from the drive wheels DW and DW. Further, electric power is supplied to the stator 32 to thereby generate the first and second rotating magnetic fields in a manner rotating in the same direction as the direction of rotation of the crankshaft 3a.

Figure 13:
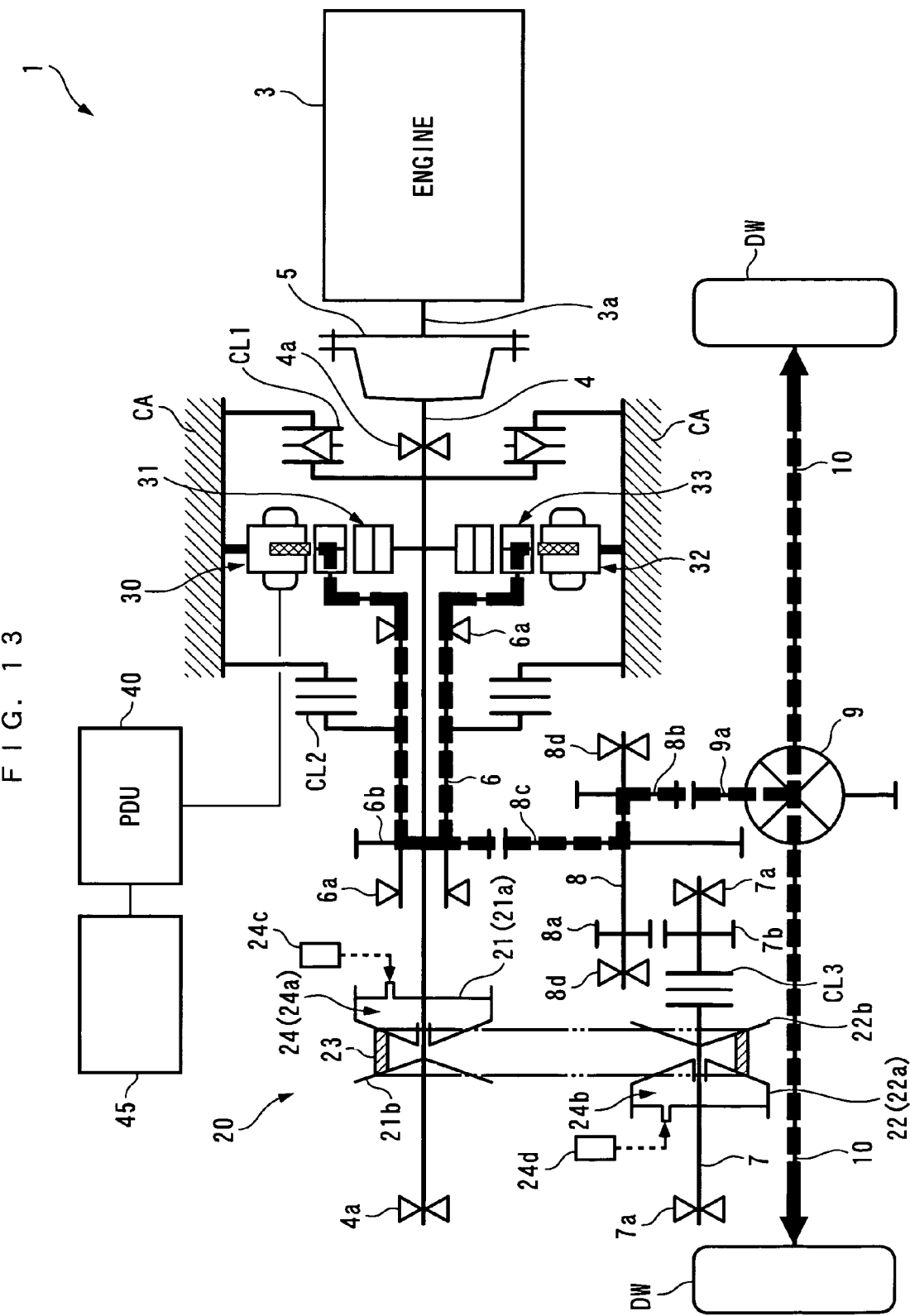
[FIG. 13] A diagram showing a state of transmission of torque in the power plant shown in FIG. 1 during an EV creep operation of the vehicle.

As described hereinabove, the one-way clutch CL1 and the casing CA inhibit the first rotor 31 from rotating together with the first main shaft 4 in a direction reverse to the direction of rotation of the crankshaft 3a. Therefore, as described hereinabove using the aforementioned equation (2), the torque which is as twice as large as the driving equivalent torque TSE is transmitted from the stator 32 to the second rotor 33. Further, as shown in FIG. 13, the torque transmitted to the second rotor 33 is transmitted via the second power transmission path to the drive wheels DW and DW without via the stepless transmission 20. This causes the second rotor 33 to rotate in the same direction as the crankshaft 3a, whereby the drive wheels DW and DW rotate in the normal direction. Further, the electric power supplied to the stator 32 is controlled such that the second rotor rotational speed VR2 becomes very small, whereby the creep operation with a very low vehicle speed VP is carried out. In FIG. 13 and other figures showing states of transmission of torque, referred to hereinafter, a thick broken line with an arrow indicates a flow of torque. Further, although in the stator 32, actually, torque is transmitted in the form of electric energy, in FIG. 13 and other figures showing states of transmission of torque, referred to hereinafter, the input and output of energy to and from the stator 32 is indicated by hatching added to the flow of torque, for convenience.

From this state of the EV creep operation, the power supplied to the stator 32 is increased to increase the magnetic field rotational speed VMF, whereby as indicated by a solid line in FIG. 14, the second rotor rotational speed VR2 is increased from approximately 0 (indicated by a broken line in the figure) in a state where the first rotor rotational speed VR1 is equal to 0, i.e. the crankshaft 3a is stopped, and in accordance therewith, the vehicle speed VP increases to cause the vehicle to make a standing start (to travel). Hereinafter, the above-described standing start of the vehicle using only the power from the generator-motor 30 will be referred to as "the EV standing start", and the traveling of the vehicle using only the power from the generator-motor 30 will be referred to as "the EV traveling". It should be noted that in the FIG. 14 speed diagram, a state rotating in the same direction as the direction of rotation of the crankshaft 3a is defined as normal rotation and is denoted by "+", while a states rotating in the direction reverse to the direction of rotation of the crankshaft 3a is defined as reverse rotation and is denoted by "−". This also applies to the other speed diagrams, described hereinafter.

Figure 15:
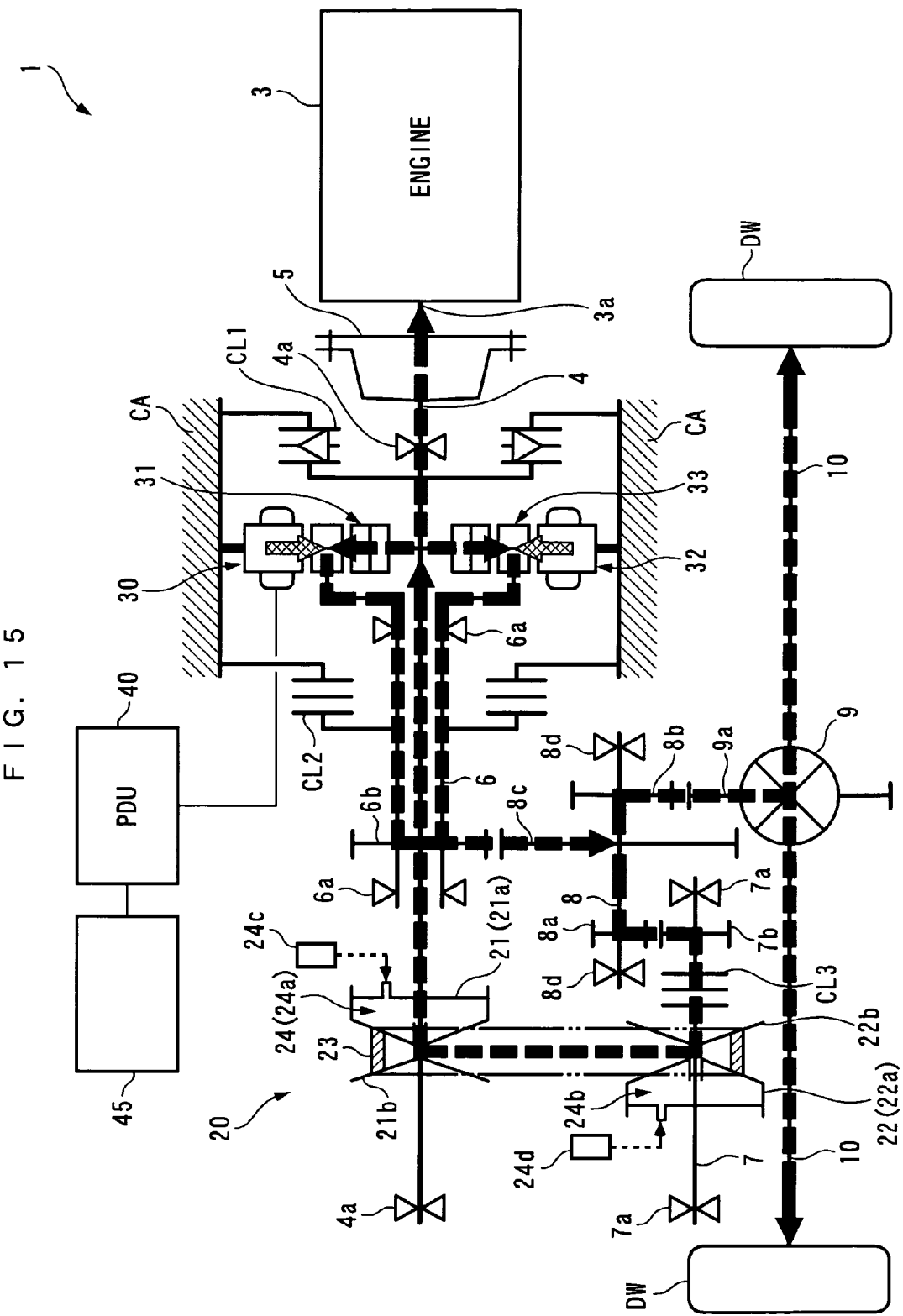
[FIG. 15] A diagram illustrating a state of transmission of torque in the power plant shown in FIG. 1, at an ENG start during EV traveling.

Further, during the above-mentioned EV traveling, the starting of the engine 3 is carried out in the following manner: The clutch CL3 having been disengaged, as described hereinabove, is engaged to thereby connect between the driving wheels DW and DW and the stepless transmission 20. This causes, as shown in FIG. 15, part of the driving equivalent torque TSE to be transmitted to the first main shaft 4 from the idler shaft 8, via the auxiliary shaft 7 and the stepless transmission 20. After that, part of the transmitted torque is further transmitted to the second rotor 33 via the first rotor 31, and the remaining torque is transmitted to the engine 3. In this state, as indicated by a solid line in FIG. 16(a), the magnetic field rotational speed VMF is lowered from its state (shown by broken line in the figure) before engagement of the clutch CL3 such that the second rotor rotational speed VR2 is held at the value assumed then, whereby the first rotor rotational speed VR1 increases and the rotational speed of the crankshaft 3a integral with the first rotor 31, i.e. the engine speed NE also increases. In this state, according to the aforementioned crank angle position, the ignition operation of the fuel injection valves and spark plugs (none of which are shown) of the engine 3 are controlled whereby the engine 3 is started. Hereinafter, the above-described starting of the engine 3 is referred to as "the ENG start during EV traveling".

Further, when the ENG start during EV traveling is performed, the driving equivalent torque TSE, i.e. the electric power supplied to the stator 32 and the magnetic field rotational speed VMF is controlled such that torque is sufficiently transmitted to the drive wheels DW and DW and the engine 3. Further, when connecting the clutch CL3, the degree of engagement thereof is controlled to be progressively increased. This prevents the torque transmitted to the drive wheels DW and DW from suddenly dropping. Therefore, it is possible to secure excellent drivability. Further, the transmission ratio RATIO of the stepless transmission 20 is controlled according to the magnetic field rotational speed VMF, and the first and second rotor rotational speeds VR1 and VR2, such that the relationship of these speeds shown in the equation (1) is maintained.

Further, as indicated by a solid line in FIG. 16(b) (broken line in the figure: before engagement of the clutch CL3), even when the second rotor rotational speed VR2, i.e. the vehicle speed VP is relatively high, differently from the type in which the engine and the generator-motor are directly connected, it is possible to start the engine 3 while holding the first rotor rotational speed VR1, i.e. the engine speed NE relatively low through the control of the aforementioned transmission ratio RATIO and the magnetic field rotational speed VMF. Therefore, it is possible to suppress torque variation at the start of the engine 3 and vibrations and noise caused by the start of the engine 3, which makes it possible to improve marketability.

Next, a description will be given of the operation during traveling of the vehicle after the start of the engine 3. In this case as well, similarly to the case of the start of the engine 3, the electromagnetic brake CL2 is controlled to the OFF state, and at the same time the clutch CL3 is engaged. Further, basically, the engine 3 alone is used as the drive source of the vehicle, and the power from the engine 3 is subjected to a speed change by the stepless transmission 20, and is transmitted to the drive wheels DW and DW via the aforementioned first power transmission path. The operation of the engine 3 and the transmission ratio RATIO of the stepless transmission 20 are controlled according to the engine speed NE, the accelerator opening AP and so forth.

On the other hand, during the operation of the engine 3 and at the same time during traveling of the vehicle, when one of the following conditions (a) and (b) is satisfied, electric power is supplied to the generator-motor 30 from the battery 45 to assist the engine 3 by the generator-motor 30.

(a) demanded torque PMCMD>predetermined upper limit value PMH (b) remaining charge SOC>first predetermined value SOCL The demanded torque PMCMD is a torque demanded of the vehicle, and is calculated according to the vehicle speed VP and the accelerator opening AP. The upper limit value PMH is set to a value slightly smaller than the upper limit toque that can be transmitted by the stepless transmission 20. The first predetermined value SOCL is set to such a value as will not cause overdischarge of the battery 45. Thus, the assist by the generator-motor 30 is carried out when the demanded torque PMCMD is close to the upper limit torque that can be transmitted by the stepless transmission 20 or when the amount of electric power remaining in the battery is large enough.

Figure 17:
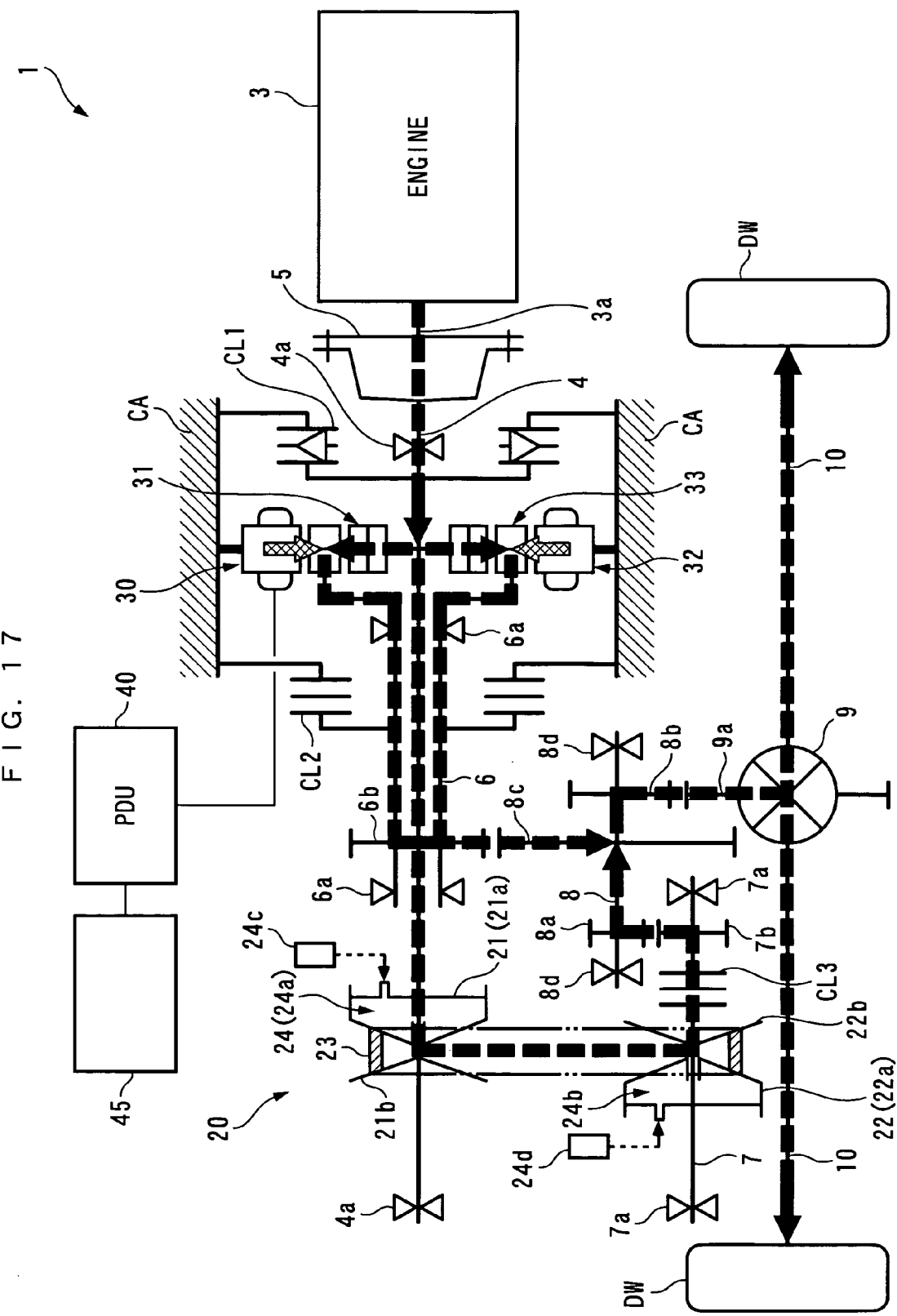
[FIG. 17] A diagram showing a state of transmission of torque in the power plant shown in FIG. 1 during assist.

As described hereinabove using the aforementioned equation (4), in the generator-motor 30, when the directions of the rotations of the first rotor 31, the second rotor 33, and the first and second rotating magnetic fields are identical to each other, the driving equivalent torque TSE and the first rotor transmission torque TR1 are combined at a combining ratio of 1:1, and the combined torque is delivered as the second rotor transmission torque TR2. Therefore, during assist by the generator-motor 30, as shown in FIG. 17, as the driving equivalent torque TSE is transmitted to the second rotor 33, part of the torque of the engine 3 transmitted to the stepless transmission 20 is extracted, and is transmitted to the second rotor 33 via the first rotor 31. Thus, the combined torque formed by combining the driving equivalent torque TSE and part of the torque of the engine 3 is transmitted to the second rotor 33. The extracted part of the torque of the engine 3 is equal to the driving equivalent torque TSE since the torque combining ratio in this case is 1:1.

Further, the combined torque and the remaining torque of the engine 3 remaining after transmitted to the stepless transmission 20 are combined by the idler shaft 8, and then the resulting combined torque is transmitted to the drive wheels DW and DW. As a result, assuming that there is no change in speed by gears or the like, the torque transmitted to the drive wheels DW and DW is equal to the sum of the torque of the engine 3 and the driving equivalent torque TSE. Further, the outputs from the engine 3 and the generator-motor 30 are controlled such that the optimum efficiency is obtained within a range within which the demanded torque PMCMD can be generated.

Further, the transmission ratio RATIO of the stepless transmission 20 is controlled in the following manner: First, a target engine speed NECMD and a target magnetic field rotational speed VMFCMD are calculated by searching a NECMD map and a VMFCMD map (neither of which is shown) according to the demanded torque PMCMD and the vehicle speed VP. In these maps, the NECMD value and the VMFCMD value are set such that with respect to the demanded torque PMCMD and the vehicle speed VP at the time, the optimum efficiencies of the engine 3 and the generator-motor 30 are obtained, and the relation between the magnetic field rotational speed VMF, and the first and second rotor rotational speeds VR1 and VR2 shown in the aforementioned equation (1) is maintained. Then, the transmission ratio RATIO is controlled such that the engine speed NE and the magnetic field rotational speed VMF are become equal to the calculated NECMD value and VMFCMD value. This controls the speed relationship between the first and second rotors 31 and 33 such that the magnetic field rotation direction of the first and second rotating magnetic fields becomes identical to the direction of the rotations of the first and second rotors 31 and 33.

On the other hand, if both the following equations (c) and (d) are satisfied, by controlling the PDU 40, the generator-motor 30 generates electric power, and the generated electric power is used to charge the battery 45. This electric power generation is performed using the power from the engine 3 transmitted to the second rotor 33 via the stepless transmission 20, the idler shaft 8, and the second main shaft 6. Hereinafter, the electric power generation is referred to as "the drive-time electric power generation").

(c) demanded torque PMCMD≦predetermined upper limit value PMEH of electric power that can be generated (d) remaining charge SOC<second predetermined value SOCH The predetermined upper limit value PMEH of electric power that can be generated is set to a value smaller than the aforementioned upper limit value PMH. The second predetermined value SOCH is set to a such value as will not cause overcharge of the battery 45. That is, the drive-time electric power generation is performed when the demanded torque PMCMD and the remaining charge SOC are relatively small.

Figure 18:
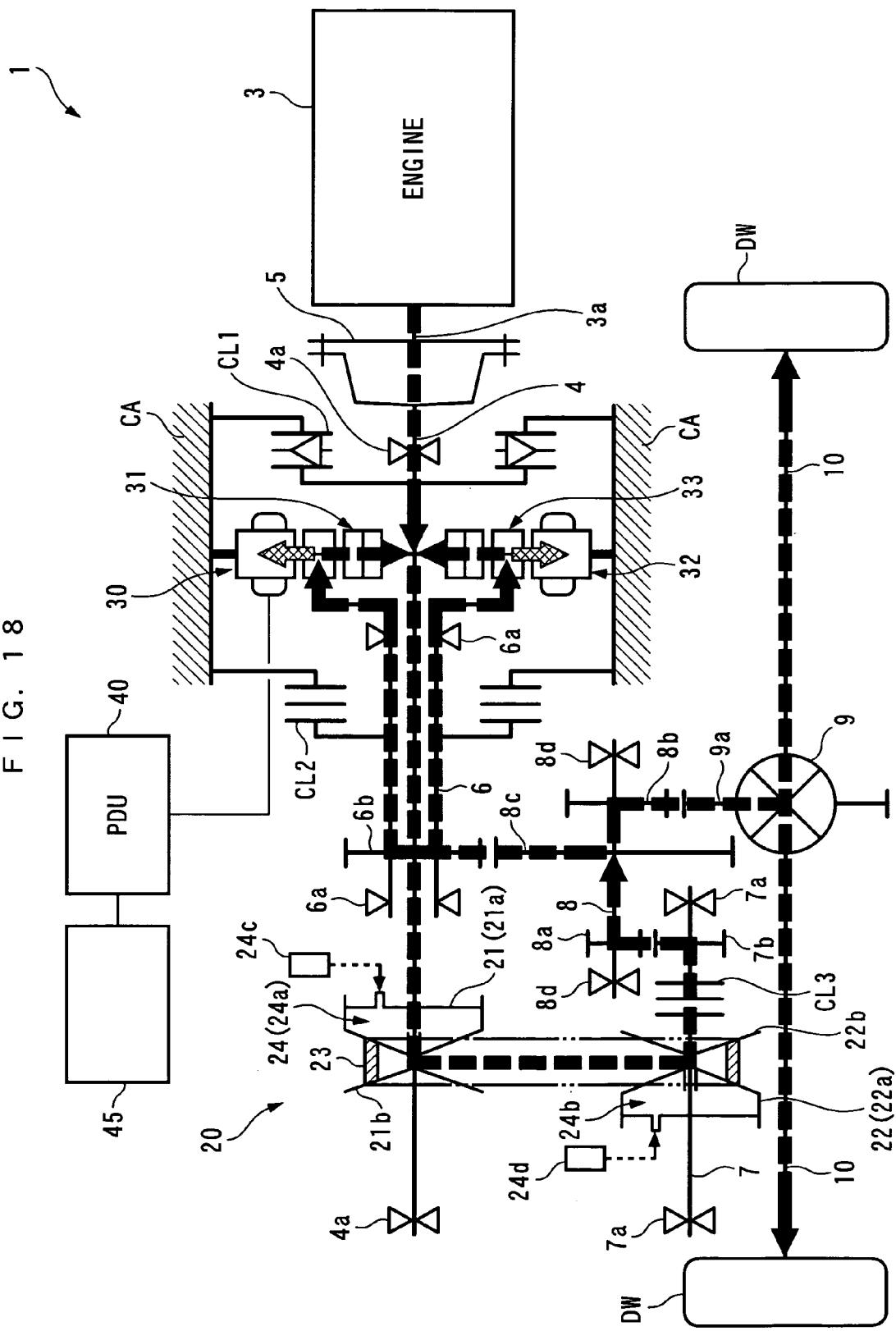
[FIG. 18] A diagram showing a state of transmission of torque in the power plant shown in FIG. 1 during drive-time electric power generation.

As described hereinabove using the equation (5), in the generator-motor 30, when the directions of the rotations of the first rotor 31, the second rotor 33, and the first and second rotating magnetic fields are identical to each other, during electric power generation, the second rotor transmission torque TR2 is divided at a distribution ratio of 1:1, and delivered as the power-generating equivalent torque TGE and the first rotor transmission torque TR1. Therefore, as shown in FIG. 18, during the drive-time electric power generation, as part of the torque of the engine 3 is transmitted to the stator 32 via the second rotor 33 as the power-generating equivalent torque TGE, part of the torque of the engine 3 is also transmitted to the first rotor 31 via the second rotor 33. That is, torque of the engine 3 transmitted to the second rotor 33 is distributed between the stator 32 and the first rotor 31 at a distribution ratio of 1:1.

Further, combined torque formed by combining torque distributed to the first rotor 31 as described above and the torque of the engine 3 is transmitted to the stepless transmission 20. Further, assuming that there is no change in speed by the gears, the torque transmitted to the drive wheels DW and DW has a magnitude equal to a value obtained by subtracting the part of the torque of the engine 3 transmitted to the second rotor 33 from the combined torque, that is, a value obtained by subtracting the power-generating equivalent torque TGE from the torque of the engine 3.

Further, during the drive-time electric power generation, the output of the engine 3, and electric power generated by the generator-motor 30 are controlled such that the optimum efficiency is obtained within the range within which the demanded torque PMCMD can be generated. Furthermore, the control of the transmission ratio RATIO of the stepless transmission 20 is carried out in the same manner as carried out during assist. This controls the speed relationship between the first and second rotors 31 and 33 in the same manner as carried out during assist such that the magnetic field rotation direction becomes identical to the direction of the rotations of the first and second rotors 31 and 33. In this, however, different maps from those used during assist are used for searching the target engine speed NECMD and the target magnetic field rotational speed VMFCMD.

Figure 19:
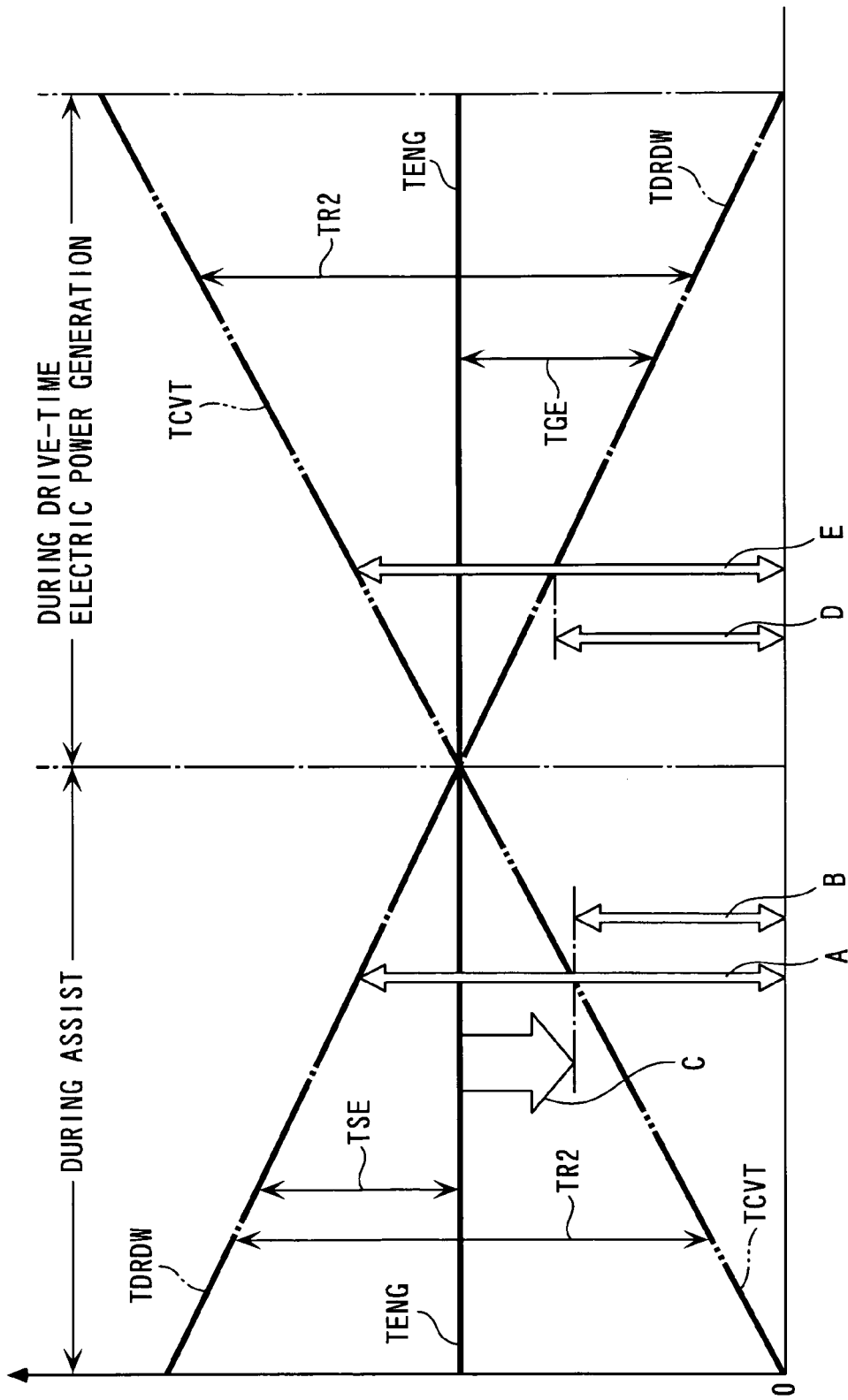
[FIG. 19] A diagram showing ratios of foot axis drive torque TDRDW, CVT transmission torque TCVT, and the like to engine torque TENG in the power plant shown in FIG. 1, when holding the engine torque TENG constant during assist and the drive-time electric power generation.

FIG. 19 is a diagram showing a ratio of the torque transmitted to the drive wheels DW and DW and the stepless transmission 20 to a torque TENG of the engine 3 (hereinafter referred to as the engine torque") generated by the combustion of the mixture supplied to the engine during assist and the drive-time electric power generation by the generator-motor 30, assuming that the engine torque TENG is constant. It should be noted that in FIG. 19, it is assumed that there is no change in speed by the gears. As shown in FIG. 19, during assist, torque TDRDW transmitted to the drive wheels DW and DW during assist (hereinafter referred to as "foot axis drive torque") is equal to the sum of the engine torque TENG and the driving equivalent torque TSE and becomes larger as the TSE value becomes larger.

Further, as described hereinbefore, as the driving equivalent torque TSE is transmitted to the second rotor 33, part of the engine torque TENG transmitted to the stepless transmission 20 is extracted and transmitted to the second rotor 33 (hereinafter, the torque extracted from the engine torque TENG is referred to as "the extracted torque"). Further, the extracted torque is equal to the driving equivalent torque TSE. Therefore, as shown in FIG. 19, the second rotor transmission torque TR2 becomes larger as the driving equivalent torque TSE is larger. Further, as the driving equivalent torque TSE is larger, the extracted torque becomes larger, so that a torque TCVT transmitted to the stepless transmission 20 (hereinafter referred to as "the CVT transmission torque") becomes smaller.

In FIG. 19, hollow arrows A and B represent the foot axis drive torque TDRDW and the CVT transmission torque TCVT at the maximum output of the vehicle, respectively. Assuming the stepless transmission 20 is directly connected to the engine 3, the engine torque TENG is directly transmitted to the stepless transmission 20. According to the present embodiment, however, it is possible to reduce the CVT transmission torque TCVT by the aforementioned extracted torque as represented by a hollow arrow C in FIG. 19.

Further, as shown in FIG. 19, during the drive-time electric power generation, the foot axis drive torque TDRDW has a magnitude equal to a value obtained by subtracting the power-generating equivalent torque TGE from the engine torque TENG, and as the power-generating equivalent torque TGE is larger, i.e. as the amount of generated electric power is larger, it becomes smaller. Further, as described hereinabove, the second rotor transmission torque TR2 is distributed to the stator 32 and the first rotor 31, and hence the second rotor transmission torque TR2 becomes larger as the power-generating equivalent torque TGE is larger. Further, since the combined torque formed by combining the torque distributed to the first rotor 31 and the engine torque TENG is transmitted to the stepless transmission 20, and as the power-generating equivalent torque TGE is larger, the torque distributed to the first rotor 31 becomes larger, the CVT transmission torque TCVT becomes larger as the power-generating equivalent torque TGE is larger. Further, hollow arrows D and E in FIG. 19 represent the foot axis drive torque TDRDW and the CVT transmission torque TCVT during the normal drive-time electric power generation.

Further, during the drive-time electric power generation, the power-generating equivalent torque TGE, i.e. the amount of generated electric power is controlled to be within the predetermine upper limit value. Further, as described hereinbefore, as is carried out when the demanded torque PMCMD is not higher than the upper limit PMEH of electric power that can be generated, and the PMEH value is configured such that the combined torque becomes slightly smaller than the upper limit of torque that can be transmitted by the stepless transmission 20 when the power-generating equivalent torque TGE is equal to the predetermined upper limit value. From the above, during execution of the drive-time electric power generation, it is possible to prevent the CVT transmission torque TCVT from exceeding the upper limit of torque, and hence it is possible to prevent failure of the stepless transmission 20 due to transmission of an excessively large torque.

Next, a description will be given of the operation during decelerating traveling of the vehicle, i.e. when the accelerator opening AP is approximately equal to 0, no power is demanded of the engine 3 nor the generator-motor 30, and the vehicle is traveling by inertia. Similarly to the operation at the start of the engine 3 and during the traveling of the vehicle, the electromagnetic brake CL2 is controlled to the OFF state, and at the same time the clutch CL3 is engaged. Further, the power from the drive wheels DW and DW transmitted to the second rotor 33 via the second power transmission path is converted into electric power and the generated electric power is supplied to the battery 45 to charge the same. Hereinafter, this electric power generation is referred to as "the deceleration-time electric power generation".

Figure 20:
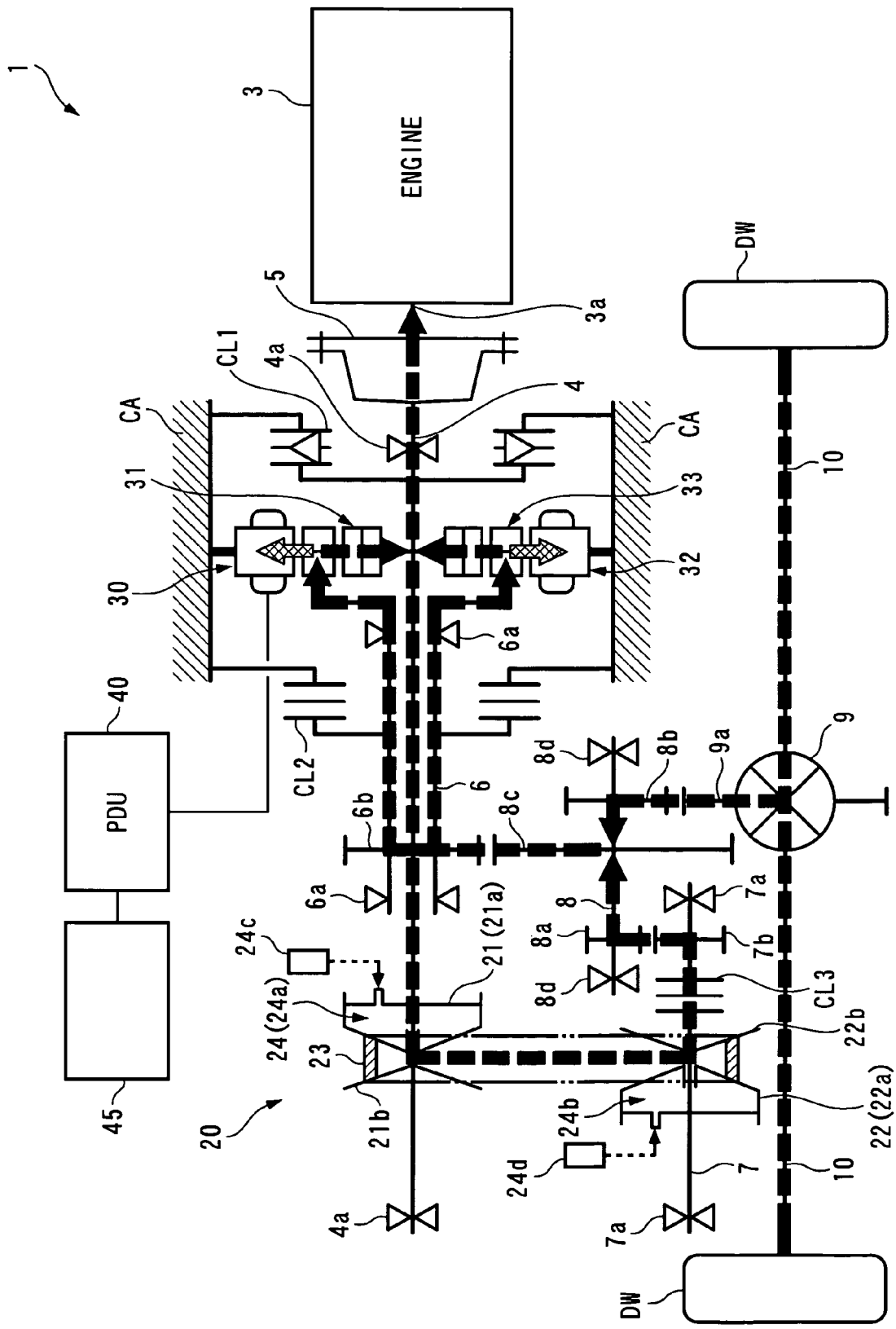
[FIG. 20] A diagram showing a state of transmission of torque in the power plant shown in FIG. 1 in the case where the ratio of the engine drive torque TDRENG to the foot axis input torque TDW is small during deceleration-time electric power generation.
Figure 21:
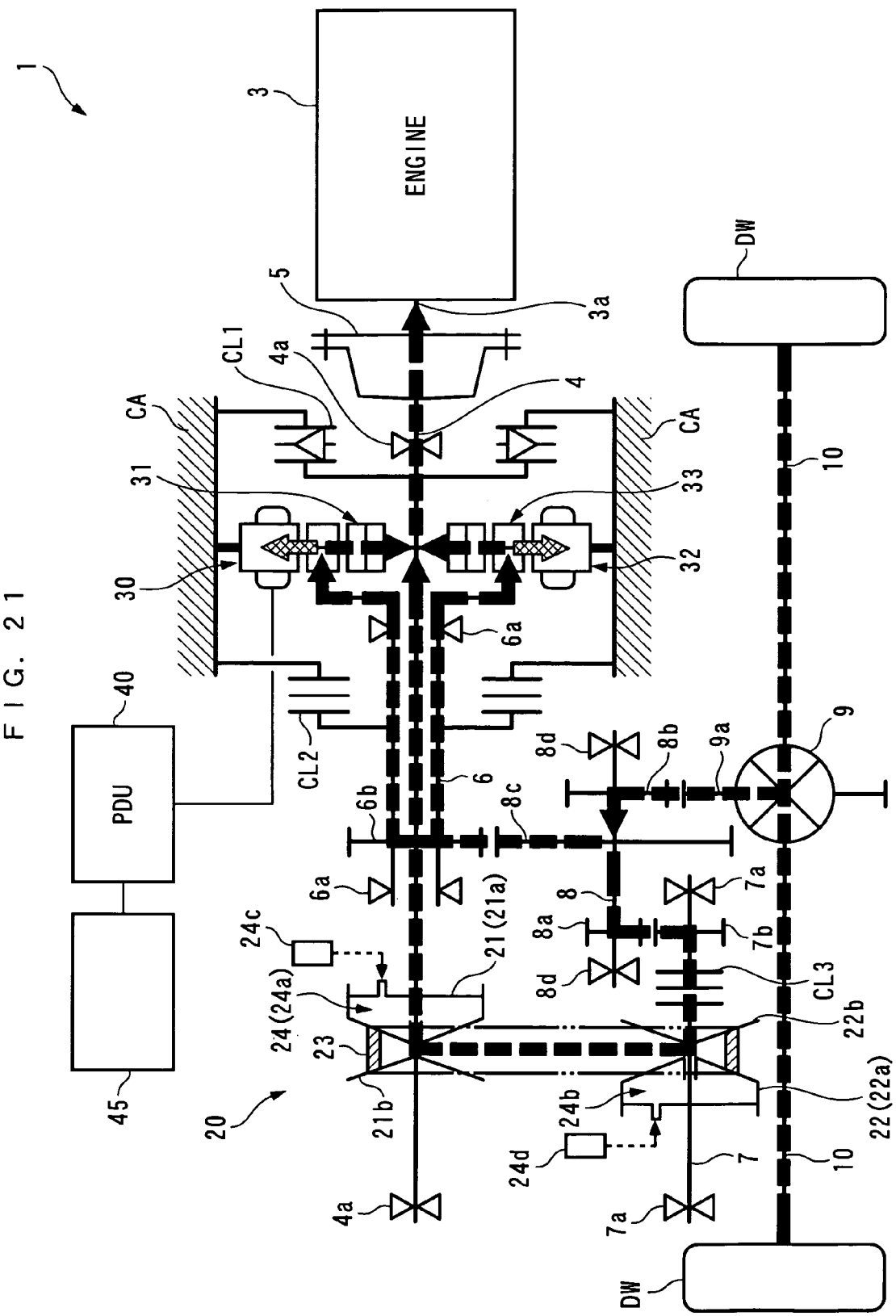
[FIG. 21] A diagram showing a state of transmission of torque in the power plant shown in FIG. 1 in the case where the ratio of the engine drive torque TDRENG to the foot axis input torque TDW is large during the deceleration-time electric power generation.

As shown in FIGS. 20 and 21, during the deceleration-time electric power generation, the torque of drive wheels DW and DW transmitted to the second rotor 33 is distributed to the stator 32 and the first rotor 31, similarly to the case of the above-described drive-time electric power generation. FIG. 20 shows a case in which the ratio of the torque of the drive wheels DW and DW transmitted to the engine 3 to the torque of the drive wheels DW and DW is small. In this case, as illustrated in the figure, all the torque TDW of the drive wheels DW and DW (hereinafter referred to as "the foot axis input torque") is transmitted to the second rotor 33 via the second power transmission path, and part of the torque distributed to the first rotor 31 via the second rotor 33 is further transmitted to the second rotor 33 via the first main shaft 4, the stepless transmission 20, the auxiliary shaft 7, the idler shaft 8, and the second main shaft 6, as described above. Thus, the combined torque formed by combining all the foot axis torque TDW and part of the torque distributed to the first rotor 31 is transmitted to the second rotor 33. Further, the torque remaining after being distributed to the first rotor 31 is transmitted to the engine 3 via the first main shaft 4. As a result, assuming that there is no change in speed by the gears, the sum of the power-generating equivalent torque TGE transmitted to the stator 32 and torque transmitted to the engine 3 becomes equal to the foot axis input torque TDW.

Further, in the case where the ratio (TDRENG/TDW) of the foot axis input torque TDW (hereinafter referred to as "the engine drive torque TDRENG") transmitted to the engine 3 to the foot axis input torque TDW is larger, part of the foot axis input torque TDW is transmitted to the second rotor 33 via the second power transmission path, and the remainder of the foot axis input torque TDW is transmitted to the first main shaft 4 via the auxiliary shaft 7 and the stepless transmission 20, as shown in FIG. 21. Further, the remainder of the foot axis input torque TDW transmitted to the first main shaft 4 is combined with the torque distributed to the first rotor 31, and then transmitted to the engine 3. As a consequence, assuming that there is no change in speed by the gears, the sum of the power-generating equivalent torque TGE transmitted to the stator 32 and torque transmitted to the engine 3 become equal to the foot axis input torque TDW. Further, the transmission ratio RATIO of the stepless transmission 20 is controlled in the same manner as during the above-described drive-time electric power generation such that the optimum efficiency of the generator-motor 30 is obtained, whereby the speed relationship between the first and second rotors 31 and 33 is controlled such that the magnetic field rotation direction becomes identical to the direction of the rotations of the first and second rotors 31 and 33.

Figure 22:
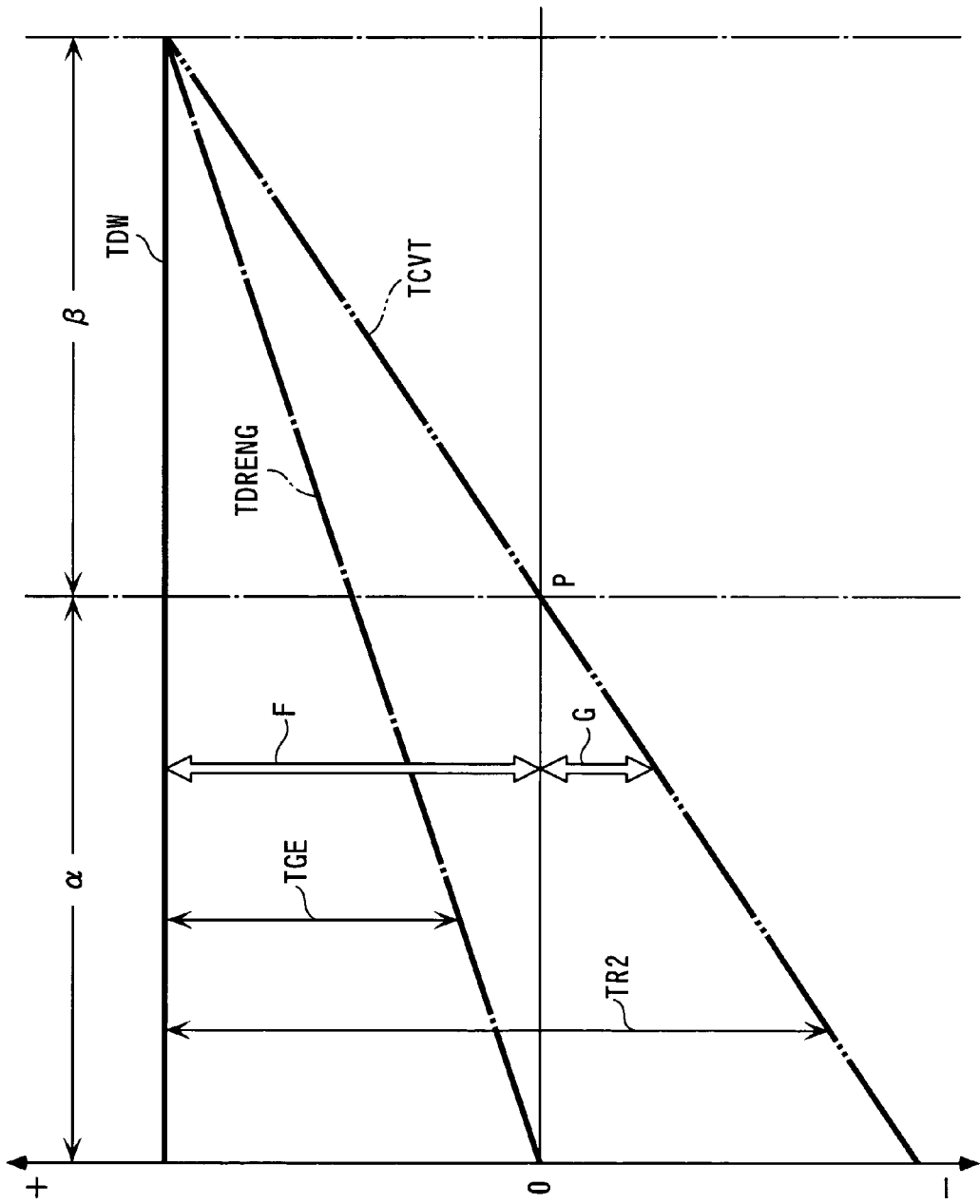
[FIG. 22] A diagram showing ratios of the TDRENG, the CVT transmission torque TCVT, and the like to the foot axis input torque TDW in the power plant shown in FIG. 1, while holding the foot axis input torque TDW constant during the deceleration-time electric power generation.

FIG. 22 shows ratios of the engine drive torque TDRENG and the CVT transmission torque TCVT to the foot axis input torque TDW, assuming that the foot axis input torque TDW is constant during the deceleration-time electric power generation. In FIG. 22, a region α represents the case where the ratio of the engine drive torque TDRENG to the foot axis input torque TDW is small, and a combined torque formed by combining all of the foot axis input torque TDW and part of torque distributed to the first rotor 31 is transmitted to the second rotor 33, as described above. Further, a region β represents the case where the ratio of the engine drive torque TDRENG to the foot axis input torque TDW is large, and part of the foot axis input torque TDW is transmitted to the second rotor 33, as described above. It should be noted that in FIG. 22 as well, it is assumed that there is no change in speed by the gears.

As shown in FIG. 22, the power-generating equivalent torque TGE is equal to the difference between the foot axis input torque TDW and the engine drive torque TDRENG, and becomes smaller as the engine drive torque TDRENG is larger. Further, similarly to the case of the above-described drive-time electric power generation, as the power-generating equivalent torque TGE is larger, the second rotor transmission torque TR2 becomes larger. Further, in the region α in FIG. 22, as described above, part of torque distributed to the first rotor 31 is transmitted to the stepless transmission 20, and hence as the part of torque distributed to the first rotor 31 is larger, i.e. as the power-generating equivalent torque TGE is larger, the CVT transmission torque TCVT becomes larger. In this case, from the first rotor 31, i.e. from the engine 3 side, the torque is transmitted to the stepless transmission 20, and to indicate this, the CVT transmission torque TCVT is indicated by negative values.

Further, in the region β in FIG. 22, as described hereinabove, part and the remainder of the foot axis input torque TDW are transmitted to the second rotor 33 and the stepless transmission 20, respectively, and hence as the power-generating equivalent torque TGE is larger, and as the second rotor transmission torque TR2 is larger, the CVT transmission torque TCVT becomes smaller. Further, when the second rotor transmission torque TR2 is equal to the foot axis input torque TDW (point P in FIG. 22), the CVT transmission torque TCVT becomes equal to 0. Further, hollow arrows F and G in FIG. 22 represent the foot axis input torque TDW and the CVT transmission torque TCVT, during the normal deceleration-time electric power generation, respectively.

Figure 23:
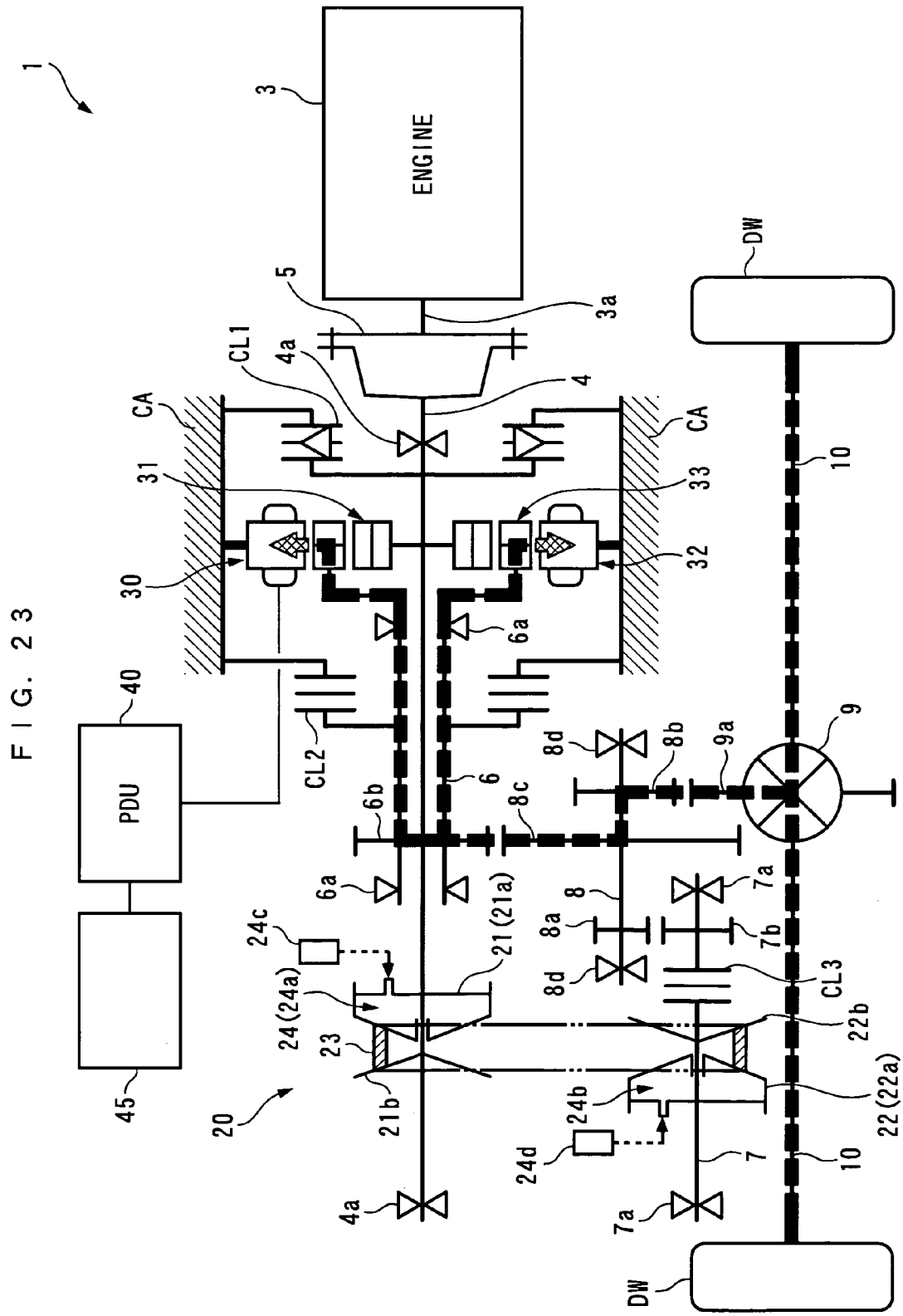
[FIG. 23] A diagram showing a state of transmission of torque in the power plant shown in FIG. 1 in the case where a clutch is disengaged and the engine speed is controlled to 0 during the deceleration-time electric power generation.

Further, the deceleration-time electric power generation may be carried out in the following manner: The clutch CL3 is disengaged, and at the same time, the first rotor 31 is held unrotatable by a lock mechanism (not shown) formed e.g. by an electromagnetic brake or a handbrake, whereby the first rotor rotational speed VR1 is held at 0. In this state, using the power from the drive wheels DW and DW, the generator-motor 30 may perform electric power generation. This makes it possible, as shown in FIG. 23, to transmit all the foot axis input torque TDW to the second rotor 33 via the second power transmission path without via the stepless transmission 20, and convert all the power from the drive wheels DW and DW into electric power, i.e. generate electric power.

Figure 24:
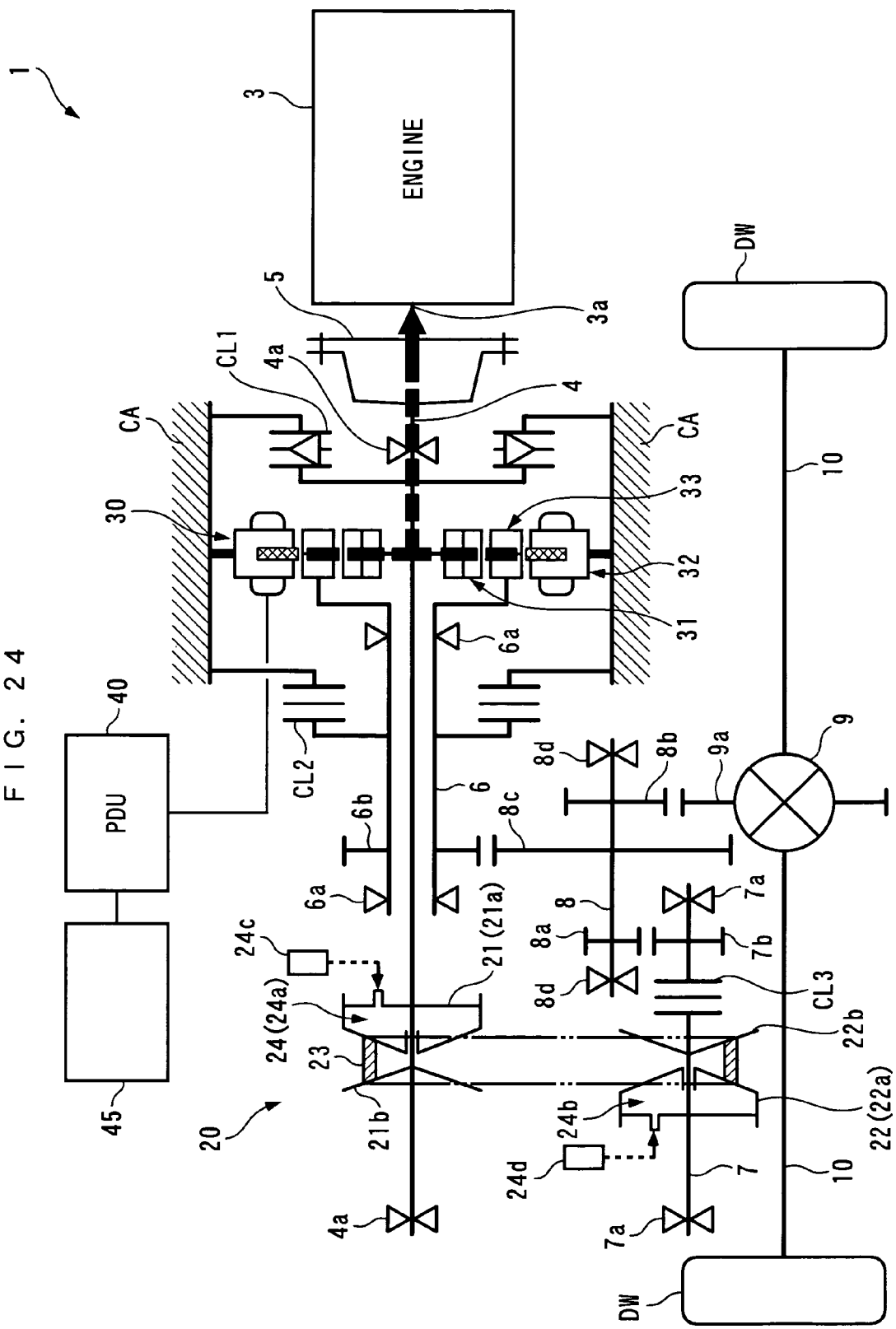
[FIG. 24] A diagram showing a state of transmission of torque in the power plant shown in FIG. 1, at the ENG start during stoppage of the vehicle.
Figure 25:
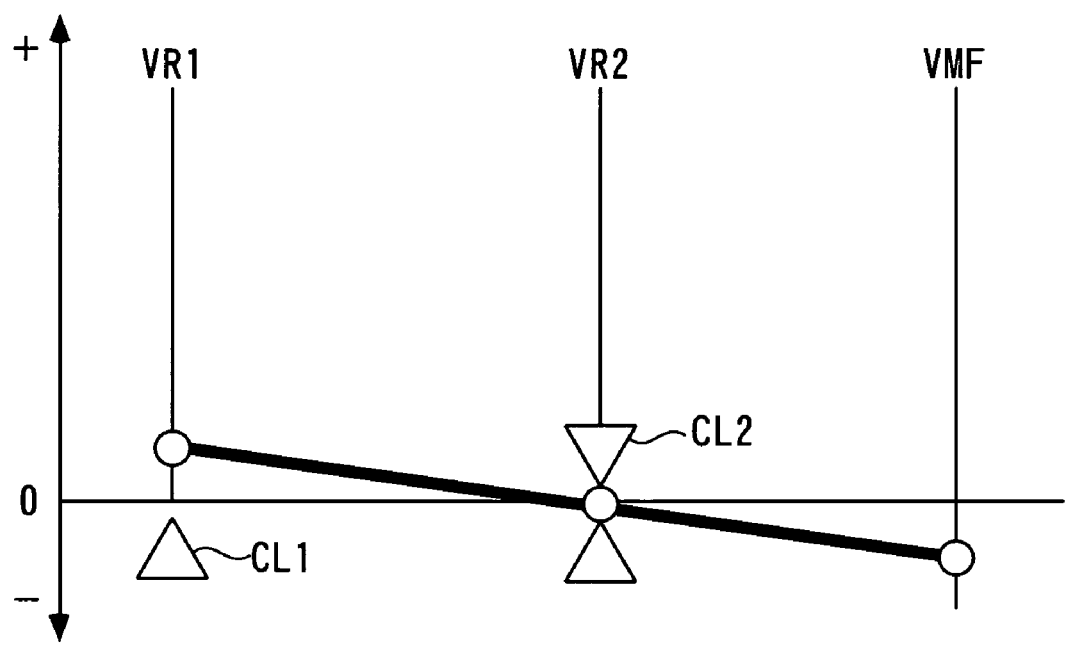
[FIG. 25] A speed diagram showing an example of magnetic field rotational speed VMF, and the first and second rotor rotational speeds VR1 and VR2 in the power plant shown in FIG. 1, at the ENG start during stoppage of the vehicle.

Furthermore, instead of by the above-described methods, the starting of the engine 3, the creeping operation, and the starting of the vehicle may be executed by the following methods: First, a description will be given of the starting of the engine 3 during stoppage of the vehicle. Specifically, differently from the above-described case of the ENG start during EV traveling, the electromagnetic brake CL2 is controlled to the ON state to thereby hold the second rotor 33 unrotatable, and the clutch CL3 is disengaged to disconnect between the first rotor 31 and the drive wheels DW and DW, while supplying electric power to the stator 32. As described hereinabove using the equation (3), the torque having the same magnitude as that of the driving equivalent torque TSE is transmitted to the first rotor 31, and further, as shown in FIG. 24, it is transmitted to the crankshaft 3a via the first main shaft 4. In this case, as shown in FIG. 25, the first and second rotating magnetic fields are caused to rotate in a direction reverse to the direction of rotation of the crankshaft 3a. From the above, as shown in the figure, the first rotor 31 is caused to rotate together with the crankshaft 3a in the same direction as the direction of rotation of the crankshaft 3a in a state where the second rotor rotational speed VR2 is equal to 0, i.e. in a state where the drive wheels DW and DW are at rest. In this state, the fuel injection valves and the spark plugs of the engine 3 are controlled to thereby control the starting of the engine 3. Hereinafter, the above starting of the engine 3 will be referred to as "the ENG start during stoppage of the vehicle".

The operation during the creeping operation of the vehicle is carried out subsequent to the above-described ENG start during stoppage of the vehicle in the following manner: The electromagnetic brake CL2 is controlled to the OFF state to make the second rotor 33 rotatable, and while disengaging the clutch CL3, part of the power from the engine 3 transmitted to the first rotor 31 is converted into electric power to thereby generate electric power.

Figure 26:
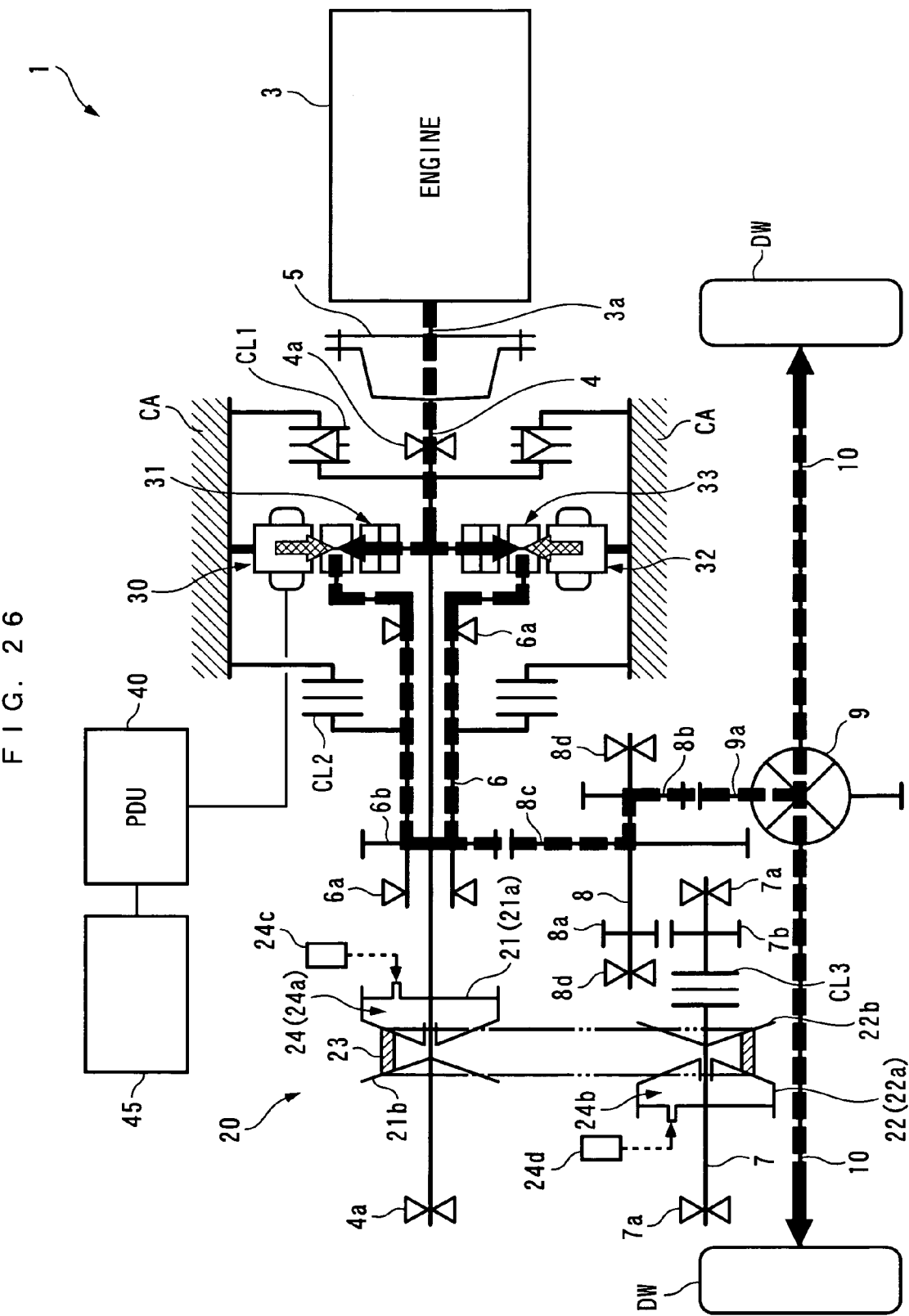
[FIG. 26] A diagram showing a state of transmission of torque in the power plant shown in FIG. 1, during ENG creep operation.

Along with the electric power generation, the power-generating equivalent torque TGE is transmitted from the stator 32 to the second rotor 33. In this case, the first and second rotating magnetic fields rotate in a direction reverse to the direction of rotation of the first rotor 31 (see a speed diagram of a broken line in FIG. 27), and hence the power-generating equivalent torque TGE acts to cause the second rotor 33 to rotate in the same direction as the first rotor 31. Further, as shown in FIG. 26, part of the engine torque TENG is further transmitted to the second rotor 33 via the first rotor 31 such that it is balanced with the above-mentioned power-generating equivalent torque TGE. Further, the ratio of these torques transmitted to the second rotor 33 is combined at a combining ratio of 1:1, and then the combined torque is transmitted to the drive wheels DW and DW via the second power transmission path to act on the drive wheels DW and DW in a manner causing them to rotate in the normal direction. Further, the amount of generated electric power is controlled such the second rotor rotational speed VR2 becomes very small, whereby the creep operation is performed. Hereinafter, the above-described creep operation using the power from the engine 3 will be referred to as "the ENG creep operation".

As described above, in the ENG creep operation, part of the engine torque TENG is transmitted to the drive wheels DW and DW, which makes it possible to prevent the large reaction from the drive wheels DW and DW from acting on the engine 3, and therefore, it is possible to perform the creep operation without causing engine stall. It should be noted that the above-described ENG creep operation is mainly carried out when the remaining charge SOC is small or when ascending a slope. The ENG creep operation is also carried out during stoppage of the vehicle after the decelerating traveling thereof.

The operation at the start of the vehicle is carried out subsequent to the above-described ENG creep operation in the following manner: The electromagnetic brake CL2 and the clutch CL3 are controlled similarly to the above-described ENG creep operation, and at the same time the amount of electric power generated by the generator-motor 30 is progressively increased to thereby progressively increase the power-generating equivalent torque TGE, and at the same time control the magnetic field rotational speed VMF of the first and second rotating magnetic fields rotating in a direction reverse to the direction of rotation of the first rotor 31 to 0. It should be noted that when the magnetic field rotational speed VMF is equal to 0, the power (energy) of the engine 3 is not transmitted to the stator 32, as described above, but is all transmitted to the second rotor 33, and further to the drive wheels DW and DW via the second power transmission path.

Figure 27:
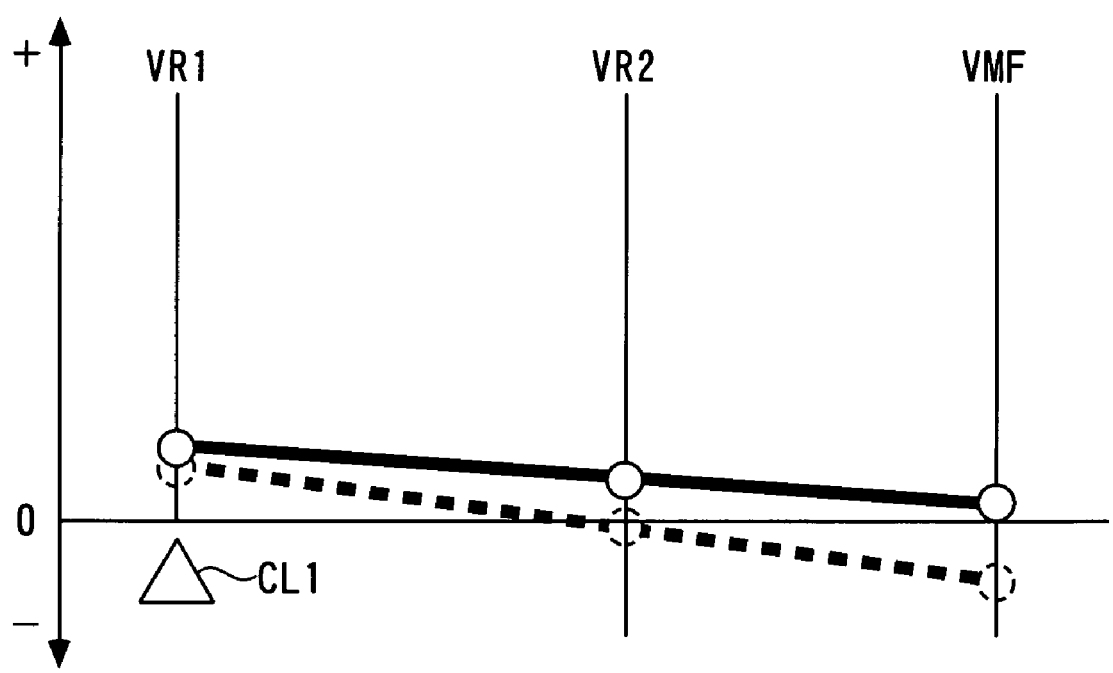
[FIG. 27] A speed diagram showing an example of the magnetic field rotational speed VMF, and the first and second rotor rotational speeds VR1 and VR2 in the power plant shown in FIG. 1, at an ENG-driven standing start.
Figure 28:
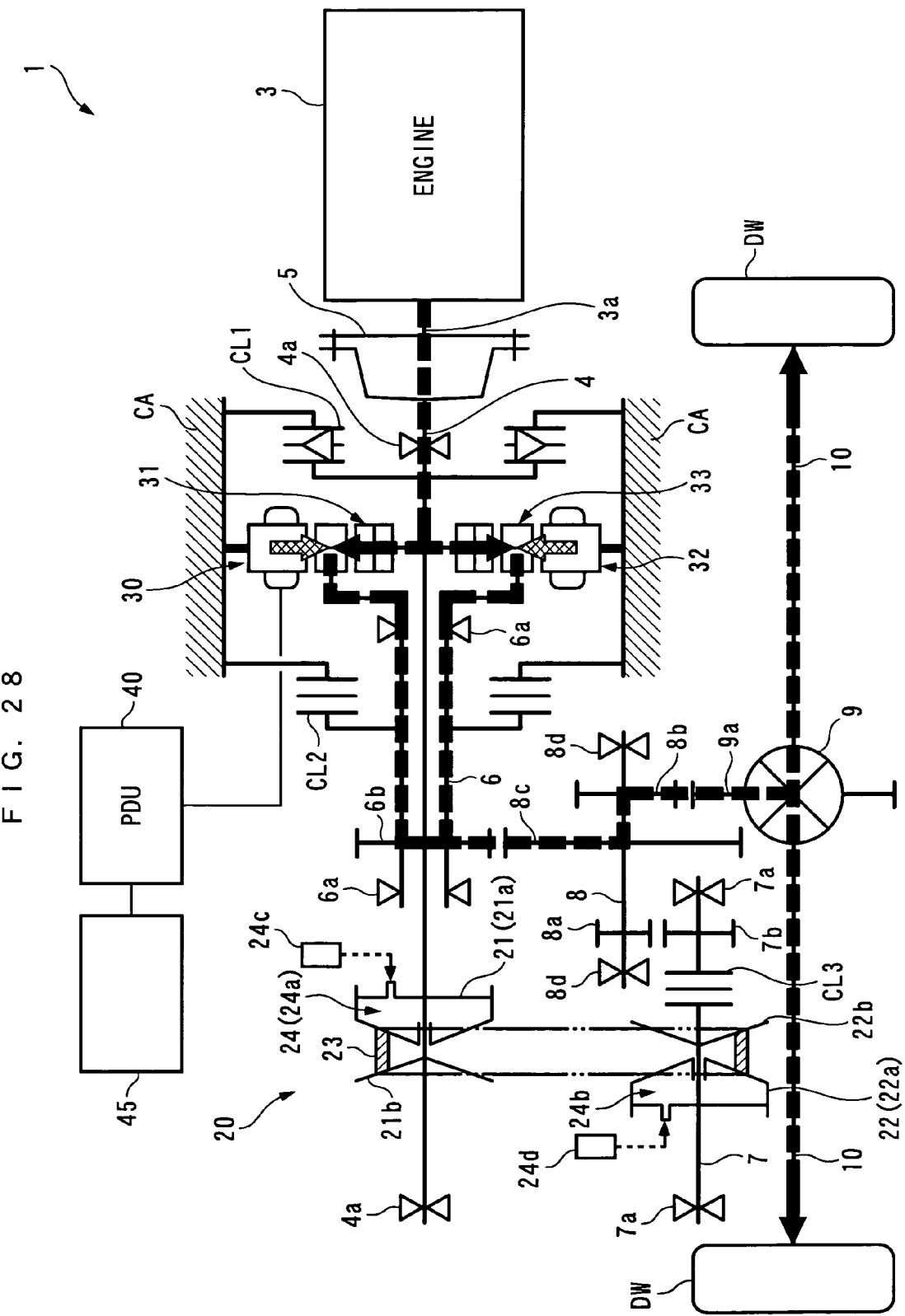
[FIG. 28] A diagram showing a state of transmission of torque in the power plant shown in FIG. 1, at the ENG-driven standing start.

Then, when the magnetic field rotational speed VMF becomes equal to 0, the electric power is supplied to the generator-motor 30, and the first and second rotating magnetic fields are caused to rotate in the same direction as the direction of rotation of the first rotor 31 (see a solid line in FIG. 27). As a result, as shown in FIG. 28, the driving equivalent torque TSE and the engine torque TENG are combined by the second rotor 33, and then the combined torque is transmitted to the drive wheels DW and DW via the second power transmission path. In this case, the driving equivalent torque TSE, i.e. the electric power supplied to the stator 32 and the magnetic field rotational speed VMF are controlled such that it increases progressively, and at the same time becomes equal to the engine torque TENG. From the above, as shown in the solid line in FIG. 27, the second rotor rotational speed VR2 rises from the state having been equal to 0 (broken line in FIG. 28), and the rotational speed of the drive wheels DW and DW connected to the second rotor 33, i.e. the vehicle speed VP also increases to cause the vehicle to make a standing start. Then, after the vehicle speed VP has appropriately increased, by controlling the transmission ratio RATIO of the stepless transmission 20, the rotational speeds of the input shaft and output shaft of the clutch CL3 are controlled such that they become equal to each other. In this state, the clutch CL3 is engaged, to perform the above-described operation during traveling of the vehicle. Hereinafter, the above-described standing start of the vehicle using the power from the engine 3 will be referred to as "the ENG-driven standing start".

As described hereinabove, at the ENG-driven standing start, the power-generating equivalent torque TGE and the driving equivalent torque TSE are progressively increased, respectively, which progressively increases torque transmitted from the engine 3 to the drive wheels DW and DW via the first and second rotors 31 and 33. This makes it possible to prevent the large reaction from the drive wheels DW and DW from acting on the engine 3, and therefore, it is possible to start the vehicle without causing engine stall.

As described heretofore, according to the present embodiment, differently from the conventional power plant, the engine 3 is connected to the drive wheels DW and DW via the first rotor 31 and the first power transmission path without via the planetary gear unit, and hence it is possible to completely avoid power transmission loss at the planetary gear unit, and thereby increase the driving efficiency of the engine 3 in driving the drive wheels DW and DW. Further, during assist by the generator-motor 30, power corresponding to the above-described extracted torque can be transmitted to the drive wheels DW and DW without via the stepless transmission 20, and hence it is possible to suppress power transmission loss at the stepless transmission 20 to thereby increase the driving efficiency of the power plant 1 in its entirety. Further, it is possible to reduce the CVT transmission torque TCVT, by torque corresponding to the extracted torque, and hence, by employing a stepless transmission adapted to the reduced CVT transmission torque TCVT, it is possible to make the efficiency of the stepless transmission 20 higher and the size thereof smaller, which in turn makes it possible to make the driving efficiency of the power plant 1 still higher in its entirety and the size thereof smaller.

Further, both the first and second rotors 31 and 33 of the generator-motor 30 are connected, differently from the conventional power plant, to the drive wheels DW and DW without via the planetary gear unit, which prevents occurrence of power transmission loss at the planetary gear unit. Therefore, it is possible to increase both the driving efficiency of the generator-motor 30 in driving the drive wheels DW and DW and the electric power-generating efficiency of the generator-motor 30 in generating electric power using the drive wheels DW and DW. Further, by performing the transmission of power between the generator-motor 30 and the drive wheels DW and DW without via the stepless transmission 20, but via the second rotor 33 connected to the drive wheels DW and DW, it is possible to suppress power transmission loss at the stepless transmission 20, compared with the conventional cases in which the power transmission is necessarily performed via the transmission. Therefore, it is possible to further increases the driving efficiency and the electric power-generating efficiency of the generator-motor 30.

For example, as already described with reference to FIGS. 13 and 23, during the use of only the generator-motor 30 as a drive source, or during the deceleration-time electric power generation, by disengaging the clutch CL3, the power transmission between the generator-motor 30 and the drive wheels DW and DW can be carried out only via the second power transmission path and the second rotor 33, i.e. completely without via the stepless transmission 20. Therefore, it is possible to completely prevent power transmission loss at the stepless transmission 20, and further increase the driving efficiency and the electric power-generating efficiency of the generator-motor 30. Further, during the drive-time electric power generation by at the generator-motor 30 using part of the power from the engine 3, differently from the conventional cases using the planetary gear unit, it is possible to increase the electric power-generating efficiency without causing the power transmission loss at the planetary gear unit.

Furthermore, at the ENG-driven standing start, by disengaging the clutch CL3, and controlling the generated electric power and the supplied electric power, torque transmitted from the engine 3 to the drive wheels DW and DW via the first and second rotors 31 and 33 is progressively increased, so that it is possible to start the vehicle without causing engine stall. This makes it possible to connect between the engine 3 and the drive wheels DW and DW without using a friction start clutch. Further, after the start of the vehicle, the clutch CL3 is engaged in the state where by controlling the transmission ratio "ratio", the rotational speeds of the input shaft and output shaft of the clutch CL3 are controlled such that they become equal to each other. Therefore, when the above-described ENG start during EV traveling is performed not by engaging the clutch CL3 but by using a starter (not shown), an ON/OFF-type clutch such as a dog tooth-type clutch, which requires smaller energy for operation, can be used as the clutch CL3 in place of the friction clutch. In this case, it is possible to enhance the fuel economy of the engine 3, compared with a case where the power from the engine 3 is converted into oil pressure or the like for use as a drive source of the friction start clutch.

Further, during assist, the transmission ratio RATIO of the stepless transmission 20 is controlled such that the engine speed NE and the magnetic field rotational speed VMF become equal to the NECMD value and the VMFCMD value which are set to enable the optimum efficiencies of the engine 3 and the generator-motor 30 to be obtained. This makes it possible to drive the drive wheels DW and DW while controlling the outputs from the engine 3 and the generator-motor 30 such that the optimum efficiencies thereof can be obtained. Therefore, it is possible to increase the driving efficiency of the power plant 1 as a whole.

Furthermore, during the EV creep operation or EV traveling, the one-way clutch CL1 and the casing CA inhibit the rotation of the first rotor 31 so as to inhibit the reverse rotation of the crankshaft 3a, and the clutch CL3 disconnects between the first rotor 31 and the drive wheels DW and DW. Therefore, as described hereinabove with reference to FIGS. 13 and 14, it is possible to properly drive the drive wheels DW and DW using the power from the generator-motor 30 without dragging the engine 3, while inhibiting the reverse rotation of the crankshaft 3a.

Further, as described with reference to FIGS. 24 and 25, the second rotor 33 is held unrotatable by the electromagnetic brake CL2, and the first rotor 31 and the drive wheels DW and DW are disconnected from each other by the clutch CL3. Further, the first and second rotating magnetic fields are caused to rotate in a direction reverse to the direction of rotation of the crankshaft 3a. This makes it possible to cause the crankshaft 3a to rotate in the normal direction without driving the drive wheels DW and DW, which in turn makes it possible to start the engine 3.

Further, compared with the conventional cases using the planetary gear unit, it is possible to simplify the construction, and accurately control the vehicle speed VP without being affected by the backlash between teeth of the gears.

Figure 29:
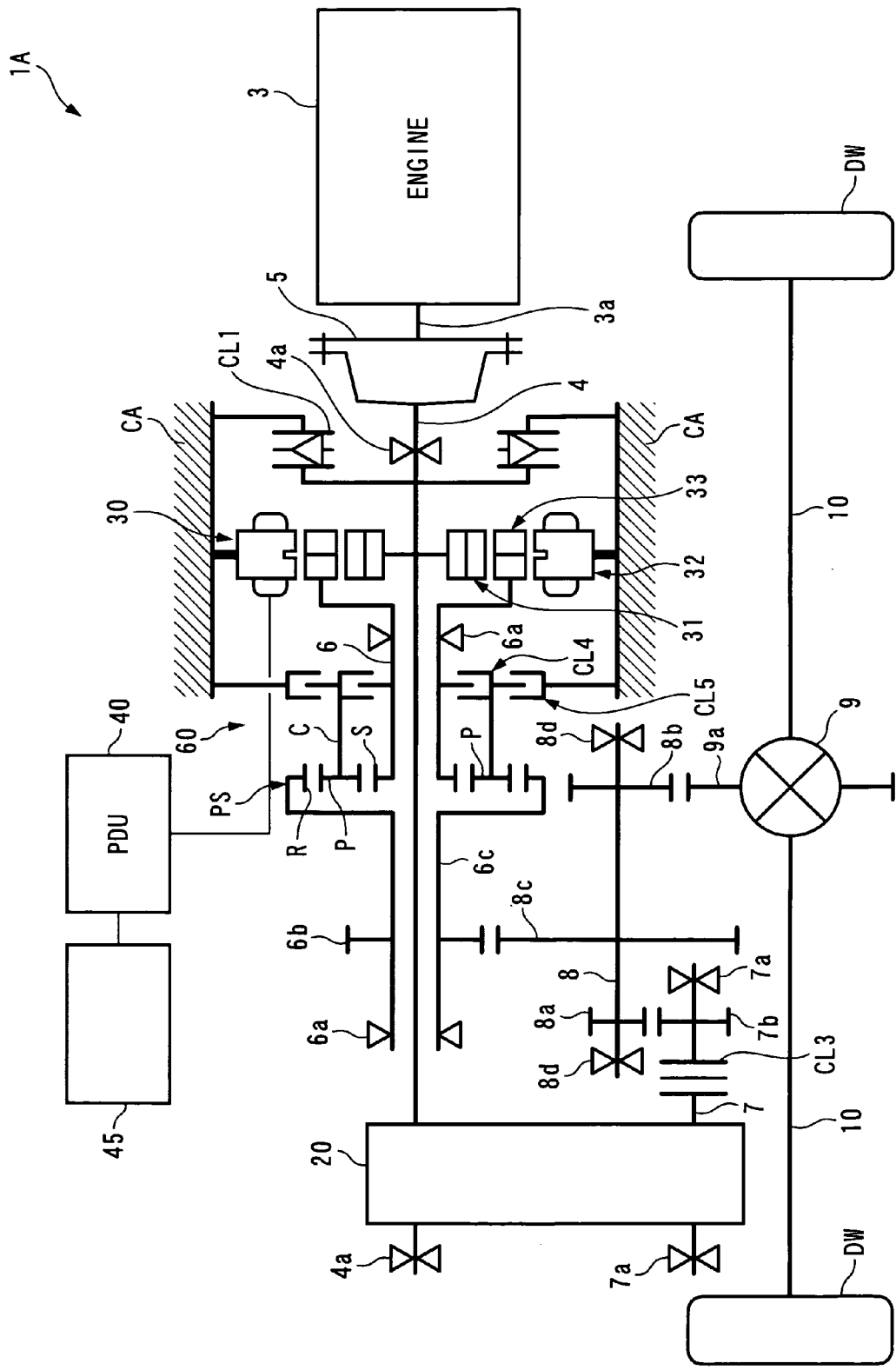
[FIG. 29] A schematic diagram of a power plant according to a second embodiment.

Next, a power plant 1A according to a second embodiment of the present invention will be described with reference to FIG. 29. The power plant 1A is distinguished from the power plant 1 according to the first embodiment mainly in that the power plant 1A further includes a normal/reverse rotation-switching mechanism 60. In FIG. 29, the component elements identical to those of the first embodiment are denoted by the same reference numerals. It should be noted that in the figure, the stepless transmission 20 is shown in a simplified manner for convenience. This also applies to the other figures, referred to hereinafter. The following description is mainly given of different points from the first embodiment.

The above-described normal/reverse rotation-switching mechanism 60 includes a planetary gear unit PS, a clutch CL4 (second clutch, second rotor lock mechanism), and an electromagnetic brake CL5 (carrier lock mechanism, second rotor lock mechanism). The planetary gear unit PS is comprised of a sun gear S, a ring gear R disposed on an outer periphery of the sun gear S, a plurality of (e.g. three) planetary gears P (only two of which are shown) in mesh with the gears S and R, a carrier C rotatably supporting the planetary gears P, and so forth. The sun gear S is fixed to the aforementioned second main shaft 6, and is rotatable in unison with the second main shaft 6. Further, the above-described ring gear R is fixed to a third main shaft 6c via a flange having an annular plate-shape. The third main shaft 6c is formed to be hollow, and is disposed concentrically with the second main shaft 6 and in a rotatable manner. The aforementioned first main shaft 4 is concentrically and rotatably fitted in the third main shaft 6c. With the above arrangement, the ring gear R is rotatable in unison with the third main shaft 6c. Further, differently from the first embodiment, the aforementioned electromagnetic brake CL2 is not provided, and the aforementioned gear 6b is not fixed to the second main shaft 6 but to the third main shaft 6c.

With the above arrangement, the sun gear S is connected to the second rotor 33 via the second main shaft 6, and the ring gear R is connected to the drive wheels DW and DW via the third main shaft 6c, the idler shaft 8, the differential gear mechanism 9, and so forth. That is, the second rotor 33 is mechanically connected to the drive wheels DW and DW via the second main shaft 6, the planetary gear unit PS, the third main shaft 6c, the gear 6b, the third idler gear 8c, the idler shaft 8, the second idler gear 8b, the gear 9a, the differential gear mechanism 9, and the drive shafts 10 and 10. In the present embodiment, a sequence of the component elements from the second main shaft 6 to the drive shafts 10 and 10 correspond to the second power transmission path.

The clutch CL4 is an electromagnetic clutch, for example. The degree of engagement of the clutch CL4 is controlled by the ECU 2, whereby the connection between the carrier C and the second main shaft 6, i.e. between the carrier C and the sun gear S is established and interrupted. The electromagnetic brake CL5 is turned on or off by the ECU 2. In its ON state, the electromagnetic brake CL5 holds the carrier C in an unrotatable state, whereas in the OFF state, the electromagnetic brake CL5 allows the rotation of the carrier C.

In the power plant 1A configured as above, similarly to the first embodiment, operations, such as the EV standing start and the ENG-driven standing start, are performed. Further, to cause forward travel of the vehicle, the clutch CL4 is engaged to thereby connect between the carrier C and the sun gear S, and at the same time the electromagnetic brake CL5 is controlled to the OFF state to thereby allows the rotation of the carrier C. In this state, when the operations, such as the EV standing start and the ENG-driven standing start, are performed as described hereinabove, the power transmitted to the second rotor 33 is transmitted to the ring gear R via the sun gear S, the carrier C, and the planetary gears P, and accordingly the sun gear S, the carrier C, and the ring gear R rotate in unison with the second rotor 33. Further, the power transmitted to the ring gear R is transmitted to the drive wheels DW and DW via the third main shaft 6c, the differential gear mechanism 9, and so forth. As a consequence, the drive wheels DW and DW rotate in the normal direction to cause forward travel of the vehicle.

On the other hand, to cause reverse travel of the vehicle, the clutch CL4 is disengaged to thereby disconnect between the carrier C and the sun gear S, and the electromagnetic brake CL5 is controlled to the ON state, to thereby hold the carrier C unrotatable, and hold the clutch CL3 in a disengaged state. In this state, when the operations, such as the EV standing start and the ENG-driven standing start, are performed as described above, the power transmitted to the second rotor 33 is transmitted to the ring gear R via the sun gear S and the planetary gears P. As described above, since the carrier C is held unrotatable, the ring gear R rotates in a reverse direction with respect to the sun gear S, i.e. the second rotor 33. Further, the power transmitted to the ring gear R is transmitted to the drive wheels DW and DW via the third main shaft 6c, etc. As a consequence, the drive wheels DW and DW rotate in the reverse direction to cause reverse travel of the vehicle. In this case, as is apparent from the characteristics of the planetary gear unit PS, torque transmitted to the sun gear S is transmitted to the ring gear R in an increased state.

When the above-described reverse travel of the vehicle is performed using the power from the engine 3, if the remaining charge SOC is smaller than the aforementioned first predetermined value SOCL, the engine speed NE is increased such that the first and second rotating magnetic fields rotate in a direction reverse to the direction of rotation of the first rotor 31, and electric power generation is performed by the generator-motor 30 to charge the battery 45 with the generated electric power. Thus, as is apparent from the operation during the ENG creep operation already described with reference to FIGS. 26 and 27, it is possible to cause reverse travel of the vehicle while charging the battery 45.

It should be noted that in the present embodiment, when the ENG start during stoppage of the vehicle, already described with reference to FIG. 24, is performed, the second rotor 33 is held unrotatable in the following manner: The electromagnetic brake CL5 is controlled to the ON state, to thereby hold the carrier C unrotatable, and the clutch CL4 is engaged to thereby connect between the carrier C and the second main shaft 6, i.e. between the carrier C and the second rotor 33. This holds the second rotor 33 unrotatable together with the carrier C.

As described above, the clutch CL4 and the electromagnetic brake CL5 of the normal/reverse rotation-switching mechanism 60 can be used in combination, as the second rotor lock mechanism which holds the second rotor 33 unrotatable. Therefore, compared with a case where the clutch CL4 and the electromagnetic brake CL5 are separately provided without using them in combination, it is possible to reduce the number of component parts of the power plant 1A, which in turn makes it possible to attain the reduction of the size and costs thereof.

As described above, according to the present embodiment, it is possible not only to obtain the same effects as obtained by the first embodiment but also to selectively cause the normal and reverse rotations of the drive wheels DW and DW, i.e. the forward or reverse travel of the vehicle, using the power from the rotor 33, by the normal/reverse rotation-switching mechanism 60 having a simple construction formed by the planetary gear unit PS, the clutch CL4, and the electromagnetic brake CL5. In this case, as is clear from the operation at the ENG-driven standing start, already described as to the first embodiment, it is possible to transmit the power from the engine 3 to the drive wheels DW and DW without using the friction start clutch, to thereby cause the forward or reverse travel of the vehicle at a stop without causing engine stall. Further, during forward travel of the vehicle, the sun gear S, the carrier C, and the ring gear R rotate in unison, and hence it is possible to transmit the power to the drive wheels DW and DW without causing power transmission loss in the planetary gear unit PS due to meshing of the gears. It should be noted that when the clutch CL3 is engaged, and the sun gear S, the carrier C, and the ring gear R are rotating in unison, the planetary gear unit PS and the drive wheels DW and DW may be connected to each other such that the vehicle travels in the reverse direction.

Figure 30:
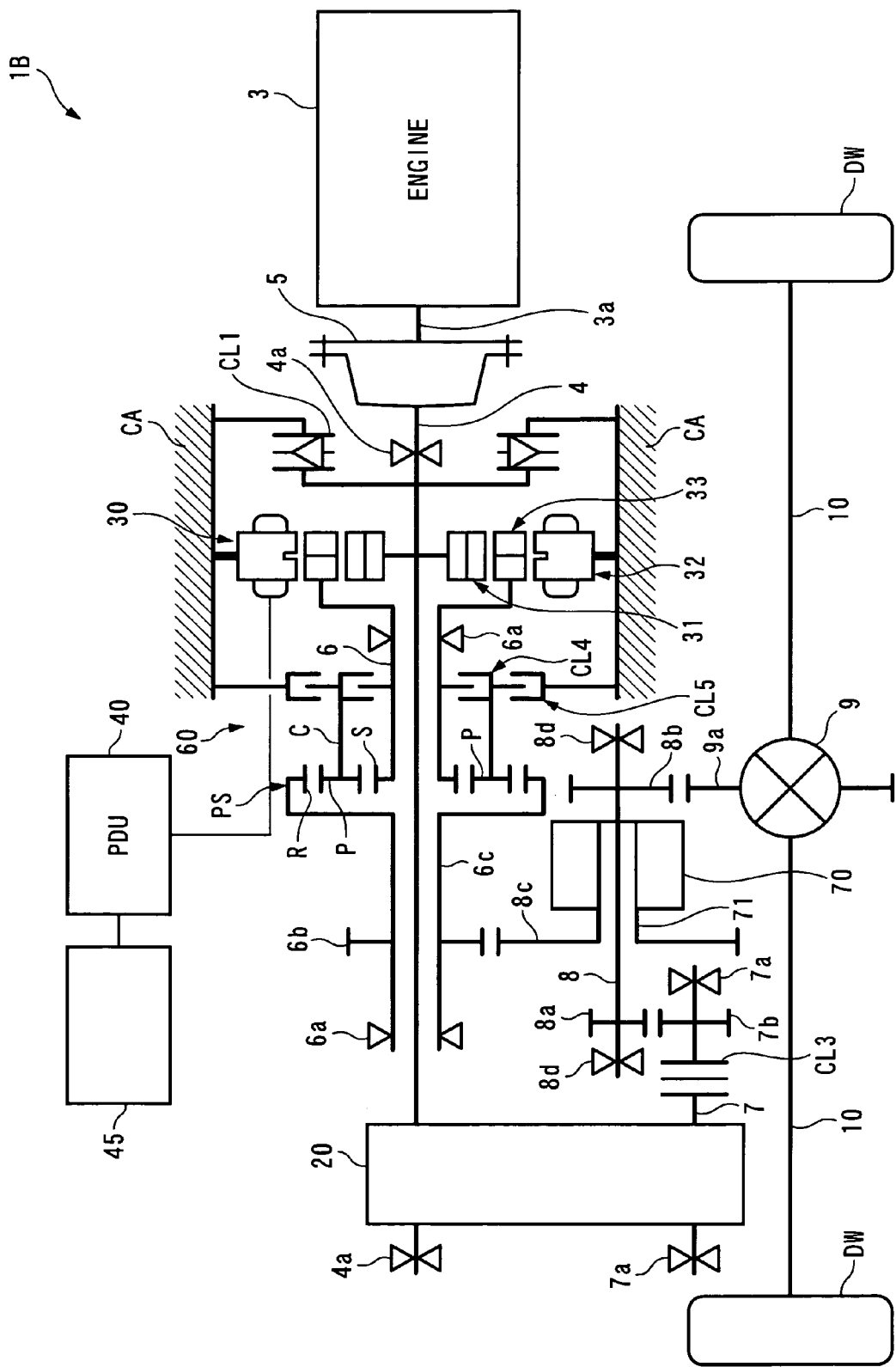
[FIG. 30] A schematic diagram of a power plant according to a third embodiment.

Next, a power plant 1B according to a third embodiment of the present invention will be described with reference to FIG. 30. The power plant 1B is distinguished from the power plant 1A according to the second embodiment mainly in that the power plant 1B further includes a transmission 70 (second transmission). In FIG. 30, the component elements identical to those of the second embodiment are denoted by the same reference numerals. The following description is mainly given of different points from the second embodiment.

The above-mentioned transmission 70 is, for example, a belt-type stepless transmission similar to the stepless transmission 20, and includes an input shaft 71 and an output shaft (not shown). The transmission 70 is configured to be capable of outputting power input to the input shaft 71 to the output shaft after steplessly changing the speed of the power. The transmission ratio "ratio" (the rotational speed of the input shaft 71/the rotational speed of the output shaft) of the transmission 70 is controlled by the ECU 2. Further, the output shaft of the transmission 70 is directly and concentrically connected to the above-described idler shaft 8. Furthermore, in the present embodiment, differently from the first and second embodiments, the third idler gear 8c is not fixed to the idler shaft 8 but to the input shaft 71. With the above arrangement, the second rotor 33 is mechanically connected to the drive wheels DW and DW via the second main shaft 6, the planetary gear unit PS, the third main shaft 6c, the gear 6b, the third idler gear 8c, the transmission 70, the idler shaft 8, the second idler gear 8b, the gear 9a, the differential gear mechanism 9, and the drive shafts 10 and 10. In the present embodiment, a sequence of the component elements from the second main shaft 6 to the drive shafts 10 and 10 correspond to the second power transmission path.

In the power plant 1B configured as above, when the power is transmitted via the second rotor 33, such as at the EV standing start, during EV traveling, at the ENG-driven standing start, during assist by the generator-motor 30, and during the drive-time electric power generation, the transmission ratio "ratio" of the transmission 70 is controlled in the following manner: First, the target magnetic field rotational speed VMFCMD is calculated by searching a map (not shown) according to the demanded torque PMCMD and the vehicle speed VP. In this map, the target magnetic field rotational speed VMFCMD is set such that with respect to the demanded torque PMCMD and the vehicle speed VP at the time, the optimum efficiency of the generator-motor 30 is obtained. Further, different types of the above-mentioned map are prepared for use during stoppage of the engine 3 and for use during operation thereof, respectively. Then, the transmission ratio "ratio" is controlled such that the magnetic field rotational speed VMF becomes equal to the calculated VMFCMD value.

In this case, differently from the first embodiment, during assist and the drive-time electric power generation, the transmission ratio RATIO of the stepless transmission 20 is controlled in the following manner: The transmission ratio RATIO is controlled such that the engine speed NE becomes equal to the predetermined target engine speed NECMD. The target engine speed NECMD is set such that the optimum efficiency of the engine 3 is obtained. According to the present embodiment, differently from the first and second embodiments, the second rotor rotational speed VR2 can be freely controlled with respect to the vehicle speed VP by controlling the transmission ratio "ratio" of the transmission 70.

Therefore, by controlling the transmission ratios RATIO and "ratio" of the stepless transmission 20 and the transmission 70, the engine speed NE and the magnetic field rotational speed VMF can be freely controlled with respect to the vehicle speed VP, separately from each other, irrespective of the relationship between the magnetic field rotational speed VMF and the first and second rotor rotational speeds VR1 and VR2, shown in the aforementioned equation (1). This makes it possible to control the engine speed NE and the magnetic field rotational speed VMF, respectively, such that more excellent efficiencies of the engine 3 and the generator-motor 30 can be obtained, whereby it is possible to enhance the driving efficiency of the engine 3 and the driving efficiency and electric power-generating efficiency of the generator-motor 30.

Further, the transmission ratio "ratio" is controlled to a predetermined lower-speed value larger than 1 e.g. at the EV standing start when the vehicle speed VP is low and torque demanded of the generator-motor 30 is large. This increases torque transmitted to the second rotor 33 by the transmission 70, and then the increased torque is transmitted to the drive wheels DW and DW. In accordance therewith, electric power to be supplied to the generator-motor 30 (or electric power generated by the generator-motor 30) is controlled such that the torque transmitted to the second rotor 33 becomes smaller. Therefore, according to the present embodiment, the maximum value of the torque demanded of the generator-motor 30 can be made smaller, thereby making it possible to reduce the size and costs of the generator-motor 30.

Furthermore, when the vehicle speed VP is very high, the transmission ratio "ratio" is controlled to a predetermined higher-speed value smaller than 1. Thus, since the second rotor rotational speed VR2 is made lower with respect to the vehicle speed VP, it is possible to prevent failure of the generator-motor 30 due to the second rotor rotational speed VR2 becoming too high.

It should be noted that in the present embodiment, the second rotor 33 is connected to the drive wheels DW and DW via the transmission 70, and hence it is impossible to obtain the effects of enhancing the driving efficiency and the electric power-generating efficiency by preventing power transmission loss in the transmission, which are obtained by the first embodiment, but it is possible to obtain the advantageous effects obtained by the first and second embodiments, except the above-mentioned effects.

Figure 31:
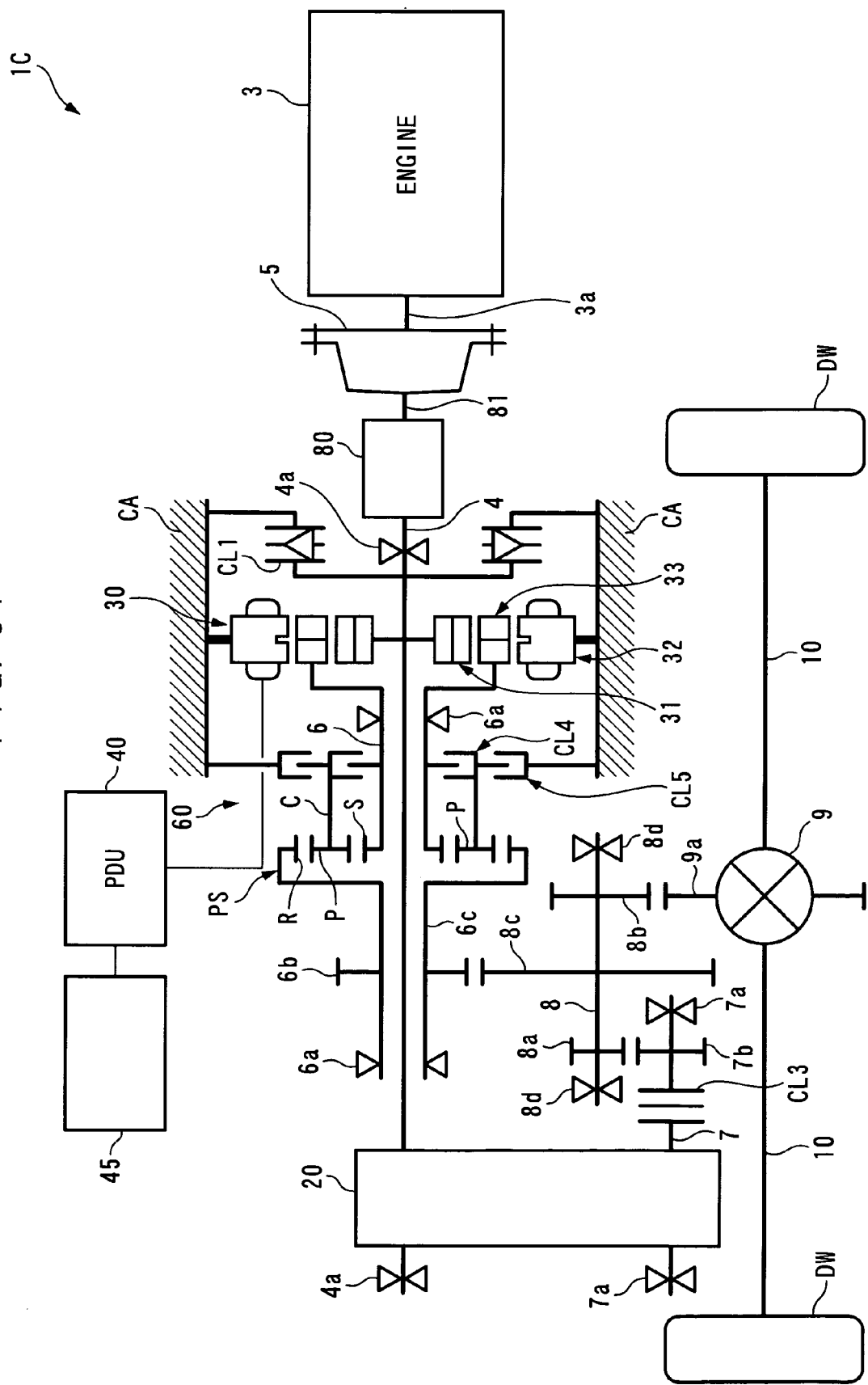
[FIG. 31] A schematic diagram of a power plant according to a fourth embodiment.

Next, a power plant 1C according to a fourth embodiment of the present invention will be described with reference to FIG. 31. The power plant 1C is distinguished from the power plant 1A according to the second embodiment mainly in that the power plant 1C further includes a transmission 80 (third transmission). In FIG. 31, the component elements identical to those of the second embodiment are denoted by the same reference numerals. The following description is mainly given of different points from the second embodiment.

The above-described transmission 80 includes an input shaft 81, an output shaft, a planetary gear unit, and a clutch (none of which are shown), and has the function of directly outputting power input to the input shaft 81 to the output shaft, and the function of outputting power input to the input shaft 81 to the output shaft in a speed-reduced state. Thus, in the transmission 80, there are set a total of two speed positions, i.e. a first speed in which a transmission ratio (the rotational speed of the input shaft 81/the rotational speed of the output shaft) is set to a predetermined value larger than 1, and a second speed in which the transmission ratio is set to 1, and the ECU 2 controls changing between these speed positions.

Further, in the present embodiment, differently from the first and second embodiments, the flywheel 5 is not connected to the first main shaft 4 but to the input shaft 81 of the transmission 80, and the first main shaft 4 is directly connected to the output shaft of the transmission 80. With this arrangement, the crankshaft 3a is connected to the first rotor 31 via the transmission 80. Furthermore, a gear ratio between the gear 9a of the differential gear mechanism 9 and the second idler gear 8b is set to a predetermined value larger than 1 such that the degree of decrease in the speed of the power by the gears 9a and 8b is relatively large. Therefore, during EV traveling or the like, torque transmitted to the second rotor 33 is increased by the second idler gear 8b and the gear 9a, and then is transmitted to the drive wheels DW and DW, whereby it is possible to reduce the size and costs of the generator-motor 30.

Further, the speed position of the transmission 80 is controlled to the first speed when the engine speed NE is very high, and otherwise controlled to the second speed. Thus, when the engine speed NE is very high, the power from the engine 3 is transmitted to the first rotor 31 in a speed-reduced state, so that it is possible to prevent failure of the generator-motor 30 due to the first rotor rotational speed VR1 becoming too high. As described hereinabove, since the first rotor 31 is formed by magnets or the like having low strength, the above-described effects can be particularly effectively obtained.

It should be noted that in the present embodiment, the crankshaft 3a is connected to the first rotor 31 via the transmission 80, and therefore it is impossible to obtain the effect of enhancing the driving efficiency of the engine 3 by preventing power transmission loss in the transmission, which is provided by the first embodiment, but it is possible to obtain the advantageous effects obtained by the first and second embodiments, except the above-mentioned effect.

Figure 32:
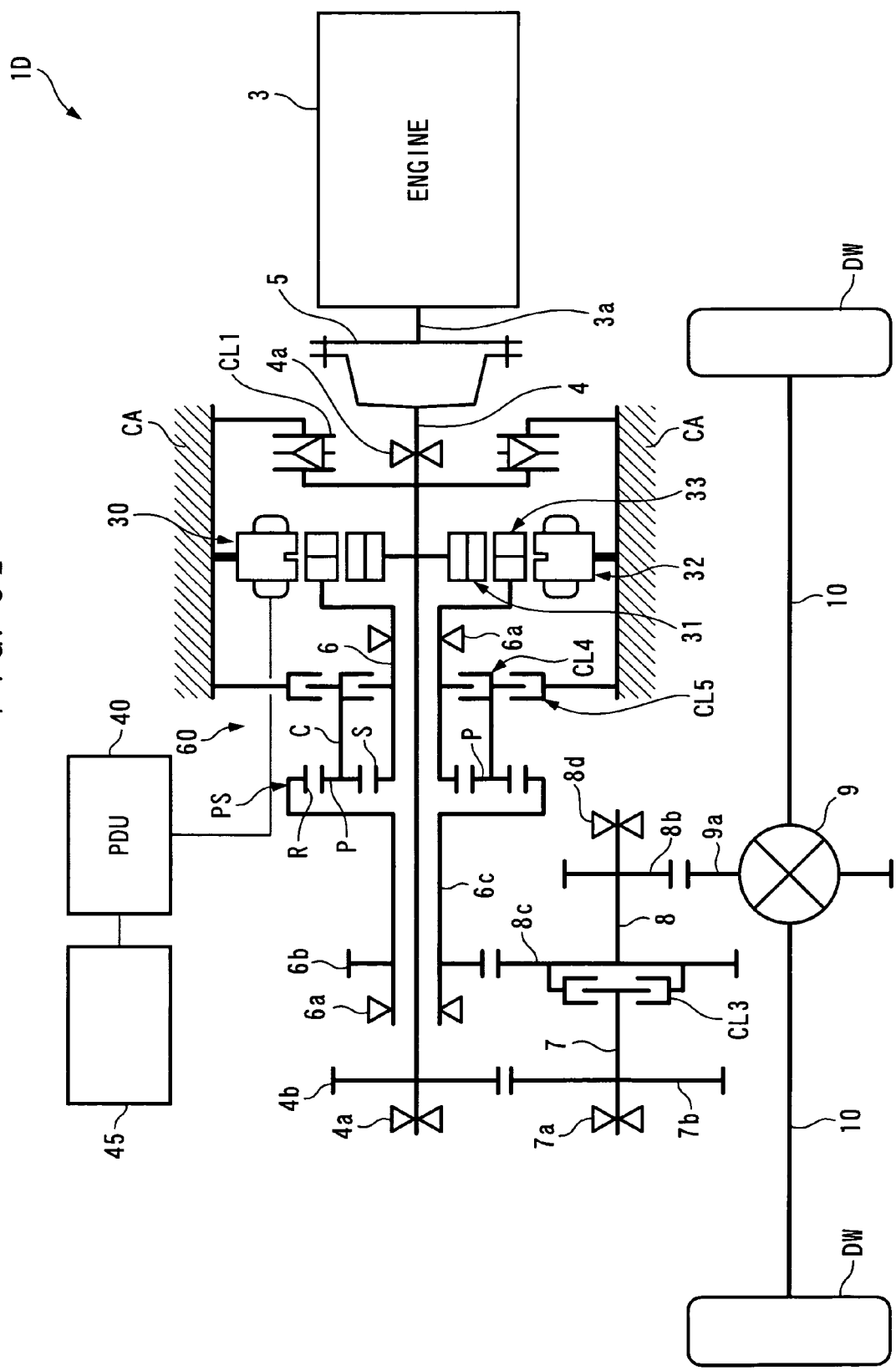
[FIG. 32] A schematic diagram of a power plant according to a fifth embodiment.

Next, a power plant 1D according to a fifth embodiment of the present invention will be described with reference to FIG. 32. The power plant 1D is distinguished from the power plant 1A according to the second embodiment mainly in that the stepless transmission 20 is omitted. In FIG. 32, the component elements identical to those of the second embodiment are denoted by the same reference numerals. The following description is mainly given of different points from the second embodiment.

A gear 4b is fixed to the first main shaft 4. The gear 4b is in mesh with the gear 7b fixed to the aforementioned auxiliary shaft 7. The gear ratio between the gears 4b and 7b is set to 1:1, for example. Further, differently from the second embodiment, the idler shaft 8 is not provided with the above-described first idler gear 8a, and the clutch CL3 has an input shaft and an output shaft thereof directly connected to the auxiliary shaft 7 and the idler shaft 8, respectively. The degree of engagement of the clutch CL3 is controlled by the ECU 2, whereby the connection between the auxiliary shaft 7 and the idler shaft 8 is established and interrupted. Furthermore, the gear ratio between the gear 6b and the third idler gear 8c is set to 1:1, for example.

With the above arrangement, when the clutch CL3 is engaged, the crankshaft 3a and the first rotor 31 are mechanically connected to the drive wheels DW and DW via the first main shaft 4, the gear 4b, the gear 7b, the auxiliary shaft 7, the idler shaft 8, the second idler gear 8b, the gear 9a, the differential gear mechanism 9, and the drive shafts 10 and 10, without via the transmission. Therefore, during traveling of the vehicle, the engine speed NE is unconditionally determined by the vehicle speed VP in a state where the clutch CL3 is being engaged. In the present embodiment, a sequence of the component elements from the first main shaft 4 to the drive shafts 10 and 10 correspond to the first power transmission path.

In the power plant 1D configured as above, the aforementioned EV creep operation, EV standing start, ENG start during EV traveling, ENG start during stoppage of the vehicle, ENG creep operation, ENG-driven standing start, and switching of the forward travel and reverse travel of the vehicle using the normal/reverse rotation-switching mechanism 60 are performed in the same manner as in the first and second embodiments, and only the operation performed during the operation of the engine 3 and at the same time during traveling of the vehicle, and the operation performed during decelerating traveling of the vehicle are different from those in the case of the first and second embodiments. Hereinafter, a description will be given of the different operations.

First, a description will be given of the operation during the operation of the engine 3 and at the same time during traveling of the vehicle. After the ENG-driven standing start, as described above, during disengagement of the clutch CL3, the speed of the power transmitted from the engine 3 to the drive wheels DW and DW is steplessly changed by controlling the magnetic field rotational speed VMF. That is, the generator-motor 30 functions as a stepless transmission. Hereafter, this point will be described with reference to FIGS. 33 and 34.

Figure 33:
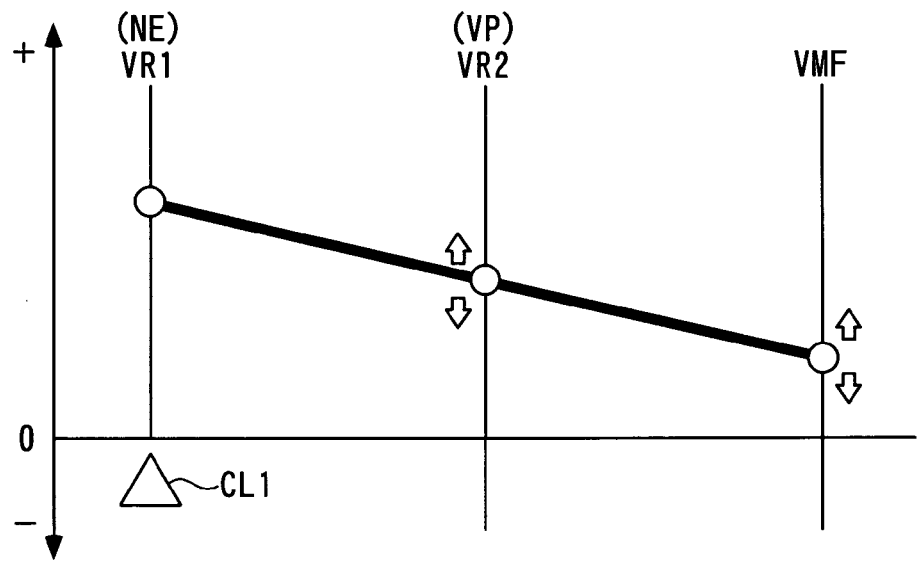
[FIG. 33] A diagram which is useful in explaining a speed-changing operation performed when first and second rotating magnetic fields in the power plant shown in FIG. 32 rotate in the same direction as the direction of rotation of the first rotor.
Figure 34:
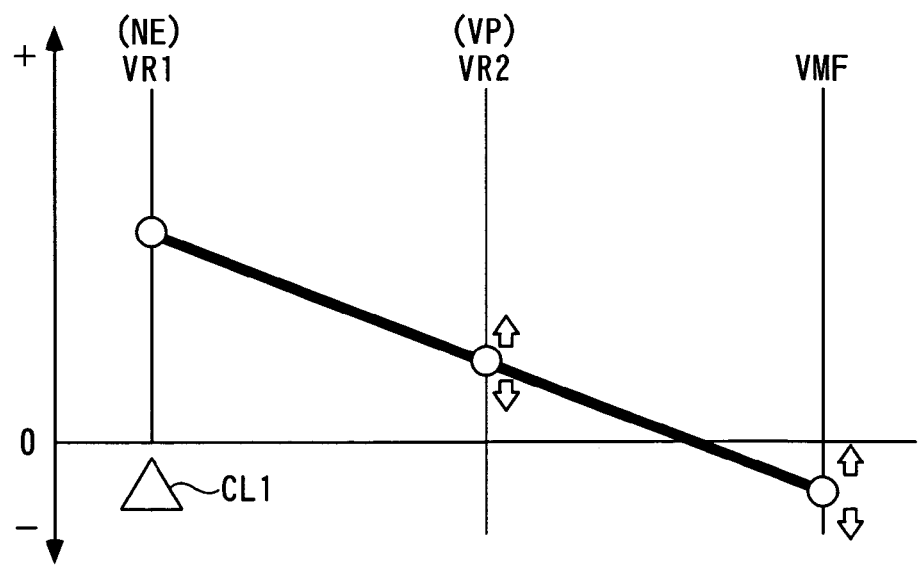
[FIG. 34] A diagram which is useful in explaining a speed-changing operation performed when the first and second rotating magnetic fields in the power plant shown in FIG. 32 rotate in a direction reverse to the direction of rotation of the first rotor.

As is apparent from the above-described connection relationship, the first rotor rotational speed VR1 is equal to the engine speed NE, and the second rotor rotational speed VR2 is equal to the vehicle speed VP, assuming that there is no change in speed by the gears. Therefore, the relationship between the magnetic field rotational speed VMF, the first and second rotor rotational speeds VR1 and VR2, the engine speed NE, and the vehicle speed VP is represented in single speed diagrams, as shown in FIGS. 33 and 34. Referring to FIG. 33, when the first and second rotating magnetic fields rotate in the same direction as the direction of rotation of the first rotor 31, as is clear from hollow arrows shown in the figure, the speed of the power transmitted to the drive wheels DW and DW is steplessly increased by increasing the magnetic field rotational speed VMF, and is steplessly reduced by reducing the magnetic field rotational speed VMF.

Further, as shown in FIG. 34, when the first and second rotating magnetic fields rotate in a direction reverse to the direction of rotation of the first rotor 31, as is clear from hollow arrows shown in the figure, the speed of the power transmitted to the drive wheels DW and DW is steplessly reduced by increasing the magnetic field rotational speed VMF, and is steplessly increased by reducing the magnetic field rotational speed VMF. In this case, the magnetic field rotational speed VMF is controlled to a value close to 0, whereby electric power input to and output from the battery 45 is suppressed while the speed of the power transmitted to the drive wheels DW and DW is changed to some extent.

Further, after the ENG-driven standing start, the clutch CL3 in a disengaged state is engaged when the vehicle speed VP becomes equal to a predetermined vehicle speed for traveling at a constant speed, and at the same time the rotational speed of the input shaft of the clutch CL3 and that of the output shaft thereof become equal to each other. The predetermined vehicle speed is set to the lowest vehicle speed that makes it possible to cause the vehicle to travel without causing engine stall when the crankshaft 3a is mechanically connected to the drive wheels DW and DW via the first power transmission path by engaging the clutch CL3. The predetermined vehicle speed is set to a smaller value as maximum torque generated by the engine 3 is larger.

Further, when the clutch CL3 is engaged as described above, the engine speed NE is controlled to thereby control the rotational speeds of the input shaft and output shaft of the clutch CL3 such that they become equal to each other. Specifically, after the ENG-driven standing start or the like, when the clutch CL3 is disengaged, the engine speed is controlled to a higher value so as to ensure large torque of the engine 3 to ensure the acceleration of the vehicle, whereby the rotational speed of the input shaft of the clutch CL3, which corresponds to the engine speed NE, is set to be higher than the rotational speed of the output shaft of the clutch CL3, which corresponds to the vehicle speed VP. From this state, the aforementioned throttle valve opening of the engine 3 is reduced to thereby reduce the amount of intake air drawn into the engine 3, whereby the engine speed NE is reduced to control the rotational speeds of the input shaft and output shaft of the clutch CL3 such that they become equal to each other.

Furthermore, during traveling of the vehicle which uses the power from the engine 3 in the state of the clutch CL3 being engaged, the throttle valve opening is controlled such that optimum fuel economy of the engine 3 can be obtained by the engine speed NE unconditionally determined by the vehicle speed VP. When the clutch CL3 is engaged, the engine 3 is approximately directly connected to the drive wheels DW and DW, and hence very high driving efficiency can be obtained.

Further, when torque transmitted from the engine 3 to the drive wheels DW and DW by the above-described control of the throttle valve opening is insufficient for the demanded torque PMCMD, electric power is supplied to the generator-motor 30 for assisting the engine 3 by the generator-motor 30 such that the insufficient amount is made up for. On the other hand, when torque transmitted from the engine 3 to the drive wheels DW and DW is surplus with respect to the demanded torque PMCMD, the surplus amount is used to perform electric power generation by the generator-motor 30, and the battery 45 is charged by the generated electric power. Such control of the generator-motor 30 makes it possible to expand an operating region where the optimum fuel economy of the engine 3 can be obtained in the engaged state of the clutch CL3. It should be noted that above-described assist by the generator-motor 30 is performed depending on the remaining charge SOC.

Furthermore, to rapidly accelerate the vehicle in response to a very large demanded torque PMCMD, the engine speed NE is rapidly increased by disengaging the clutch CL3 and controlling the throttle valve opening etc., whereby the engine torque TENG is rapidly increased. In this case, when the direction of rotation of the first and second magnetic fields determined by the relationship between the first and second rotor rotational speeds VR1 and VR2 is the same as the direction of rotation of the first rotor 31 (see FIG. 33), electric power is supplied to the stator 32, whereas when the direction of rotation of the first and second magnetic fields is reverse to the direction of rotation of the first rotor 31 (see FIG. 34), the stator 32 is caused to generate electric power. Thus, as is apparent from the ENG creep operation and the operation at the ENG-driven standing start, the engine torque TENG transmitted to the first rotor 31, and the driving equivalent torque TSE or the power-generating equivalent torque TGE are combined as positive torque by the second rotor 33, and the combined torque is transmitted to the drive wheels DW and DW, thereby rapidly accelerating the vehicle.

As described above, during rapid acceleration of the vehicle, if the clutch CL3 is disengaged to interrupt the mechanical connection between the engine 3 and the drive wheels DW and DW via the gears and the like, it is possible to increase the engine speed NE irrespective of the vehicle speed VP at the time, thereby making it possible to rapidly increase the engine torque TENG. Further, such engine torque TENG and the driving equivalent torque TSE or the power-generating equivalent torque TGE are combined as positive torque, and are transmitted to the drive wheels DW and DW, so that it is possible to transmit larger torque to the drive wheels DW and DW. This makes it possible to accelerate the vehicle rapidly, thereby making it possible to improve marketability.

Further, when the vehicle performs hill-climbing traveling during the operation of the engine 3, the clutch CL3 is disengaged and the engine speed NE and the operation of the generator-motor 30 are controlled according to the remaining charge SOC. Specifically, when the remaining charge SOC is larger than the aforementioned first predetermined value SOCL, which means that an sufficient amount of the electric power remains in the battery 45, the engine speed NE is controlled according to the vehicle speed VP such that the first and second rotating magnetic fields rotate in the same direction as the direction of rotation of the first rotor 31, and electric power is supplied from the battery 45 to the generator-motor 30 to cause the first and second rotating magnetic fields to rotate in the same direction as the direction of rotation of the first rotor 31. As a consequence, as is apparent from the operation at the ENG-driven standing start, described above with reference to FIG. 27, the drive wheels DW and DW are driven to cause forward travel of the vehicle.

On the other hand, when the remaining charge SOC is smaller than the first predetermined value SOCL, the engine speed NE is controlled according to the vehicle speed VP such that the first and second rotating magnetic fields rotate in a direction reverse to the direction of rotation of the first rotor 31, and at the same time electric power generation is performed by the generator-motor 30 to charge the battery 45 with the generated electric power. As a consequence, as is apparent from the above-described operation during the ENG creep operation, the drive wheels DW and DW are driven to cause forward travel of the vehicle. It should be noted that the charging of the battery 45 is performed until the remaining charge SOC reaches the aforementioned second predetermined value SOCH. This makes it possible to continuously perform hill-climbing traveling while preventing the overdischarge and overcharge of the battery 45.

Further, during decelerating traveling of the vehicle, the deceleration-time electric power generation is performed in the same manner as in the first embodiment. That is, the electromagnetic brake CL2 is controlled to the OFF state, and at the same time electric power generation is performed by the generator-motor 30 to charge the battery 45 with the generated electric power. In this case, the clutch CL3 is switched between engagement and disengagement in the following manner: In the first embodiment, as described hereinabove with reference to FIGS. 20 to 22, during the deceleration-time electric power generation, when the clutch CL3 is engaged, since the engine 3 is mechanically connected to the drive wheels DW and DW, the power-generating equivalent torque TGE transmitted to the stator 32, i.e. electric power for charging the battery 45 can be controlled to a larger value as the friction of the engine 3 is smaller and hence the engine drive torque TDRENG transmitted from the drive wheels DW and DW to the engine 3 is smaller.

On the other hand, during the deceleration-time electric power generation, when the clutch CL3 is disengaged, the mechanical connection between the engine 3 and the drive wheels DW and DW via the gears is interrupted, and at the same time torque transmitted from the drive wheels DW and DW to the second rotor is distributed to the stator 32 and the first rotor 31 at a distribution ratio of 1:1. Therefore, when the clutch CL3 is disengaged, if a value corresponding to the friction of the engine 3 acting on the first rotor 31 is larger than a half of the foot axis input torque TDW of the drive wheels DW and DW, the power-generating equivalent torque TGE can be controlled to a half of the foot axis input torque TDW, whereby it is possible to charge the battery 45 with electric power larger than when the clutch CL3 is engaged. Further, when the clutch CL3 is disengaged, the distribution ratio of energy (between power and electric power) transmitted to the stator 32 and the first rotor 31 is equal to a ratio between the magnetic field rotational speed VMF and the first rotor rotational speed VR1, as is clear from the above-described function of the generator-motor 30.

From the above, when the engine speed NE is low, and hence the friction of the engine 3 is small, the clutch CL3 is held in the engaged state, whereas when the engine speed NE is high, and hence the friction of the engine 3 is large, the clutch CL3 is held in the disengaged state. Further, during disengagement of the clutch CL3, the magnetic field rotational speed VMF is controlled such that it becomes higher than the first rotor rotational speed VR1. This makes it possible, during the deceleration-time electric power generation, to generate larger electric power by the generator-motor 30 to charge the battery 45. Incidentally, it is to be understood that in the first to fourth embodiments, the deceleration-time electric power generation may be performed in the same manner as in the present embodiment.

Further, similarly to the first embodiment, the deceleration-time electric power generation may be performed by disengaging the clutch CL3, at the same time holding the first rotor 31 unrotatable using a lock mechanism formed e.g. by an electromagnetic brake or a hand brake to thereby hold the first rotor rotational speed VR1 at 0, and using the power from the drive wheels DW and DW in the above state. Thus, as described hereinabove with reference to FIG. 23, it is possible to convert all the power from the drive wheels DW and DW into electric power, i.e. generate electric power.

As described above, according to the present embodiment, since the engine 3 and the generator-motor 30 are connected to the drive wheels DW and DW without using the transmission, it is possible to avoid power transmission loss in the transmission, thereby making it possible to enhance the driving efficiency of the engine 3 and the generator-motor 30 for driving the drive wheels DW and DW, and the electric power-generating efficiency of the generator-motor 30. Further, the stepless transmission 20 used in the second embodiment is omitted, which makes it possible to attain the reduction of the size and costs of the power plant 1D by the size and costs of the omitted stepless transmission 20.

Further, at the ENG-driven standing start, the electric power generation is performed by the generator-motor 30 and then the battery 45 is charged with the generated power, hereafter electric power is supplied from the battery 45 to the generator-motor 30. In a state where the clutch CL3 is disengaged after the ENG-driven standing start, the magnetic field rotational speed is controlled to a value close to 0. Further, during traveling at a predetermined constant speed, the clutch CL3 is engaged to transmit the power from the engine 3 to the drive wheels DW and DW in an approximately directly connected state, and the assist and the electric power generation are performed by the generator-motor 30 according to the demanded torque PMCMD. This makes it possible, during traveling of the vehicle, to make input and output of electric power to and from the battery 45 approximately balanced, whereby the size of the battery 45 can be reduced, which makes it possible to attain further reduction of the size and costs of the power plant 1D. Further, during disengagement of the clutch CL3 after the ENG-driven standing start, the power from the engine 3 can be transmitted to the drive wheels DW and DW while steplessly changing the speed thereof, as described hereinabove with reference to FIGS. 33 and 34.

Furthermore, during disengagement of the clutch CL3, the engine torque TENG and the driving equivalent torque TSE or the power-generating equivalent torque TGE are combined as positive torque by the second rotor 33, and the combined torque is transmitted to the drive wheels DW and DW. This makes it possible to transmit larger torque to the drive wheels DW and DW.

It should be noted that in the present embodiment, the stepless transmission 20 is not provided, and hence it is impossible to obtain the effect of enhancing the driving efficiency of the power plant 1 in its entirety by controlling the transmission ratio RATIO of the stepless transmission 20, but it is possible to obtain the advantageous effects obtained by the first and second embodiments, except the above-mentioned effect.

Further, in the present embodiment, when the above-described ENG start during EV traveling is performed by engaging the clutch CL3, as is clear from the connection relationship between the first and second rotors 31 and 33, the first and second rotor rotational speeds VR1 and VR2 become equal to each other along with engagement of the clutch CL3. Therefore, when the vehicle speed VP is high, and the second rotor rotational speed VR2 is high, the engine speed NE is controlled to a lower value suitable for the start of the engine 3, not by completely engaging the clutch CL3, but by causing the clutch CL3 to slide, and in this state, the fuel injection valves etc. are controlled to start the engine 3. Therefore, similarly to the first embodiment, it is possible to suppress vibrations and noise caused by the start of the engine 3, which makes it possible to improve marketability.

Figure 35:
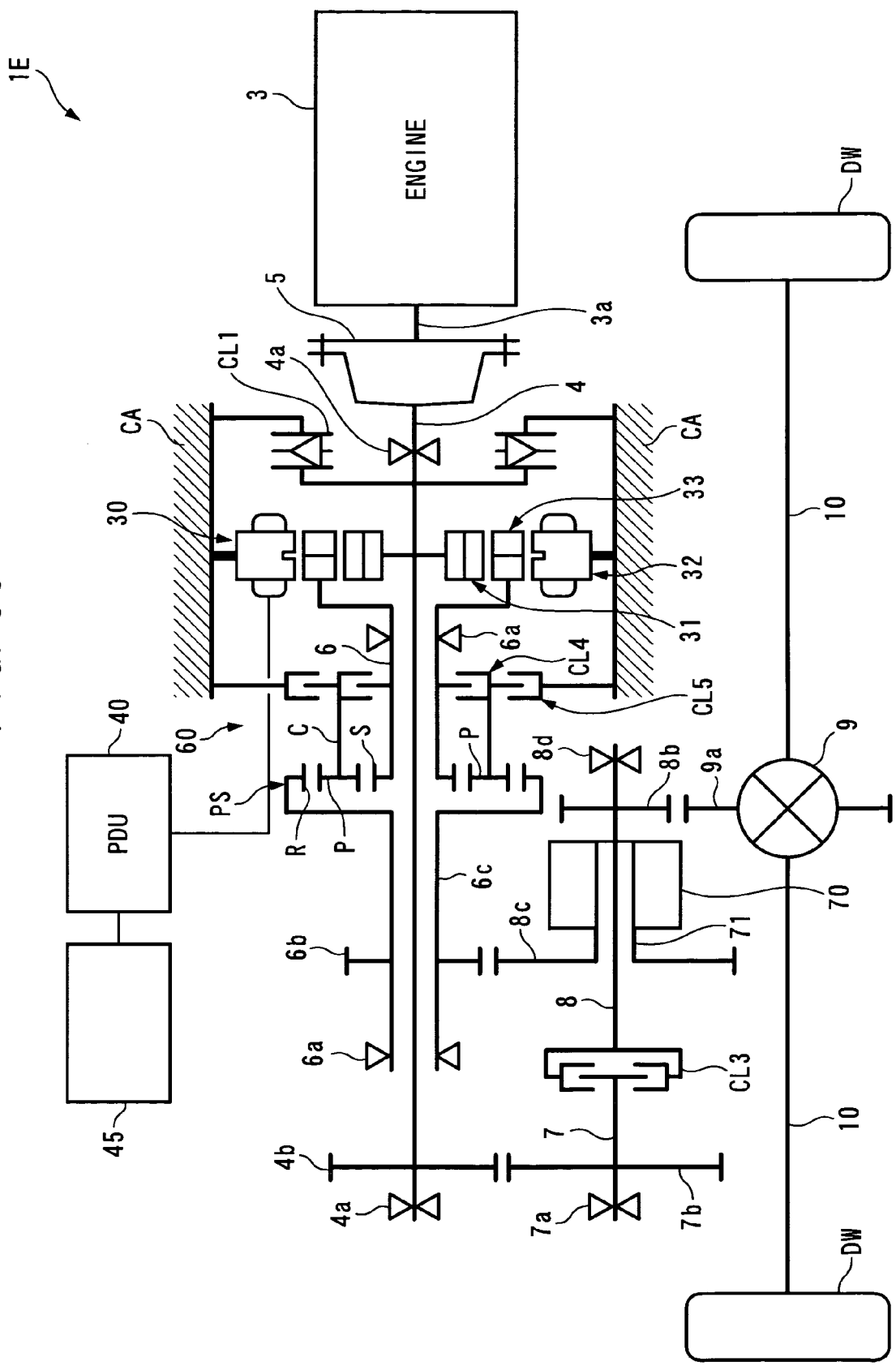
[FIG. 35] A schematic diagram of a power plant according to a sixth embodiment.

Next, a power plant 1E according to a sixth embodiment of the present invention will be described with reference to FIG. 35. As shown in the figure, this power plant 1E is formed by combining the power plant 1D according to the fifth embodiment and the transmission 70 according to the third embodiment. In the power plant 1E, the operations described above as to the fifth embodiment are similarly performed, and the transmission 70 (first transmission) is controlled in the same manner as in the third embodiment.

Therefore, according to the present embodiment, it is possible to obtain the same effects as obtained by both the third and fifth embodiments, mainly, for example, in that it is impossible to reduce the size and costs of the generator-motor 30. It should be noted that in the present embodiment, the second rotor 33 is connected to the drive wheels DW and DW via the transmission 70, and hence it is impossible to obtain the effect of enhancing the driving efficiencies of the engine 3 and the generator-motor 30 by preventing power transmission loss in the transmission, which is provided by the fifth embodiment.

Figure 36:
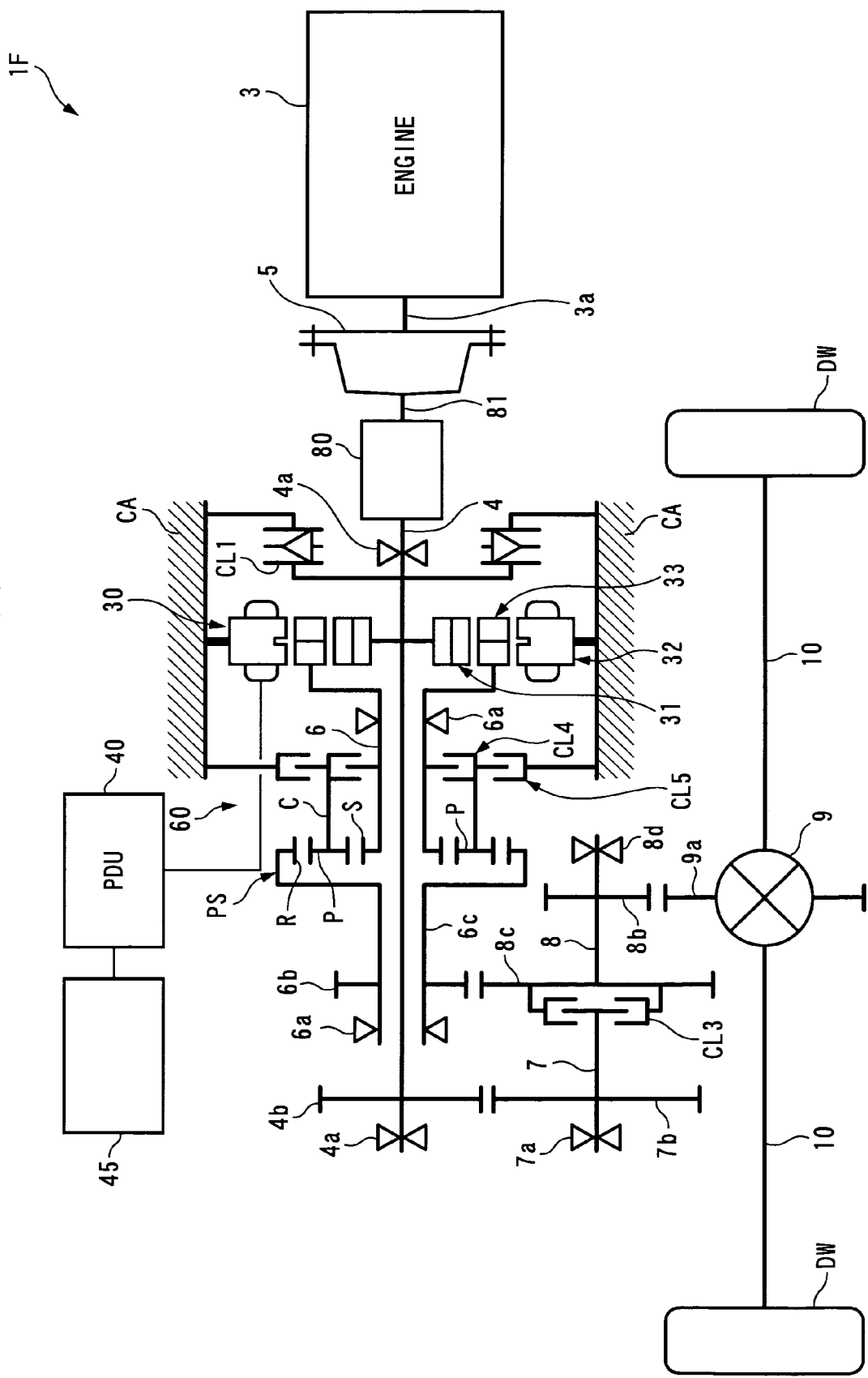
[FIG. 36] A schematic diagram of a power plant according to a seventh embodiment.

Next, a power plant 1F according to a seventh embodiment of the present invention will be described with reference to FIG. 36. As shown in the figure, this power plant 1F is formed by combining the power plant 1D according to the fifth embodiment and the transmission 80 in the fourth embodiment. The gear ratio between the gear 9a of the differential gear mechanism 9 and the second idler gear 8b is set in the same manner as in the fourth embodiment. In the power plant 1F, the operation described above as to the fifth embodiment is similarly performed, and the transmission 80 (second transmission) is controlled in the same manner as in the fourth embodiment.

Therefore, according to the present embodiment, it is possible to obtain the same effects as obtained by both the fourth and fifth embodiments, mainly, for example, in that it is possible to prevent failure of the generator-motor 30 due to the first rotor rotational speed VR1 becoming too high. It should be noted that in the present embodiment, the crankshaft 3a is connected to the first rotor 31 via the transmission 80, and hence it is impossible to obtain the effect of enhancing the driving efficiency of the engine 3 by preventing power transmission loss in the transmission, which is obtained by the fifth embodiment.

Figure 37:
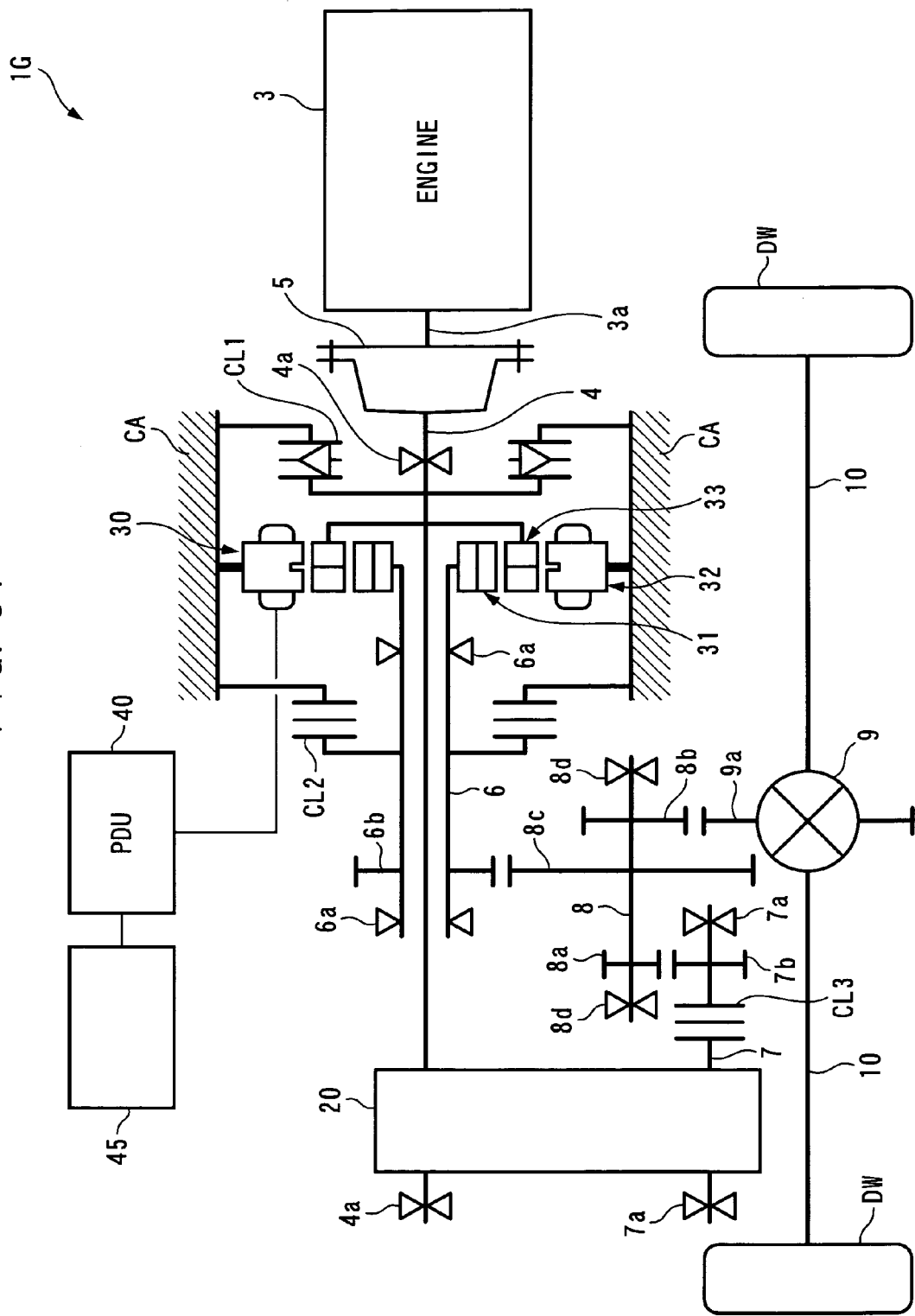
[FIG. 37] A schematic diagram of a power plant according to an eighth embodiment.

Next, a power plant 1G according to an eighth embodiment of the present invention will be described with reference to FIG. 37. The power plant 1G is distinguished from the power plant 1 according to the first embodiment only in that the connection relationships between the respective first and second rotors 31 and 33, and the engine 3 are reverse to each other. In FIG. 37, the component elements identical to those of the first embodiment are denoted by the same reference numerals. The following description is mainly given of different points from the first embodiment.

As shown in FIG. 37, the second rotor 33 is integrally concentrically fitted on the first main shaft 4, and the first rotor 31 is integrally concentrically fitted on the second main shaft 6. That is, in the power plant 1G, the second rotor 33 is connected between the crankshaft 3a and the stepless transmission 20, and is mechanically connected to the drive wheels DW and DW via the above-mentioned first power transmission path. Further, the first rotor 31 is mechanically connected to the drive wheels DW and DW via the above-mentioned second power transmission path, such as the second main shaft 6 and the idler shaft 8. Further, differently from the first embodiment, the clutch CL3 is formed by the dog tooth-type clutch, not by the friction clutch.

Figure 38:
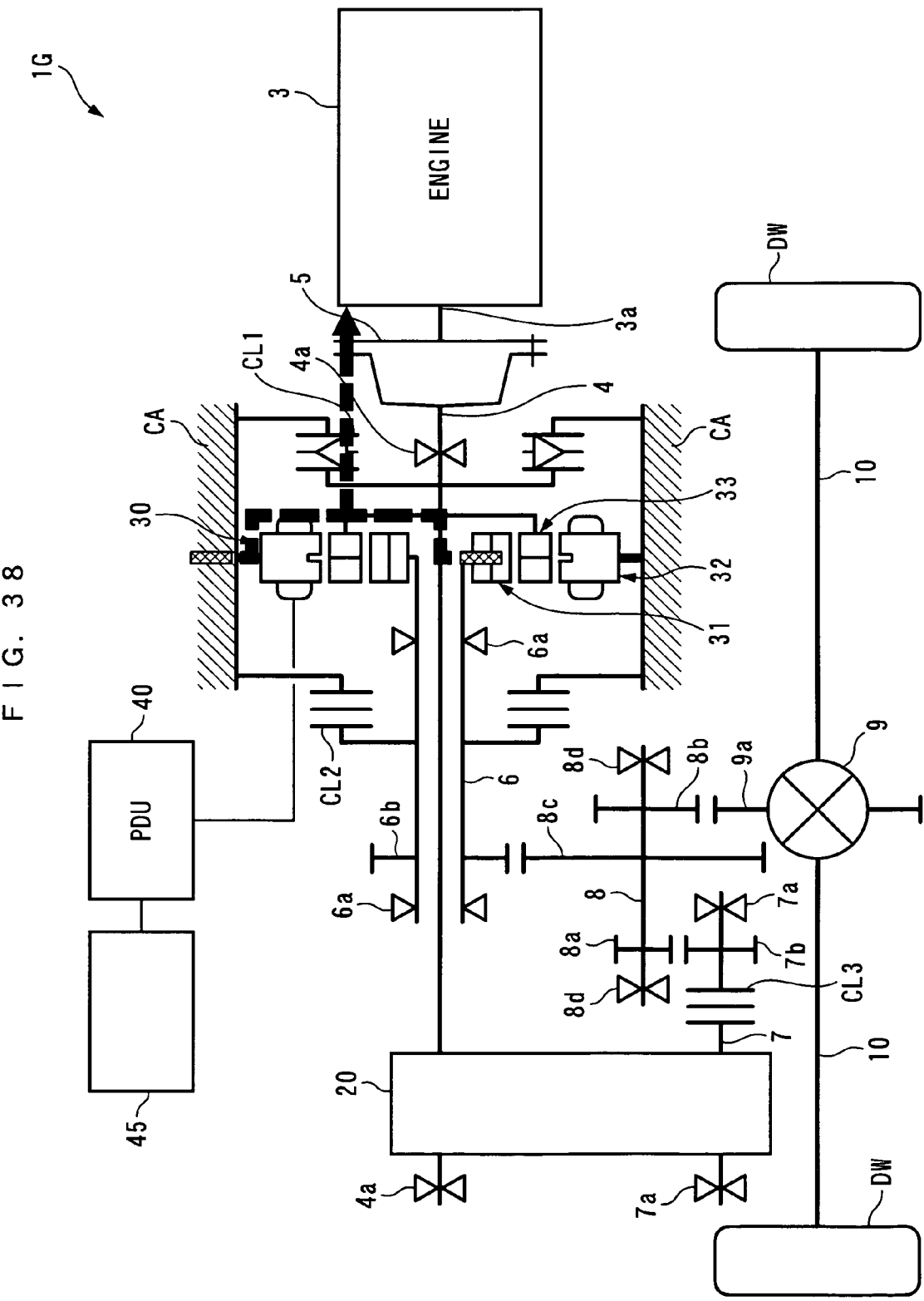
[FIG. 38] A diagram showing a state of transmission of torque in the power plant shown in FIG. 37 at the ENG start during stoppage of the vehicle.
Figure 39:
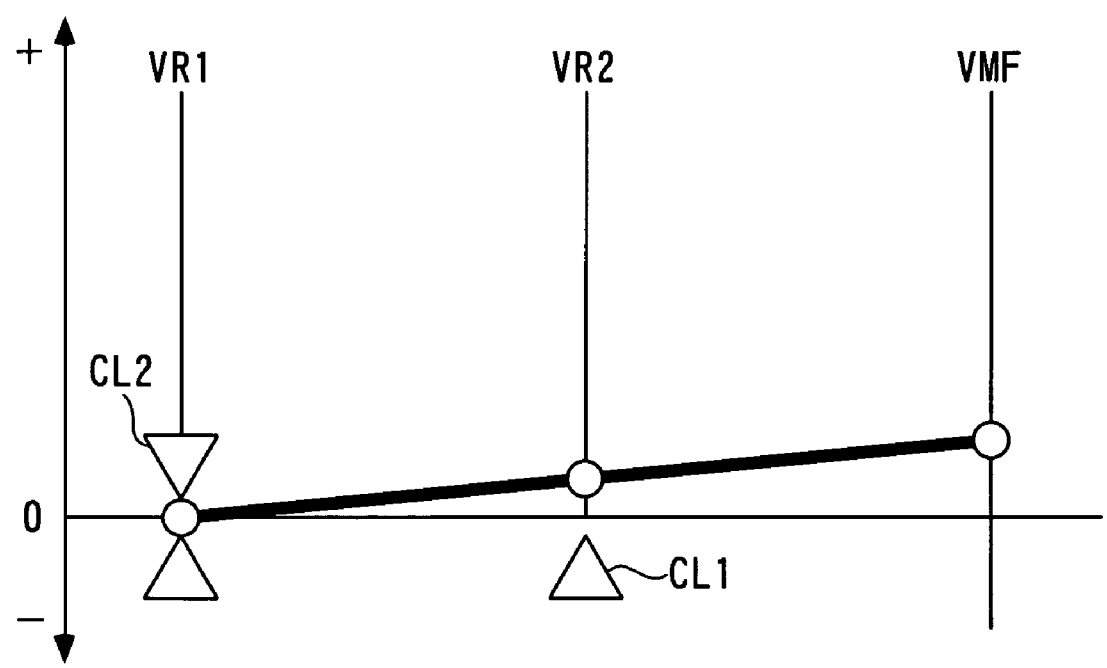
[FIG. 39] A speed diagram showing an example of the magnetic field rotational speed VMF, and the first and second rotor rotational speeds VR1 and VR2 in the power plant shown in FIG. 37, at the ENG start during stoppage of the vehicle.

Next, the operation of the power plant 1G controlled by the ECU 2 at the start or during traveling of the vehicle will be described. First, a description will be given of the operation at the aforementioned ENG start during stoppage of the vehicle. Specifically, the electromagnetic brake CL2 is controlled to the ON state to thereby hold the second main shaft 6 and the first rotor 31 integrally formed therewith unrotatable, and the clutch CL3 is disengaged to thereby disconnect between the stepless transmission 20 and the drive wheels DW and DW, i.e. between the second rotor 33 and the drive wheels DW and DW. Further, electric power is supplied to the stator 32. This causes, as shown in FIG. 38, the driving equivalent torque TSE to be transmitted from the stator 32 to the second rotor 33, and further to the crankshaft 3*a*. In this case, torque twice as large as the driving equivalent torque TSE is transmitted to the crankshaft 3*a*. Further, as shown in FIG. 39, the first and second rotating magnetic fields are caused to rotate in the same direction as the direction of rotation of the crankshaft 3*a*. With this configuration, as shown in the figure, in a state where the first rotor rotational speed VR1 is equal to 0, i.e. a state where the drive wheels DW and DW are at rest, the second rotor 33 rotates in the same direction as the direction of rotation of the crankshaft 3*a* together with the crankshaft 3*a*. In this state, the engine 3 is started by controlling the ignition operation of the fuel injection valves and the spark plugs of the engine 3.

Further, the above-mentioned operation during the ENG creep operation is performed in the following manner: The electromagnetic brake CL2 is controlled to the OFF state to thereby permit the rotation of the second main shaft 6 and the first rotor 31 integrally formed therewith. Furthermore, the clutch CL3 is disengaged, and at the generator-motor 30, part of the power from the engine 3 transmitted to the second rotor 33 is converted into electric power to generate electric power.

Figure 40:
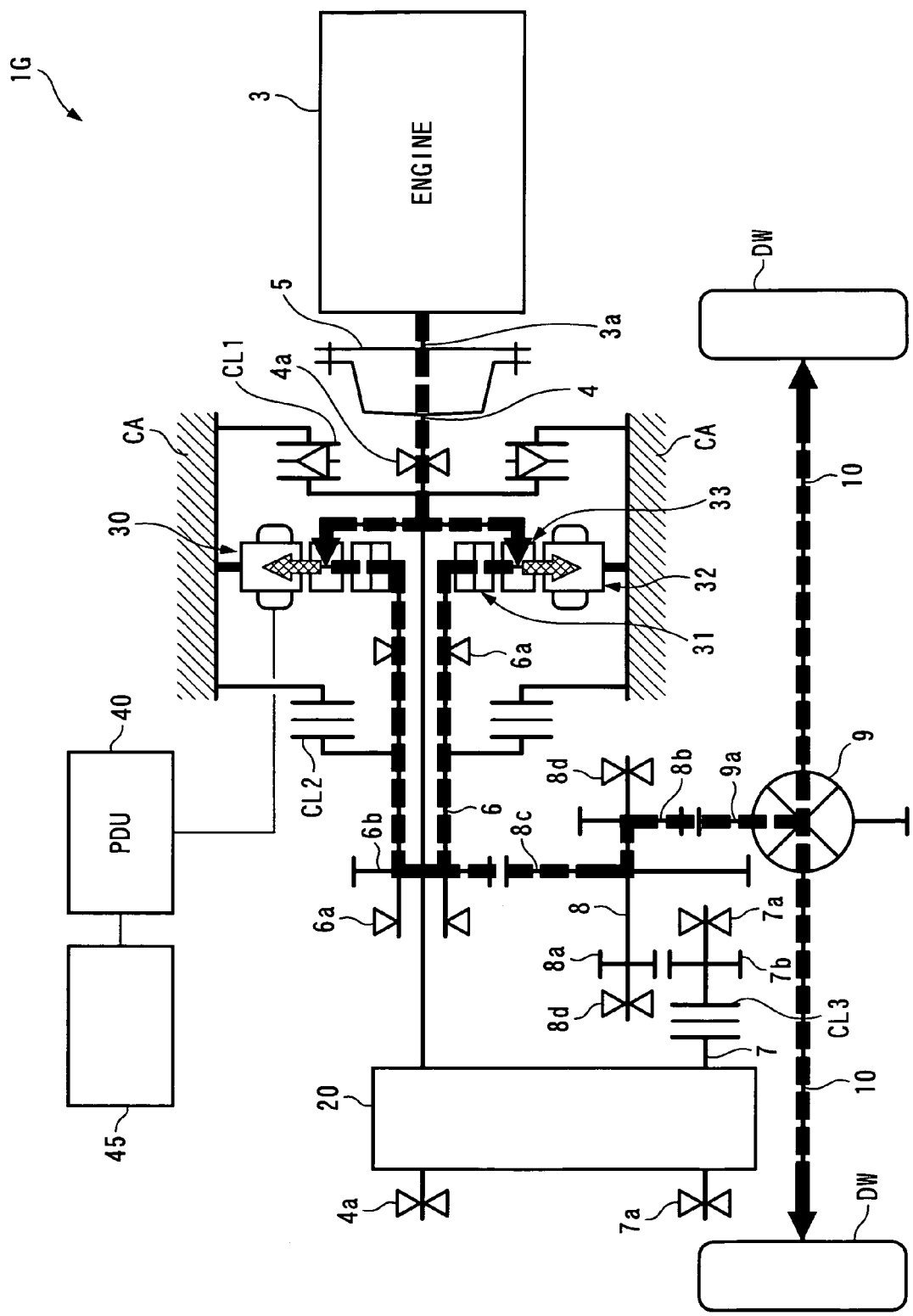
[FIG. 40] A diagram showing a state of transmission of torque in the power plant shown in FIG. 37 during the ENG creep operation.

Along with this electric power generation, as shown in FIG. 40, part of the engine torque TENG is transmitted to the second rotor 33, and the torque transmitted to the second rotor 33 is distributed to the stator 32 and the first rotor 31. The torque distribution ratio in this case is 1:1, as described hereinabove. Further, the torque distributed to the first rotor 31 is transmitted to the drive wheels DW and DW via the second power transmission path, including the second main shaft 6 and the idler shaft 8, to act on the drive wheels DW and DW in a manner causing them to rotate in the normal direction. Further, the amount of generated electric power is controlled such the first rotor rotational speed VR1 becomes very small, whereby the ENG creep operation is performed. As described above, during the ENG creep operation, in the same manner as in the first embodiment, part of the engine torque TENG is transmitted to the drive wheels DW and DW, so that it is possible to perform the creep operation without causing engine stall.

Furthermore, the aforementioned operation at the ENG-driven standing start is carried out following the above-described ENG creep operation in the following manner: The electromagnetic brake CL2 and the clutch CL3 are controlled to the OFF state and the disengaged state, respectively, similarly to the above-described ENG operation, and the engine torque TENG and the engine speed NE are increased. Then, the amount of electric power generated by the generator-motor 30 is progressively increased to thereby progressively increase the power-generating equivalent torque TGE transmitted from the second rotor 33 to the stator 32. In this case, as described above, the torque transmitted to the second rotor 33 is distributed at the distribution ratio of 1:1, and hence by progressively increasing the power-generating equivalent torque TGE as described above, torque transmitted from the engine 3 to the drive wheels DW and DW via the second rotor 33 and the first rotor 31 is progressively increased. Further, the magnetic field rotational speed VMF generated in accordance with electric power generation is increased.

Figure 41:
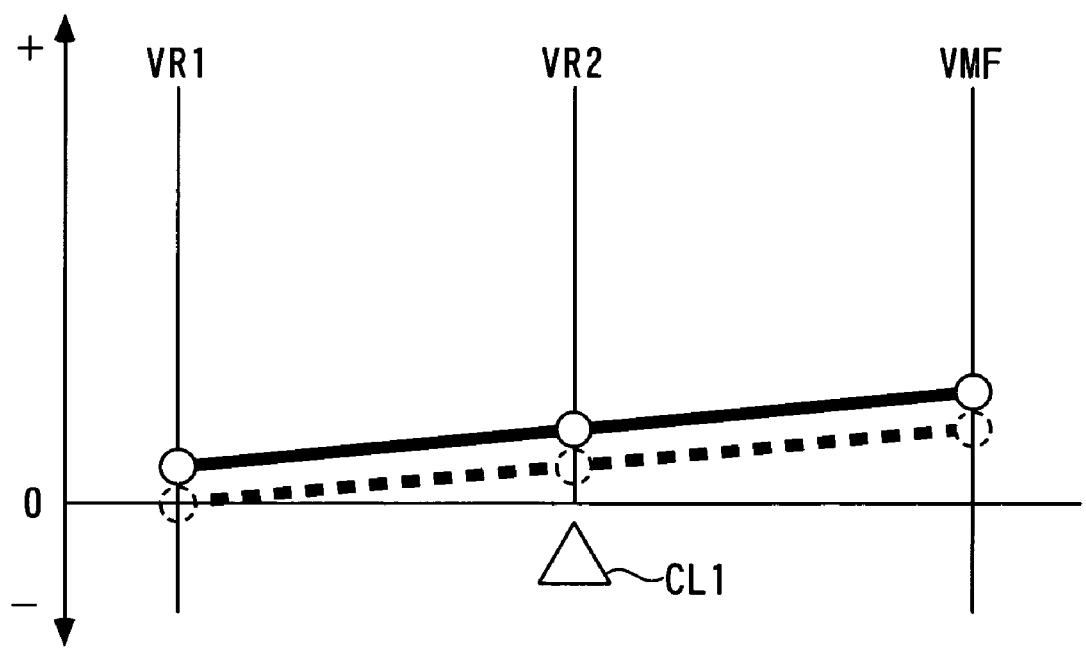
[FIG. 41] A speed diagram showing an example of the magnetic field rotational speed VMF, and the first and second rotor rotational speeds VR1 and VR2 in the power plant shown in FIG. 37, at the ENG-driven standing start.

From the above, as indicated by a solid line in FIG. 41, the first rotor rotational speed VR1 rises from the state having been approximately equal to 0 (broken line in the figure), and the rotational speed of the drive wheels DW and DW connected to the first rotor 31, i.e. the vehicle speed VP, also increases to cause the vehicle to make a standing start. Then, after the vehicle speed VP has appropriately increased, by controlling the transmission ratio RATIO of the stepless transmission 20, the rotational speeds of the aforementioned input shaft and output shaft of the clutch CL3 are controlled such that they become equal to each other. In this state, the clutch CL3 is engaged, to perform the following operation during traveling of the vehicle.

As described hereinabove, at the ENG-driven standing start, similarly to the first embodiment, it is possible to progressively increase the torque transmitted from the engine 3 to the drive wheels DW and DW, which makes it possible to start the vehicle without causing engine stall.

During the operation of the engine 3 and at the same time during traveling of the vehicle, similarly to the above-described first embodiment, the electromagnetic brake CL2 is controlled to the OFF state, and the clutch CL3 is engaged. Further, basically, the engine 3 alone is used as the drive source of the vehicle, and the power from the engine 3 is subjected to a speed change by the stepless transmission 20, and is transmitted to the drive wheels DW and DW via the first power transmission path.

Further, during traveling of the vehicle after the start of the engine 3, the power from the engine 3 is basically controlled such that the optimum fuel economy can be obtained. Furthermore, when the remaining charge SOC is larger than the aforementioned first predetermined value SOCL, that is, an sufficient amount of the electric power of the battery 45 remains, and at the same time the power from the engine 3 controlled as described above is insufficient for a demanded output determined by the vehicle speed VP and the demanded torque PMCMD at the time, electric power is supplied from the battery 45 to the generator-motor 30 such that the insufficient amount is made up for, whereby assist by the generator-motor 30 is performed.

Figure 42:
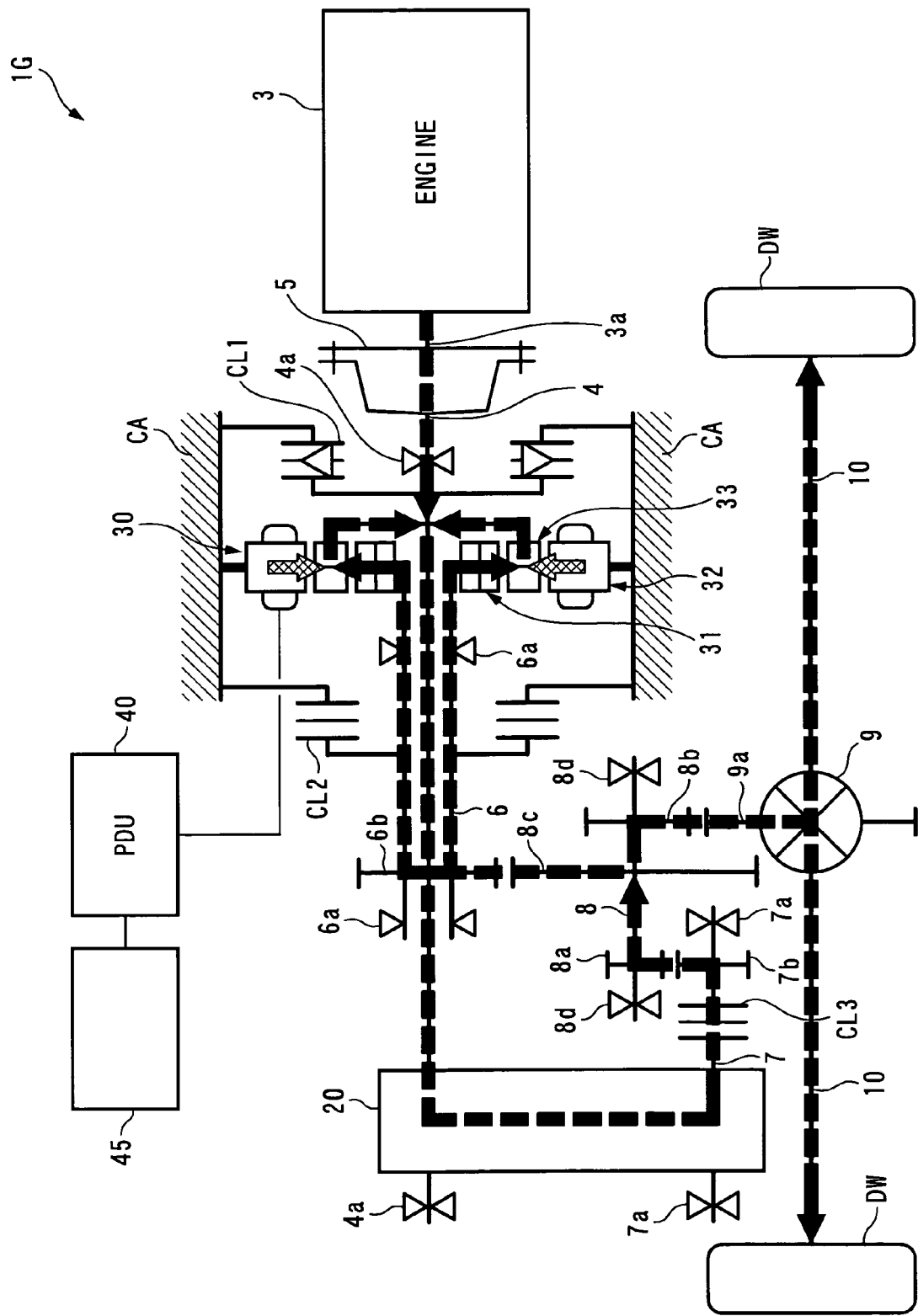
[FIG. 42] A diagram showing a state of transmission of torque in the power plant shown in FIG. 37 during assist.

During the above assist, as shown in FIG. 42, the driving equivalent torque TSE from the stator 32 and torque transmitted to the first rotor 31, as described hereinafter, are combined and the combined torque is transmitted to the second rotor 33. As described hereinabove, the distribution ratio in this case is 1:1. The torque transmitted to the second rotor 33 and the engine torque TENG are combined, and then transmitted to the idler shaft 8 via the first main shaft 4 and the stepless transmission 20. Part of the torque transmitted to the idler shaft 8 is transmitted to the first rotor 31 via the second main shaft 6, and the remainder thereof is transmitted to the drive wheels DW and DW via the differential gear mechanism 9 etc. As a result, assuming that there is no change in speed by the gears, the foot axis drive torque TDRDW becomes equal to the sum of the engine torque TENG and the driving equivalent torque TSE.

On the other hand, during traveling of the vehicle, when the remaining charge SOC is smaller than the aforementioned second predetermined value SOCH, that is, the electric power of the battery 45 is relatively small, and at the same time the power from the engine 3, which is controlled such that the optimum fuel economy can be obtained as described above, is surplus with respect to the above-mentioned demanded output, the surplus amount is used to perform the above-described drive-time electric power generation by the generator-motor 30, and the battery 45 is charged with the generated electric power. Similarly to the first embodiment, this electric power generation is carried out by using the power from the engine 3 transmitted to the second rotor 33.

Figure 43:
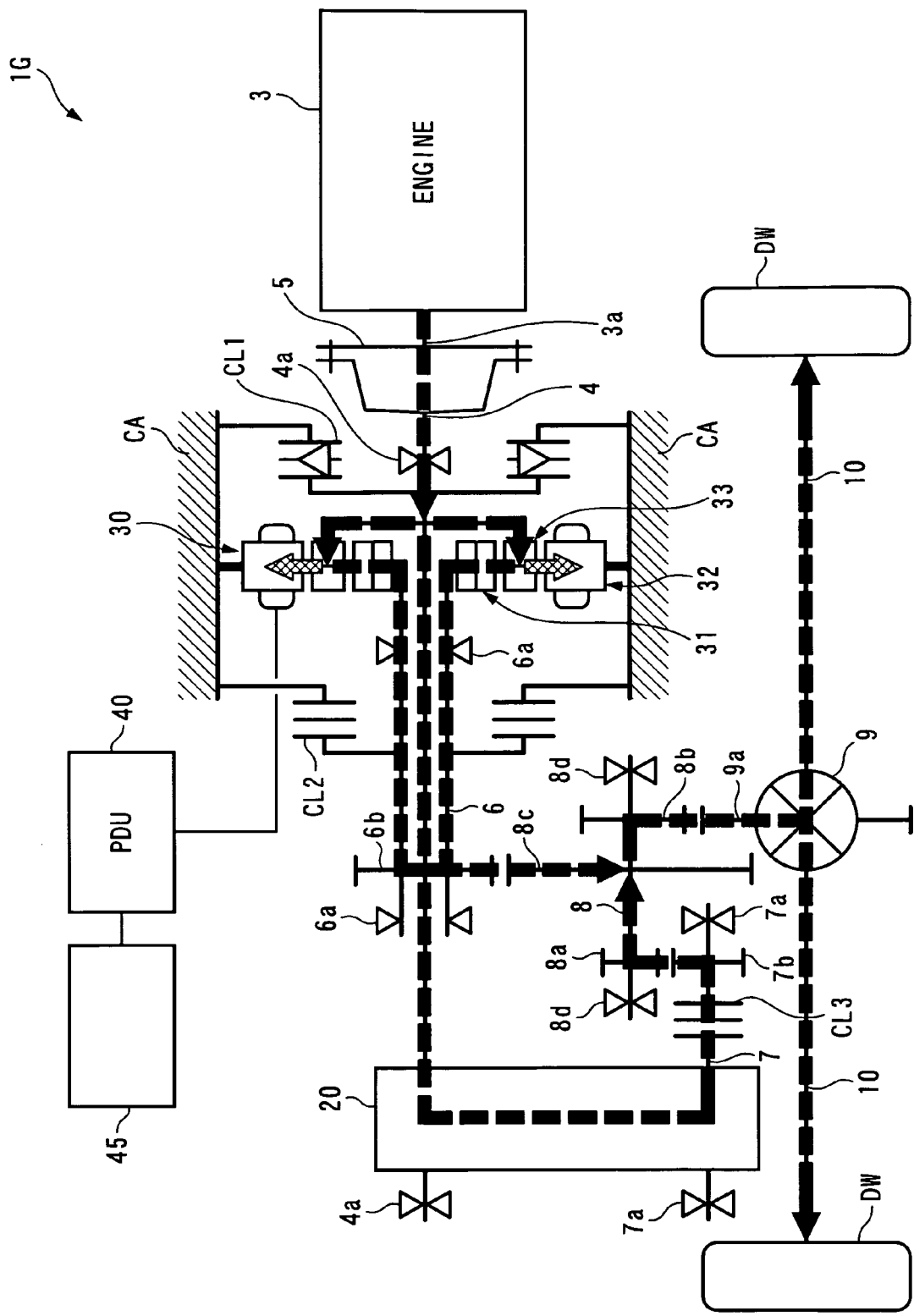
[FIG. 43] A diagram showing a state of transmission of torque in the power plant shown in FIG. 37 during the drive-time electric power generation.

During the drive-time electric power generation, as shown in FIG. 43, part of the engine torque TENG is transmitted to the second rotor 33, and further is distributed to the stator 32 and the first rotor 31 at the distribution ratio of 1:1. The remainder of the engine torque TENG is transmitted to the stepless transmission 20, and further is combined with torque distributed to the first rotor 31 as described above, by the idler shaft 8. Then, the combined torque is transmitted to the drive wheels DW and DW. As a consequence, assuming that there is no change in speed by the gears, the foot axis drive torque TDRDW has a magnitude equal to a value obtained by subtracting the power-generating equivalent torque TGE transmitted to the stator 32, from the engine torque TENG.

Further, during assist and the drive-time electric power generation, the transmission ratio RATIO of the stepless transmission 20 is controlled in the same manner as in the first embodiment such that the optimum efficiencies of the engine 3 and the generator-motor 30 can be obtained. Thus, the speed relationship between the first and second rotors 31 and 33 is controlled such that the magnetic field rotation direction becomes identical to the direction of the rotations of the first and second rotors 31 and 33.

Figure 44:
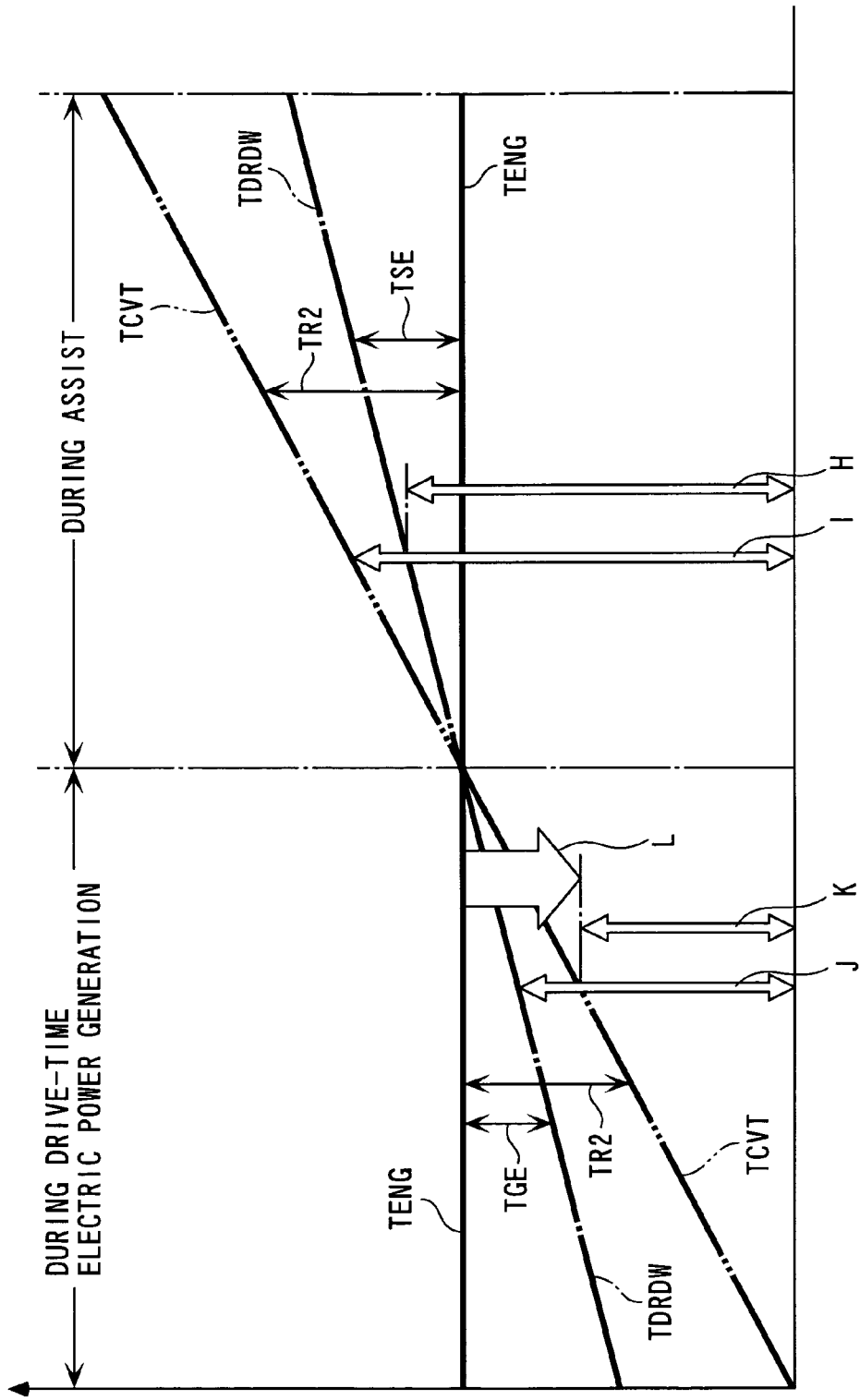
[FIG. 44] A diagram showing ratios of the foot axis drive torque TDRDW, the CVT transmission torque TCVT, and the like to the engine torque TENG in the power plant shown in FIG. 37, when the engine torque TENG is held constant during assist and the drive-time electric power generation.

FIG. 44 is a diagram showing a ratio of the torque transmitted to the drive wheels DW and DW and the stepless transmission 20 and so forth to the engine torque TENG, while holding constant the engine torque TENG during assist and the drive-time electric power generation by the generator-motor 30. It should be noted that in FIG. 44, it is assumed that there is no change in speed by the gears. As shown in the figure, the foot axis drive torque TDRDW transmitted to the drive wheels DW and DW during assist is equal to the sum of the engine torque TENG and the driving equivalent torque TSE, and becomes larger as the TSE value becomes larger. Further, as described above, since combined torque formed by combining the second rotor transmission torque TR2 transmitted to the second rotor 33 and the engine torque TENG is transmitted to the stepless transmission 20, and this second rotor transmission torque TR2 becomes larger as the driving equivalent torque TSE becomes larger, the CVT transmission torque TCVT transmitted to the stepless transmission 20 becomes larger as the driving equivalent torque TSE becomes larger. Furthermore, hollow arrows H and I in FIG. 44 represent the foot axis drive torque TDRDW and the CVT transmission torque TCVT at the maximum output of the vehicle, respectively.

Further, as shown in FIG. 44, during the drive-time electric power generation, the foot axis drive torque TDRDW has a magnitude equal to a value obtained by subtracting the power-generating equivalent torque TGE from the engine torque TENG, and as the power-generating equivalent torque TGE is larger, i.e. as the amount of generated electric power is larger, it becomes smaller. Furthermore, as described hereinabove, the second rotor transmission torque TR2 is distributed to the stator 32 and the first rotor 31 along with the electric power generation, and hence the second rotor transmission torque TR2 becomes larger as the power-generating equivalent torque TGE distributed to the stator 32 is larger. Further, part of the engine torque TENG is transmitted to the second rotor 33, and the remainder of the engine torque TENG is transmitted to the stepless transmission 20, so that the CVT transmission torque TCVT becomes smaller as the second rotor transmission torque TR2 is larger, i.e. as the power-generating equivalent torque TGE is larger.

Further, hollow arrows J and K in FIG. 44 represent the foot axis drive torque TDRDW and the CVT transmission torque TCVT during the normal drive-time electric power generation, respectively. When the stepless transmission 20 is directly connected to the engine 3, the engine torque TENG is directly transmitted to the stepless transmission 20. In contrast, according to the present embodiment, the CVT transmission torque TCVT can be reduced by the magnitude of the second rotor transmission torque TR2, as indicated by a hollow arrow L in FIG. 44. In this case, since the engine torque TENG is distributed from the second rotor 33 to the stator 32 and the first rotor 31 at the distribution ratio of 1:1, the CVT transmission torque TCVT is reduced by a magnitude twice as large as the power-generating equivalent torque TGE.

Next, a description will be given of the operation during decelerating traveling of the vehicle. During decelerating traveling of the vehicle, similarly to the first embodiment, the deceleration-time electric power generation is performed. That is, the electromagnetic brake CL2 is controlled to the OFF state, and at the same time electric power generation is performed by the generator-motor 30 to charge the battery 45 with the generated electric power.

Figure 45:
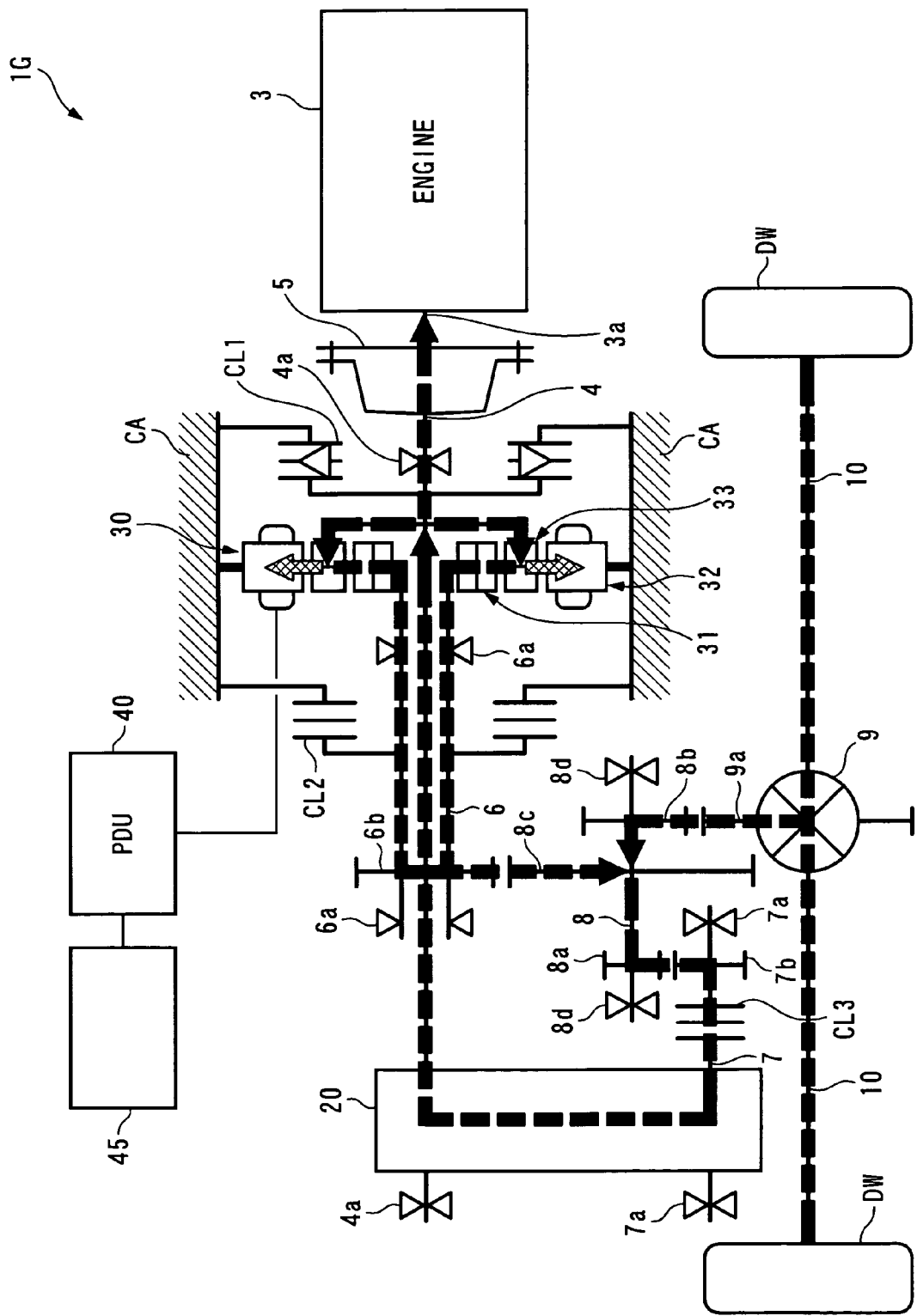
[FIG. 45] A diagram showing a state of transmission of torque in the power plant shown in FIG. 37 when the deceleration-time electric power generation is performed in a state in which the clutch is engaged.

During the deceleration-time electric power generation, when the clutch CL3 is held in the engaged state, as shown in FIG. 45, torque transmitted to the second rotor 33, as described hereinafter, is distributed to the stator 32 and the first rotor 31. The torque distributed to the first rotor 31 is transmitted to the idler shaft 8 via the second main shaft 6, and is combined with the foot axis input torque TDW of the drive wheels DW and DW by the idler shaft 8. This combined torque is transmitted to the first main shaft 4 via the auxiliary shaft 7 and the stepless transmission 20. Part of the torque transmitted to the first main shaft 4 is transmitted to the second rotor 33, and the remainder is transmitted to the engine 3. As a consequence, the sum of the power-generating equivalent torque TGE transmitted to the stator 32 and the torque transmitted to the engine 3 becomes equal to the foot axis input torque TDW. It should be noted in this case, the transmission ratio RATIO of the stepless transmission 20 is controlled, similarly to the first embodiment, such that the optimum efficiency of the generator-motor 30 can be obtained, whereby the speed relationship between the first and second rotors 31 and 33 is controlled such that the magnetic field rotation direction becomes identical to the direction of the rotations of the first and second rotors 31 and 33.

Figure 46:
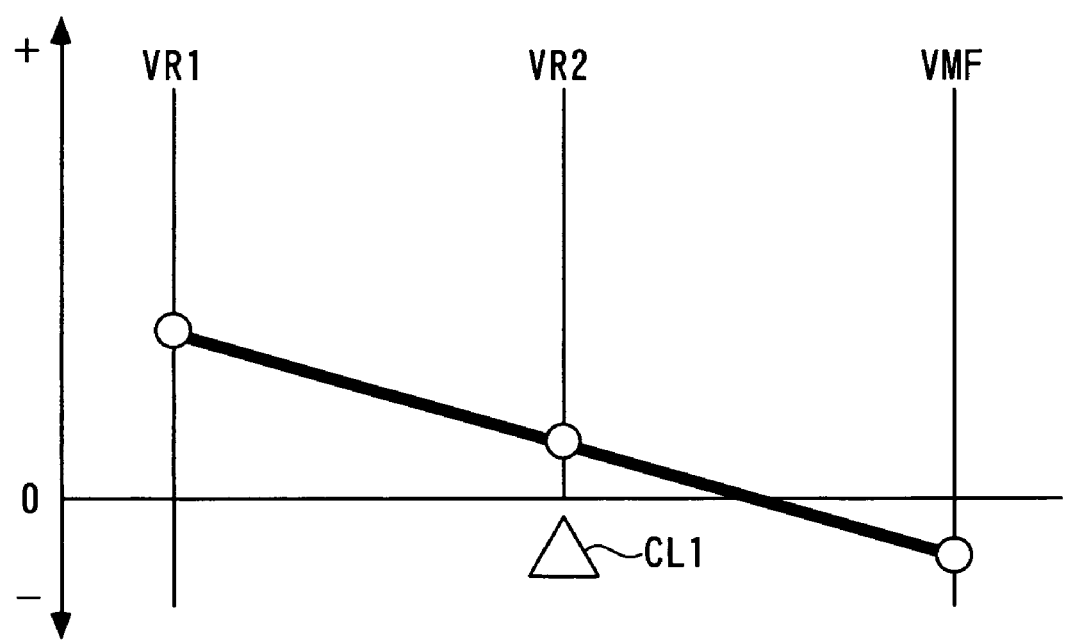
[FIG. 46] A speed diagram showing an example of the magnetic field rotational speed VMF, and the first and second rotor rotational speeds VR1 and VR2 in the power plant shown in FIG. 37, when the deceleration-time electric power generation is performed in a state in which the clutch is disengaged.
Figure 47:
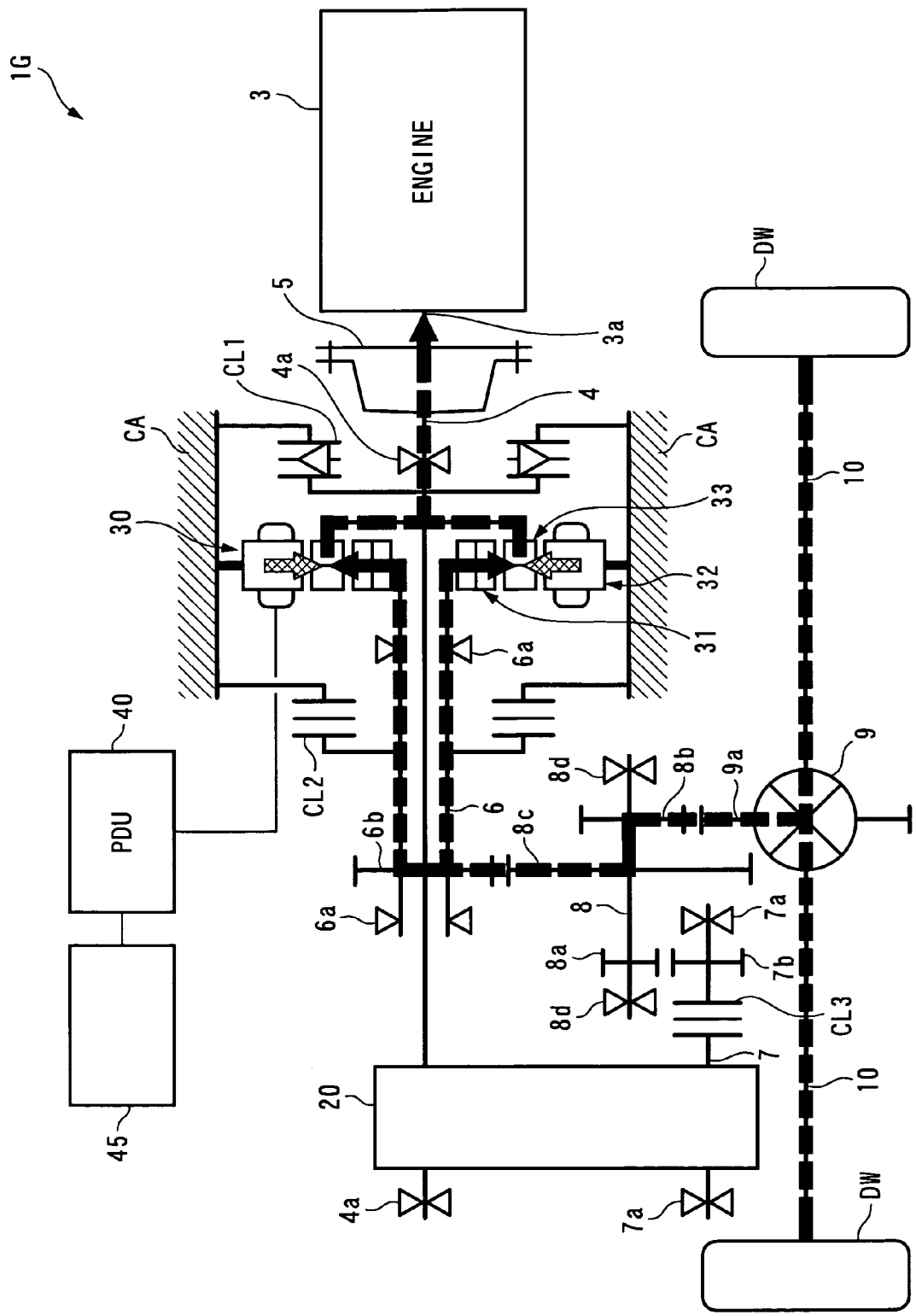
[FIG. 47] A diagram showing a state of transmission of torque in the power plant shown in FIG. 37 when the deceleration-time electric power generation is performed in the state in which the clutch is disengaged.

Further, during the deceleration-time electric power generation, assuming that the clutch CL3 is disengaged, when the direction of rotation of the first and second magnetic fields, which is determined by the second rotor rotational speed VR2 corresponding to the engine speed NE at the time and the first rotor rotational speed VR1 corresponding to the vehicle speed VP at the time, is reverse to the direction of rotation of the first rotor 31 as shown in FIG. 46, it is possible to perform the deceleration-time electric power generation, in a disengaged state of the clutch CL3. In this case, the first and second magnetic fields rotate in a direction reverse to the direction of rotation of the first rotor 31, so that as shown in FIG. 47, the torque transmitted from the drive wheels DW and DW to the first rotor 31 and the power-generating equivalent torque TGE transmitted from the stator 32 are combined by the second rotor 33, and are transmitted to the engine 3. That is, in this case, by using friction transmitted from the engine 3 to the second rotor 33, it is possible to transmit the power (energy) of the drive wheels DW and DW transmitted to the first rotor 31, to the stator 32 to convert the power into electric power. Therefore, when the deceleration-time electric power generation is performed in the disengaged state of the clutch CL3, as the friction of the engine 3 is larger, larger electric power can be generated to charge the battery 45.

Inversely, during the deceleration-time electric power generation, when the clutch CL3 is engaged, the engine 3 and the drive wheels DW and DW are mechanically connected to each other, and hence as the friction of the engine 3 is larger, the torque transmitted from the drive wheels DW and DW to the engine 3 becomes larger, which makes smaller the power-generating equivalent torque TGE distributed to the stator 32 to make smaller electric power used for charging. With this configuration, during the deceleration-time electric power generation, when the friction of the engine 3 is small, the clutch CL3 is engaged, whereas when the friction of the engine 3 is large, the clutch CL3 is disengaged, whereby it is possible to charge the battery 45 with larger electric power.

Figure 48:
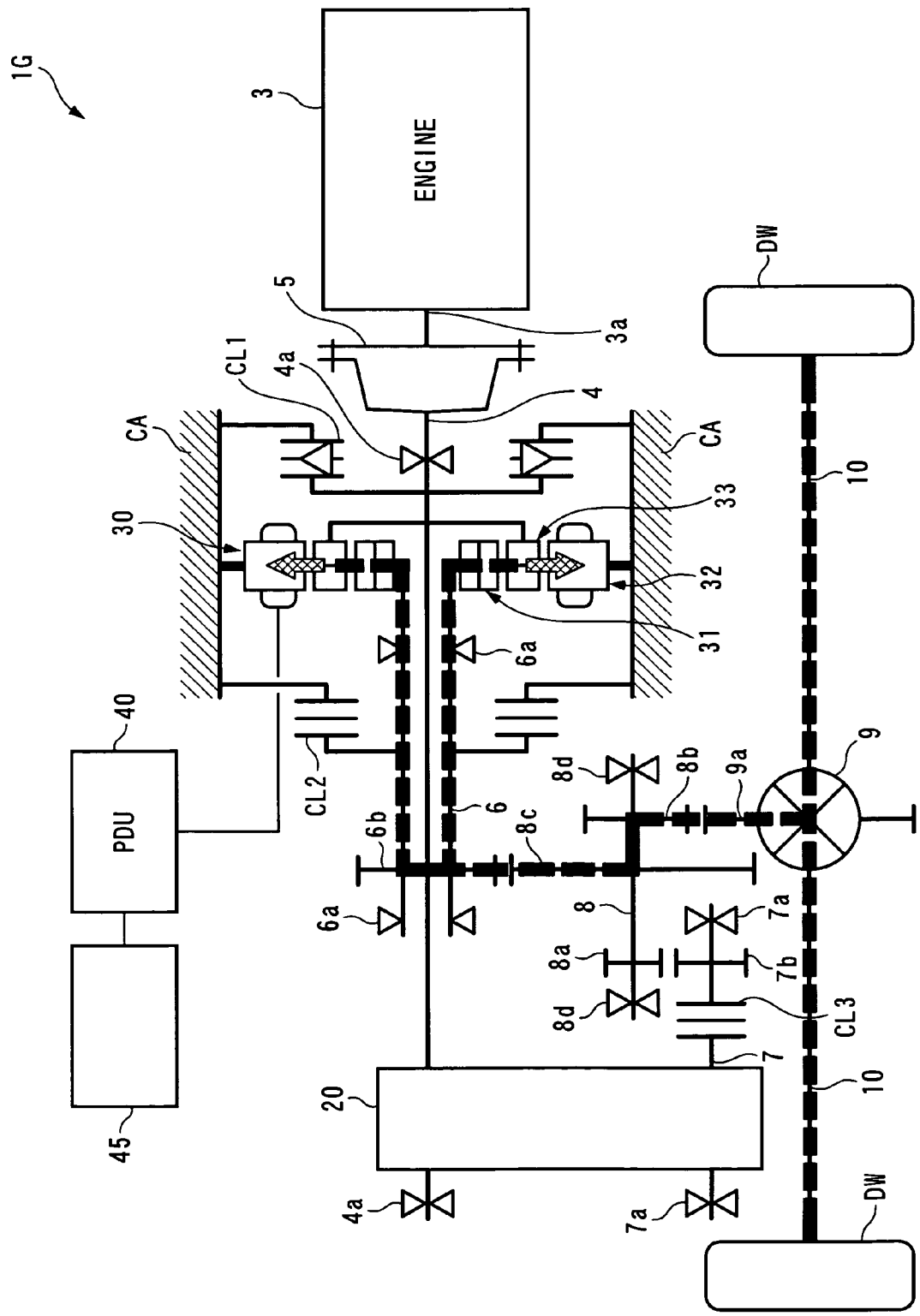
[FIG. 48] A diagram showing a state of transmission of torque in the power plant shown in FIG. 37 when the clutch is disengaged, and at the same time the engine speed is controlled to a value of 0 during the deceleration-time electric power generation.

Further, the deceleration-time electric power generation may be performed in the following manner: The clutch CL3 is disengaged, and at the same time with a lock mechanism (not shown) formed e.g. by an electromagnetic brake or a hand brake, the second rotor 33 is held unrotatable, whereby the second rotor rotational speed VR2 is held at 0, and in this state, the generator-motor 30 may generate electric power using the power from the drive wheels DW and DW. This makes it possible, as shown in FIG. 48, to transfer all the foot axis input torque TDW to the first rotor 31 via the second power transmission path without via the stepless transmission 20, to convert all the power from the drive wheels DW and DW into electric power, i.e. generate electric power.

Figure 49:
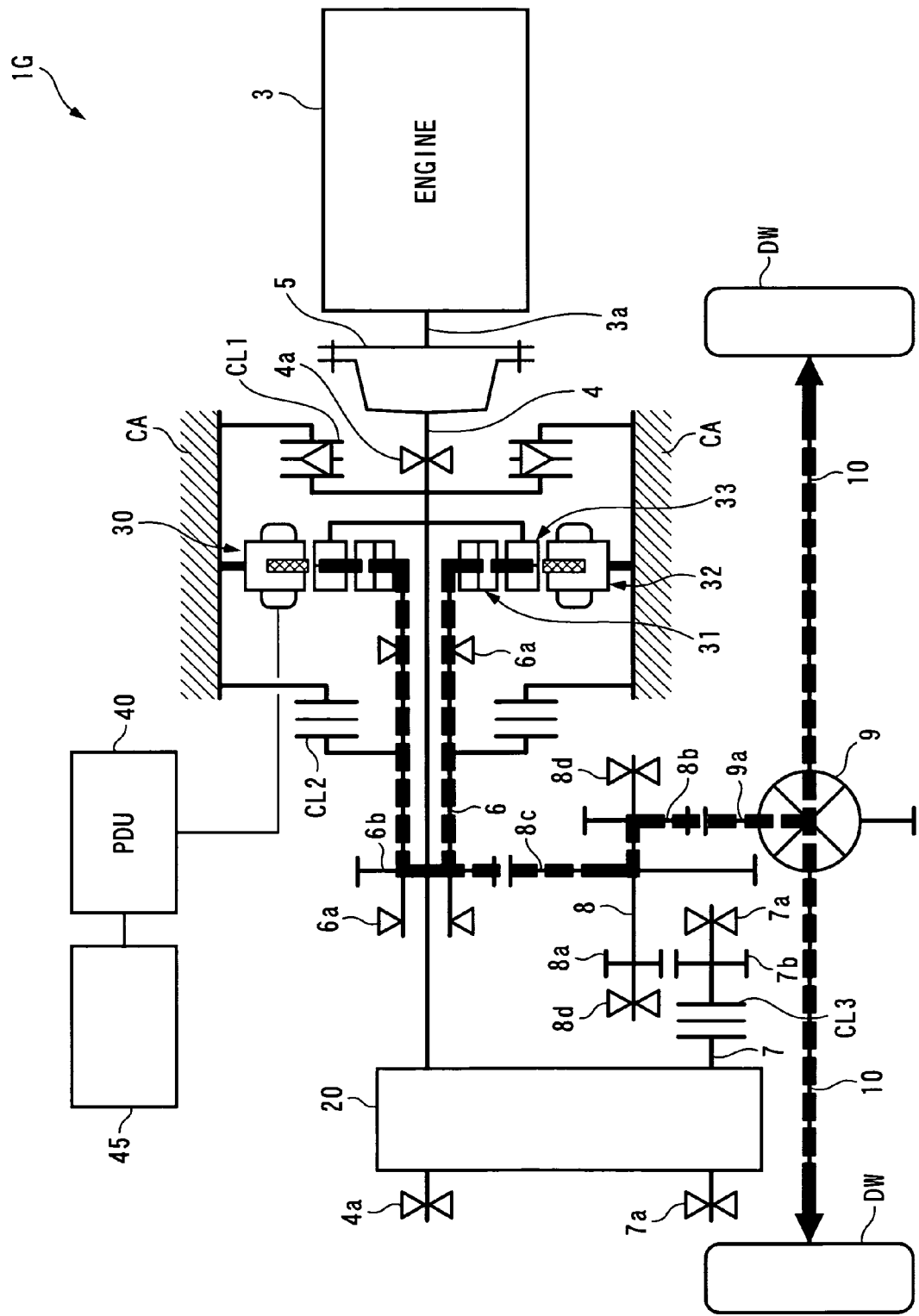
[FIG. 49] A diagram showing a state of transmission of torque in the power plant shown in FIG. 37 during the EV creep operation.

Next, a description will be given of operations during the EV creep operation and the EV standing start that use only the aforementioned generator-motor 30 as a drive source. During the EV creep operation, the electromagnetic brake CL2 and the clutch CL3 are controlled to the OFF state and the disengaged state, respectively, and at the same time electric power is supplied to the stator 32, whereby the first and second magnetic fields are generated such that they rotate in a direction reverse to the direction of rotation of the crankshaft 3*a*. The second rotor 33 is inhibited from rotating in the direction reverse to the direction of rotation of the crankshaft 3*a*, by the one-way clutch CL1 and the casing CA. As a consequence, as shown in FIG. 49, the driving equivalent torque TSE from the stator 32 is transmitted to the first rotor 31, and is further transmitted to the drive wheels DW and DW via the above-mentioned second power transmission path without via the stepless transmission 20. Further, electric power supplied to the stator 32 is controlled such that the first rotor rotational speed VR1 becomes very small, whereby the creep operation is performed in which the vehicle speed VP is very low.

Figure 50:
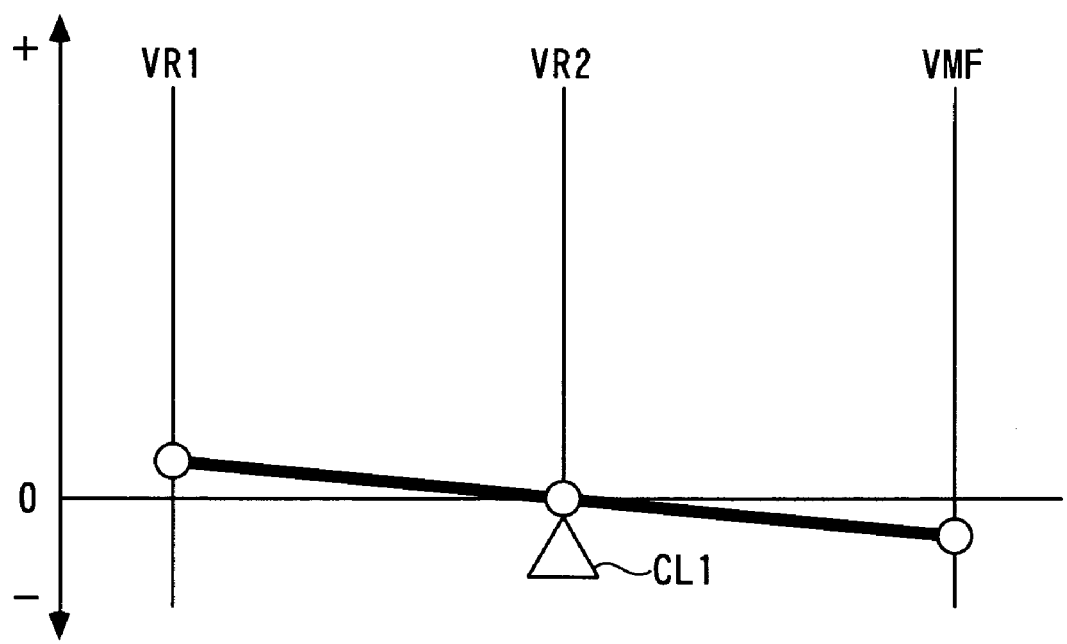
[FIG. 50] A speed diagram showing an example of the magnetic field rotational speed VMF, and the first and second rotor rotational speeds VR1 and VR2 in the power plant shown in FIG. 37, at the EV standing start.

Further, from this state of the EV creep operation, electric power supplied to the stator 32 is increased to increase the magnetic field rotational speed VMF, whereby as sown in FIG. 50, the first rotor rotational speed VR1 increases in a state where the second rotor rotational speed VR2 is equal to 0, i.e. the crankshaft 3*a* is at rest, and accordingly, the vehicle speed VP increases to cause the vehicle to make a standing start. That is, the EV standing start is performed, and in turn, the EV traveling is performed.

Furthermore, the above-mentioned ENG start during the EV traveling is performed in the following manner: During the EV traveling, supply of electric power to the stator 32 is stopped to cause the vehicle to travel by inertia. In this state, the crankshaft 3*a* is caused to rotate in the normal direction by a starter, not shown, and the engine 3 is started by controlling the fuel injection valves etc. Further, after the start of the engine 3, the transmission ratio RATIO of the stepless transmission 20 is controlled to thereby control the rotational speeds of the input shaft and output shaft of the clutch CL3 such that they become equal to each other. In this state, the clutch CL3, which has been disengaged, is engaged.

As described above, according to the present embodiment, similarly to the first embodiment, differently from the conventional power plant, the engine 3 is connected to the drive wheels DW and DW via the first rotor 31 and the first power transmission path without via the planetary gear unit, which makes it possible to completely avoid power transmission loss at the planetary gear unit, thereby making it possible to enhance the driving efficiency of the engine 3 for driving the drive wheels DW and DW. Further, as described above with reference to FIGS. 43 and 44, during the drive-time electric power generation, out of the engine torque TENG, torque having the same magnitude as that of the power-generating equivalent torque TGE can be transmitted to the drive wheels DW and DW without via the stepless transmission 20, which makes it possible to suppress power transmission loss at the stepless transmission 20.

Furthermore, similarly to the first embodiment, differently from the conventional power plant, both the first and second rotors 31 and 33 of the generator-motor 30 are connected to the drive wheels DW and DW without via the planetary gear unit, which prevents occurrence of power transmission loss at the planetary gear unit. Therefore, it is possible to increase both the driving efficiency of the generator-motor 30 for driving the drive wheels DW and DW and the electric power-generating efficiency of the generator-motor 30 in generating electric power using the drive wheels DW and DW. Further, by performing the transmission of power between the generator-motor 30 and the drive wheels DW and DW without via the stepless transmission 20, but via the first rotor 31 connected to the drive wheels DW and DW, it is possible to suppress power transmission loss at the stepless transmission 20, compared with the conventional cases in which the power transmission is necessarily performed via the transmission. Therefore, it is possible to further increases the driving efficiency and the electric power-generating efficiency of the generator-motor 30.

For example, as already described with reference to FIGS. 48 and 49, during the deceleration-time electric power generation, or when only the generator-motor 30 is used as a drive source, by disengaging the clutch CL3, the power transmission between the generator-motor 30 and the drive wheels DW and DW can be carried out only via the second power transmission path and the first rotor 31, i.e. completely without via the stepless transmission 20. Therefore, it is possible to completely prevent power transmission loss at the stepless transmission 20, and further increase the driving efficiency and the electric power-generating efficiency of the generator-motor 30. Further, differently from the conventional cases using the planetary gear unit, also during the drive-time electric power generation, it is possible to increase the electric power-generating efficiency without causing the power transmission loss at the planetary gear unit.

Furthermore, similarly to the first embodiment, compared with the conventional cases using the planetary gear unit, it is possible to simplify the construction, and accurately control the vehicle speed VP without being affected by the backlash between teeth of the gears.

Further, the transmission ratio RATIO of the stepless transmission 20 is controlled in the same manner as in the first embodiment. This makes it possible to drive the drive wheels DW and DW while controlling the outputs from the engine 3 and the generator-motor 30 such that the optimum efficiencies thereof can be obtained. Therefore, it is possible to increase the driving efficiency of the power plant 1 as a whole.

Furthermore, the one-way clutch CL1 and the casing CA inhibit the rotation of the second rotor 33 so as to inhibit the reverse rotation of the crankshaft 3*a*. Therefore, as already described with reference to FIGS. 49 and 50, it is possible to properly drive the drive wheels DW and DW using the power from the generator-motor 30 without dragging the engine 3, while inhibiting the reverse rotation of the crankshaft 3*a*.

Further, as already described with reference to FIGS. 38 and 39, while the first rotor 31 is held unrotatable by the electromagnetic brake CL2, the clutch CL3 disconnects between the second rotor 33 and the drive wheels DW and DW, and the first and second rotating magnetic fields are caused to rotate in the same direction as the direction of rotation of the crankshaft 3*a*. This makes it possible to cause the crankshaft 3*a* to rotate in the normal direction without driving the drive wheels DW and DW, which in turn makes it possible to state the engine 3.

Furthermore, similarly to the first embodiment, at the ENG-driven standing start, by disengaging the clutch CL3 and controlling generated electric power, torque transmitted from the engine 3 to the drive wheels DW and DW via the second and first rotors 33 and 31 is progressively increased, so that it is possible to start the vehicle without causing engine stall. In addition, after the ENG-driven standing start or the ENG start during EV traveling, engagement of the clutch CL3 can be performed in a state where the rotational speeds of the input shaft and output shaft of the clutch CL3 are equal to each other, and therefore in the present embodiment, differently from the first embodiment, a dog tooth-type clutch is used as the clutch CL3 in place of the friction clutch. This makes it possible to enhance the fuel economy of the engine 3.

Figure 51:
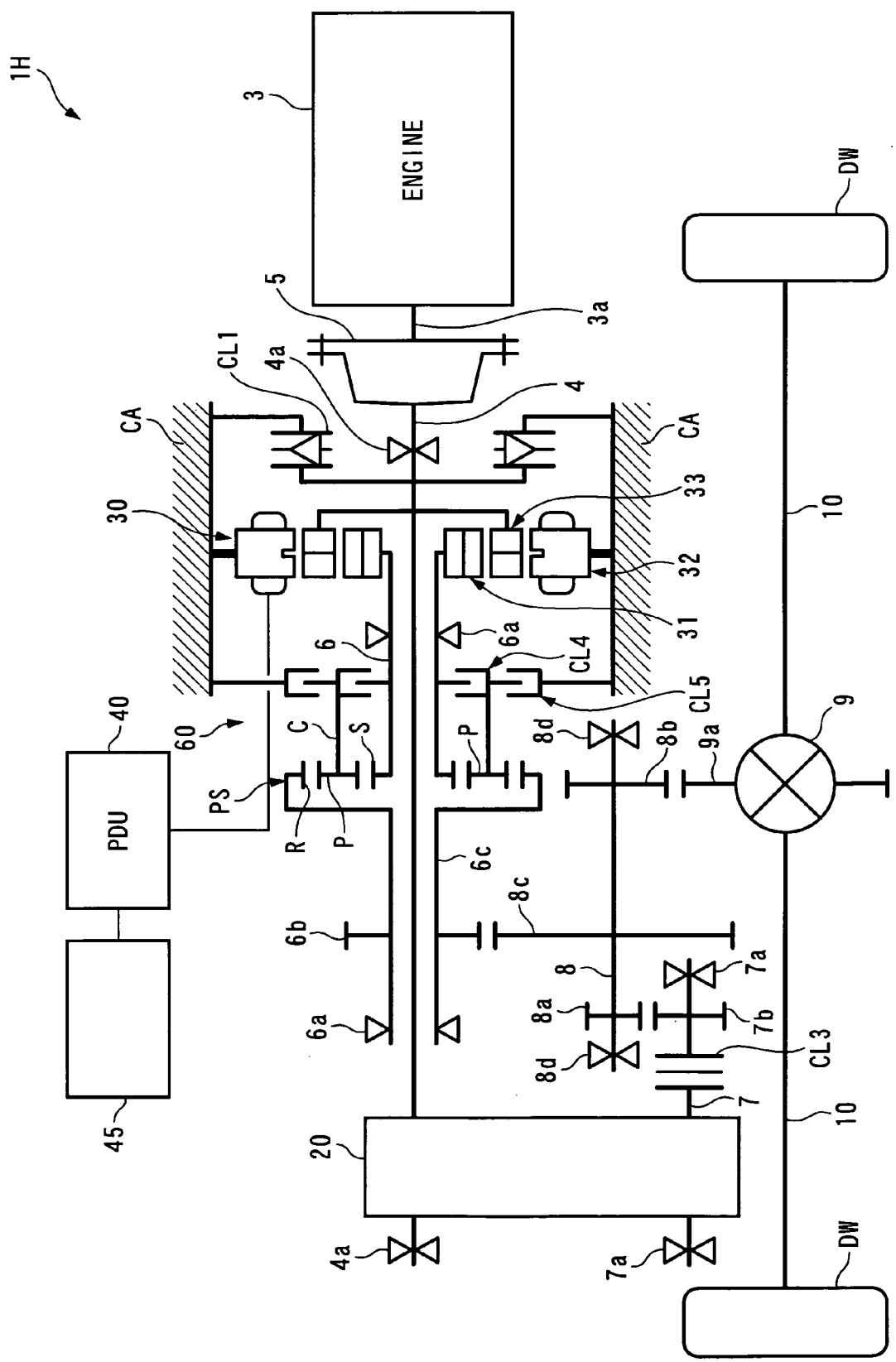
[FIG. 51] A schematic diagram of a power plant according to a ninth embodiment.

Next, a power plant 1H according to a ninth embodiment of the present invention will be described with reference to FIG. 51. As shown in the figure, this power plant 1H is formed by combining the above-described power plant 1G according to the eighth embodiment and the above-described normal/reverse rotation-switching mechanism 60. The first rotor 31 is connected to the sun gear S of the normal/reverse rotation-switching mechanism 60 via the second main shaft 6. In the power plant 1H, the operation already described as to the eighth embodiment is performed in the same manner, and the normal/reverse rotation-switching mechanism 60 is controlled in the same manner as in the second embodiment.

Therefore, according to the present embodiment, when the power from the engine 3 is transmitted to the drive wheels DW and DW only via the first rotor 31 and the second power transmission path as during the EV standing start and the ENG-driven standing start, similarly to the second embodiment, the normal and reverse rotations of the drive wheels DW and DW, i.e. the forward travel and reverse travel of the vehicle can be selectively carried out by control of the normal/reverse rotation-switching mechanism 60. In this case, as is apparent from the operation at the ENG-driven standing start, already described as to the eighth embodiment, it is possible to transmit the power from the engine 3 to the drive wheels DW and DW without using the friction start clutch, to thereby cause the forward or reverse travel of the vehicle at a stop without causing engine stall. Further, similarly to the second embodiment, during forward travel of the vehicle, the sun gear S, the carrier C, and the ring gear R rotate in unison, and hence in the planetary gear unit PS, it is possible to transmit the power to the drive wheels DW and DW without causing power transmission loss due to meshing of the gears. Other various effects similar to those obtained by the eighth embodiment can be obtained.

Figure 52:
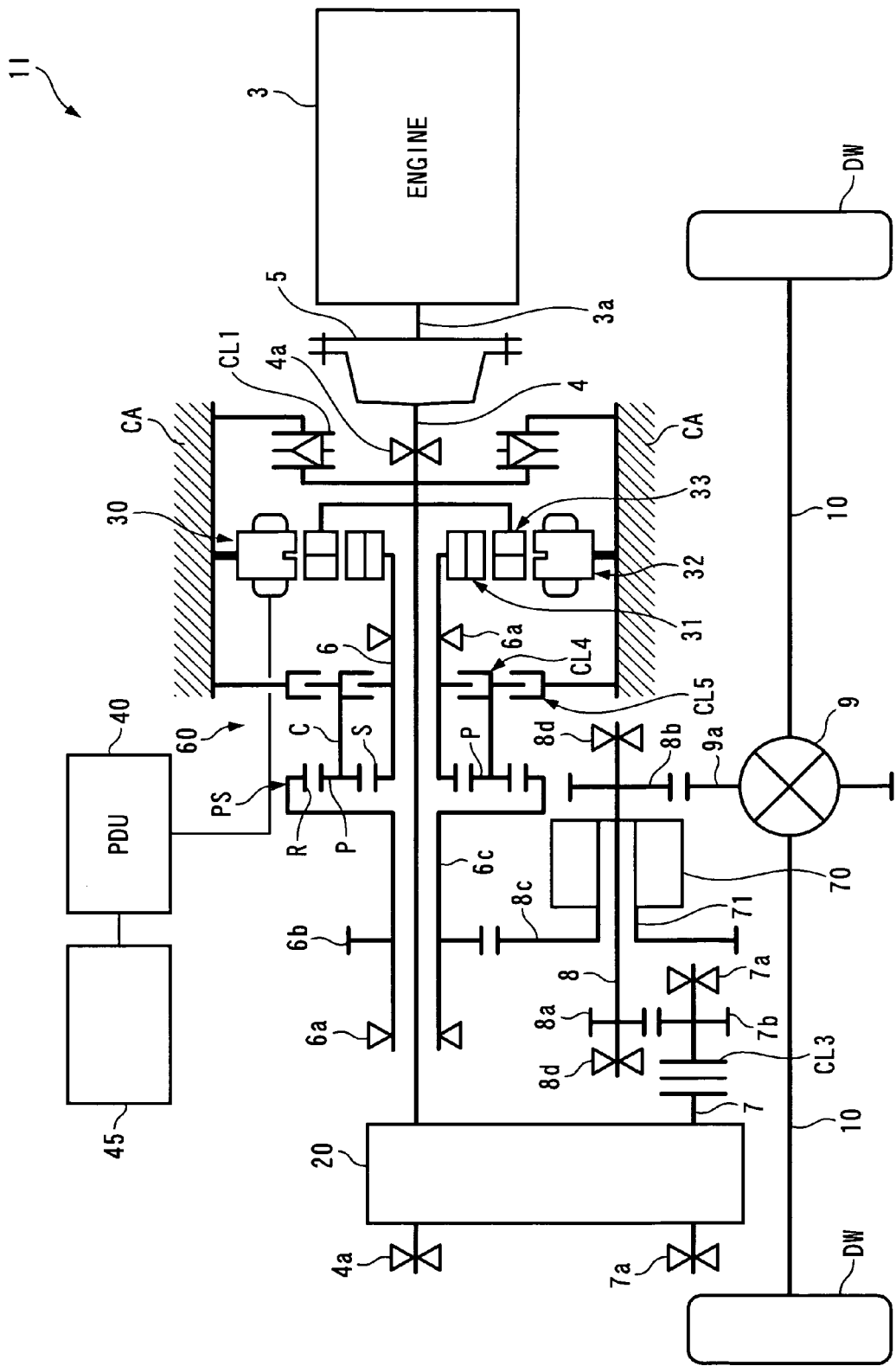
[FIG. 52] A schematic diagram of a power plant according to a tenth embodiment.

Next, a power plant 1I according to a tenth embodiment of the present invention will be described with reference to FIG. 52. As shown in the figure, this power plant 1I is formed by combining the above-described power plant 1G according to the ninth embodiment and the transmission 70 according to the third embodiment. In the power plant 1G, the operation already described as to the ninth embodiment is performed in the same manner, and the transmission 70 (second transmission) is controlled in the same manner as in the third embodiment.

Therefore, according to the present embodiment, it is possible to mainly obtain the same effects as obtained by both the third and ninth embodiments. In this case, in the present embodiment, differently from the third embodiment, the first rotor 31 formed by magnets having low strength is connected to the drive wheels DW and DW via the transmission 70, and therefore the present embodiment is particularly effective in preventing failure of the generator-motor 30 due to the first rotor rotational speed VR1 becoming too high. It should be noted that in the present embodiment, the first rotor 31 is connected to the drive wheels DW and DW via the transmission 70, which makes it impossible to obtain the effects of enhancing the driving efficiency and the electric power-generating efficiency by preventing power transmission loss in the transmission, which are obtained by the ninth embodiment.

Figure 53:
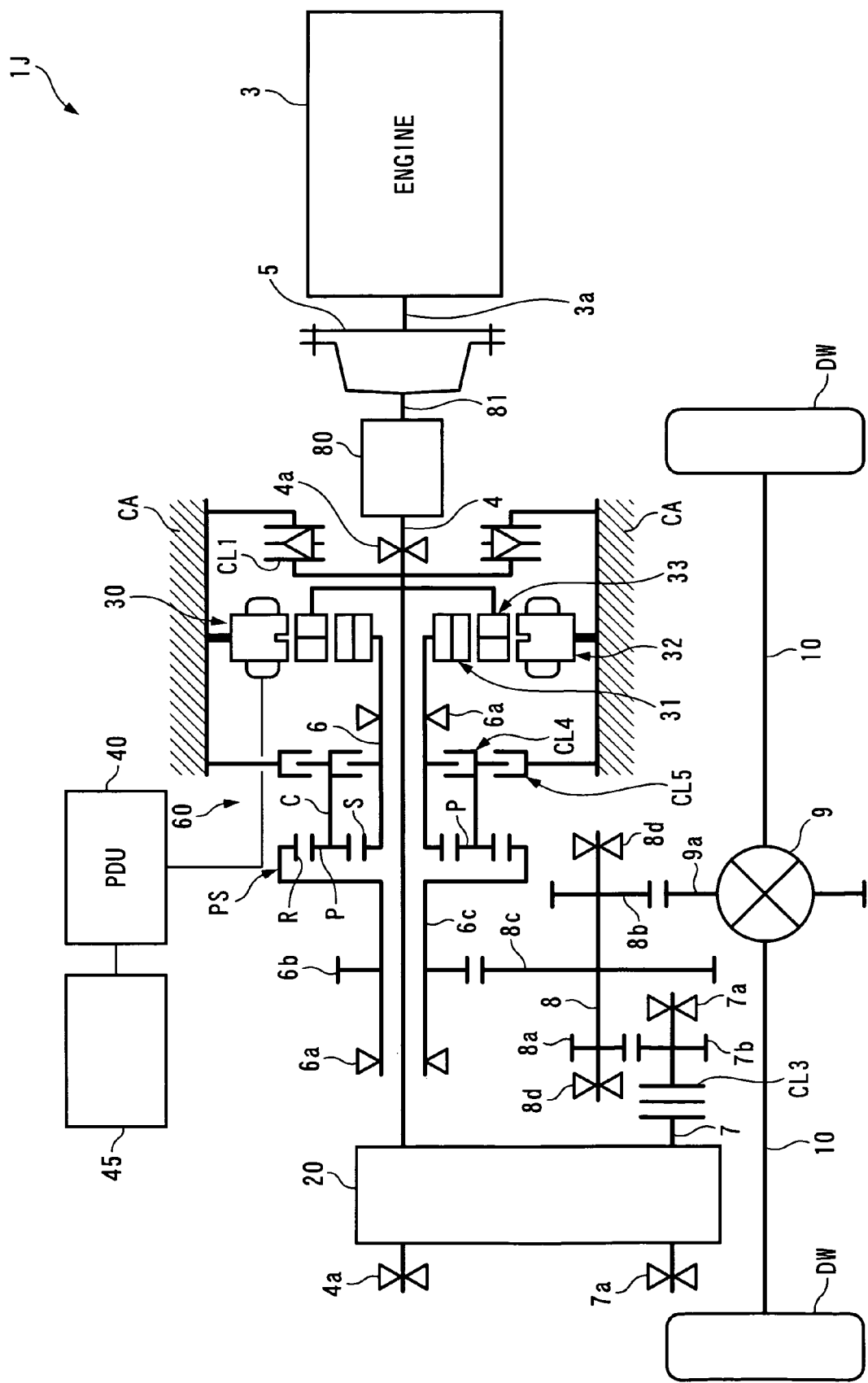
[FIG. 53] A schematic diagram of a power plant according to an eleventh embodiment.

Next, a power plant 1J according to an eleventh embodiment of the present invention will be described with reference to FIG. 53. As shown in the figure, this power plant 1J is formed by combining the power plant 1H according to the ninth embodiment and the transmission 80 in the fourth embodiment, and has the gear ratio between the gear 9*a* of the differential gear mechanism 9 and the second idler gear 8*b* set similarly to the fourth embodiment. In the power plant 1J, the operation already described as to the ninth embodiment is performed in the same manner, and the transmission 80 (third transmission) is controlled in the same manner as in the fourth embodiment.

Therefore, according to the present embodiment, it is possible to mainly obtain the same effects as obtained by both the fourth and ninth embodiments. It should be noted that in the present embodiment, the crankshaft 3*a* is connected to the first rotor 31 via the transmission 80, which makes it impossible to obtain the effects of enhancing the driving efficiency of the engine 3 by preventing power transmission loss in the transmission, which is obtained by the ninth embodiment.

Figure 54:
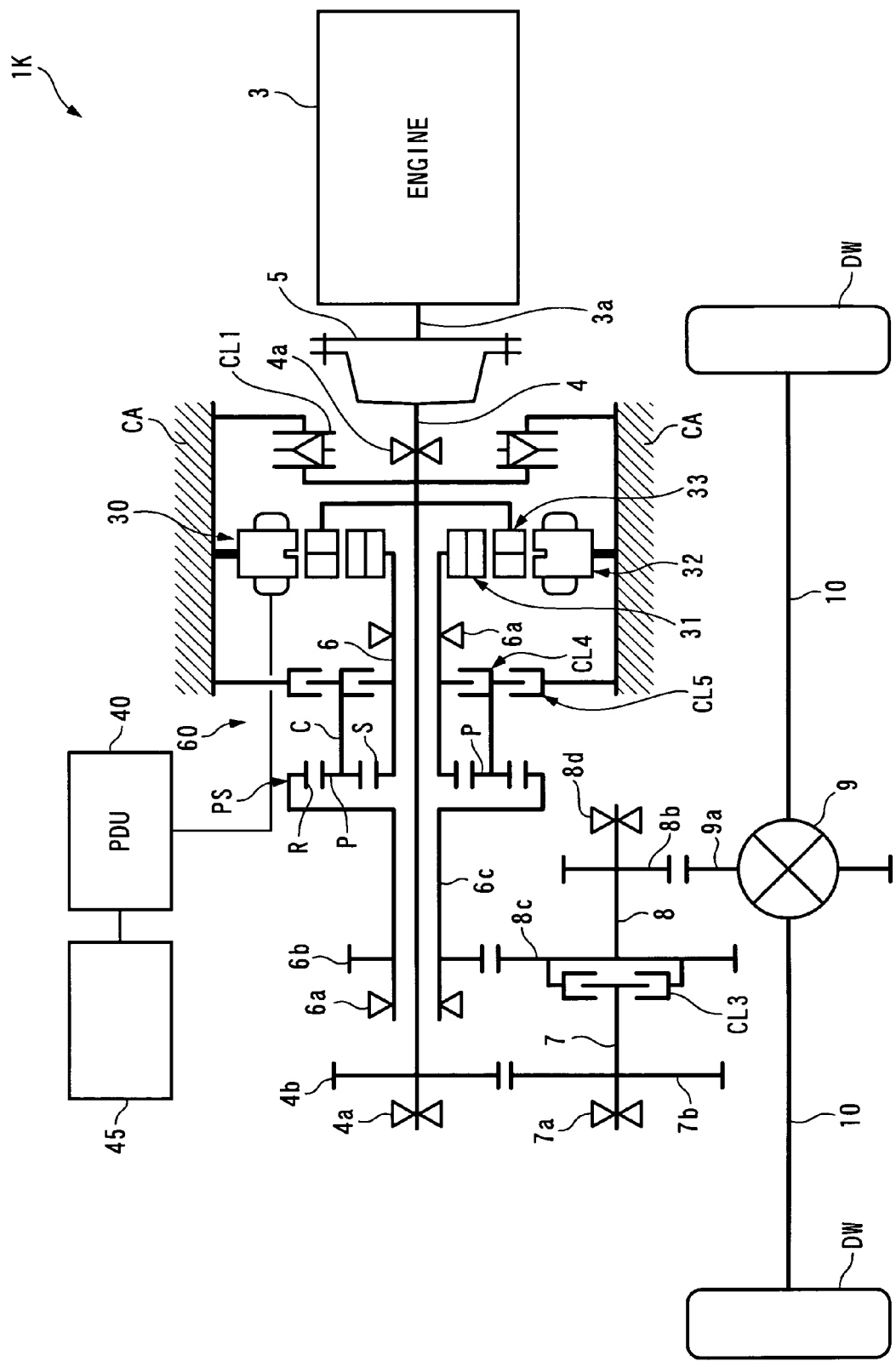
[FIG. 54] A schematic diagram of a power plant according to a twelfth embodiment.

Next, a power plant 1K according to a twelfth embodiment of the present invention will be described with reference to FIG. 54. As shown in the figure, this power plant 1K is distinguished from the power plant 1D according to the fifth embodiment only in that the connection relationships between the respective first and second rotors 31 and 33 and the engine 3 are reverse to each other. The second rotor 33 is integrally concentrically fitted on the first main shaft 4, and the first rotor 31 is integrally concentrically fitted on the second main shaft 6. In other words, the power plant 1K is distinguished from the power plant 1G according to the ninth embodiment in that the stepless transmission 20 is omitted.

With this arrangement, when the clutch CL3 is engaged, the crankshaft 3*a* and the second rotor 33 are mechanically connected to the drive wheels DW and DW via the first power transmission path in the fifth embodiment, including the first main shaft 4 and the gear 4*b*, without via the transmission. Further, the first rotor 31 is mechanically connected to the drive wheels DW and DW via the second power transmission path in the second embodiment, including the second main shaft 6 and the planetary gear unit PS.

In the power plant 1K, the aforementioned EV creep operation, EV standing start, ENG start during EV traveling, ENG start during stoppage of the vehicle, ENG creep operation, ENG-driven standing start, and switching of the forward travel and reverse travel of the vehicle using the normal/reverse rotation-switching mechanism 60 are performed in the same manner as in the eighth and ninth embodiments, and only operation during the operation of the engine 3 and at the same time during traveling of the vehicle, and operation during decelerating traveling of the vehicle are different from the eighth and ninth embodiments. Hereinafter, a description will be given of the different operations.

First, a description will be given of the operation during the operation of the engine 3 and at the same time during traveling of the vehicle. After the above-mentioned ENG-driven standing start, the speed of the power transmitted from the engine 3 to the drive wheels DW and DW during disengagement of the clutch CL3 is steplessly changed by controlling the magnetic field rotational speed VMF. That is, similarly to the fifth embodiment, the generator-motor 30 functions as a stepless transmission. Hereafter, this point will be described with reference to FIGS. 55 and 56.

As is apparent from the above-described connecting relationship, the second rotor rotational speed VR2 is equal to the engine speed NE, and the first rotor rotational speed VR1 is equal to the vehicle speed VP if there is no change in speed by the differential gear mechanism 9. Therefore, the relationship between the magnetic field rotational speed VMF, the first and second rotor rotational speeds VR1 and VR2, the engine speed NE, and the vehicle speed VP is represented in single speed diagrams, as shown in FIGS. 55 and 56.

Figure 55:
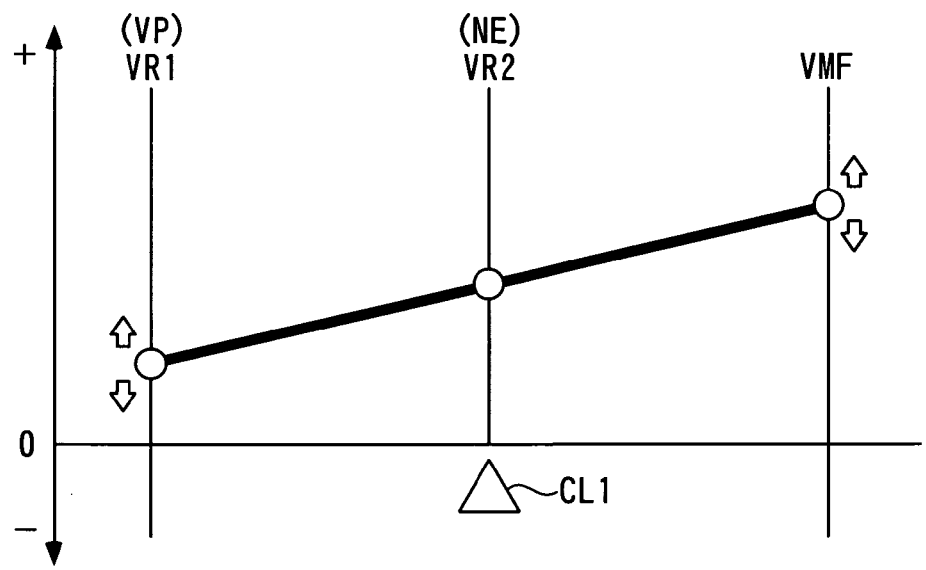
[FIG. 55] A diagram which is useful in explaining a speed-changing operation performed when the first and second rotating magnetic fields in the FIG. 54 power plant rotate in the same direction as the direction of rotation of the second rotor.
Figure 56:
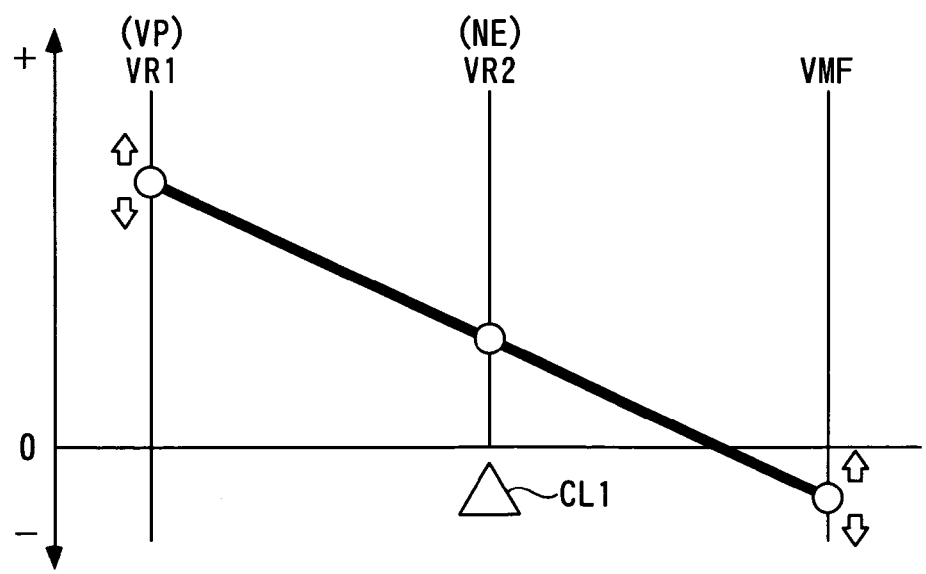
[FIG. 56] A diagram which is useful in explaining a speed-changing operation performed when the first and second rotating magnetic fields in the FIG. 54 power plant rotate in the direction reverse to the direction of rotation of the second rotor.

Referring to FIG. 55, when the first and second rotating magnetic fields rotate in the same direction as the direction of rotation of the second rotor 33, as is clear from hollow arrows shown in the figure, the speed of the power transmitted to the drive wheels DW and DW is steplessly reduced by increasing the magnetic field rotational speed VMF, and is steplessly increased by reducing the magnetic field rotational speed VMF. It should be noted that in this case, electric power generation is performed by the generator-motor 30, and the battery 45 is charged with the generated electric power. Further, as shown in FIG. 56, when the first and second rotating magnetic fields rotate in a direction reverse to the direction of rotation of the second rotor 33, as is clear from hollow arrows shown in the figure, the speed of the power transmitted to the drive wheels DW and DW is steplessly increased by increasing the magnetic field rotational speed VMF, and is steplessly decreased by reducing the magnetic field rotational speed VMF. It should be noted that in this case, electric power is supplied from the battery 45 to the generator-motor 30.

Further, after the ENG-driven standing start, the clutch CL3 in a disengaged state is engaged when the vehicle speed VP becomes equal to a predetermined vehicle speed for traveling at a constant speed, and at the same time the rotational speed of the input shaft of the clutch CL3 and that of the output shaft thereof become equal to each other. The predetermined vehicle speed is set to the lowest vehicle speed that makes it possible to cause the vehicle to travel without causing engine stall when the crankshaft 3a is connected to the drive wheels DW and DW via the first power transmission path by engaging the clutch CL3. The predetermined vehicle speed is set to a smaller value as maximum torque generated by the engine 3 is larger.

Further, when the clutch CL3 is engaged as described above, similarly to the fifth embodiment, the engine speed NE is controlled to thereby control the rotational speeds of the input shaft and output shaft of the clutch CL3 such that they become equal to each other.

Furthermore, during traveling of the vehicle which uses the power from the engine 3 in the engaged state of the clutch CL3, similarly to the fifth embodiment, the throttle valve opening of the engine 3 is controlled such that optimum fuel economy of the engine 3 can be obtained by the engine speed NE unconditionally determined by the vehicle speed VP. In the state of the clutch CL3 being engaged, the engine 3 is approximately directly connected to the drive wheels DW and DW, and hence very high driving efficiency can be obtained.

Further, similarly to the fifth embodiment, when torque transmitted from the engine 3 to the drive wheels DW and DW by the above-described control of the throttle valve opening is insufficient for the demanded torque PMCMD, electric power is supplied to the generator-motor 30 for assisting the engine 3 by the generator-motor 30 such that the insufficient amount is made up for. On the other hand, when torque transmitted from the engine 3 to the drive wheels DW and DW is surplus with respect to the demanded torque PMCMD, the surplus amount is used to perform electric power generation by the generator-motor 30, and the battery 45 is charged with the generated electric power. Such control of the generator-motor 30 makes it possible to expand an operating region where the optimum fuel economy of the engine 3 can be obtained in the engaged state of the clutch CL3, as described above. It should be noted that above-described assist and electric power generation by the generator-motor 30 is performed depending on the remaining charge SOC, similarly to the fifth embodiment.

Furthermore, to rapidly accelerate the vehicle in response to a very large demanded torque PMCMD, the engine speed NE is rapidly increased by disengaging the clutch CL3 and controlling the throttle valve opening etc., whereby the engine torque TENG is rapidly increased. This disengagement of the clutch CL3 interrupts the mechanical connection between the engine 3 and the drive wheels DW and DW via the gears and the like, whereby it is possible to increase the engine speed NE irrespective of the vehicle speed VP at the time. This makes it possible to rapidly increase the engine torque TENG. Further, in this case, when the magnetic field rotation direction determined by the speed relationship between the first and second rotors 31 and 33 is identical to the direction of the rotation of the second rotor 33, i.e. the crankshaft 3a (see FIG. 55), the stator 32 is caused to generate electric power, whereas when the magnetic field rotation direction is reverse to the direction of the rotation of the second rotor 33 (see FIG. 56), the stator 32 is supplied with electric power. Furthermore, in the former case, the power-generating equivalent torque TGE is controlled such that it becomes equal to a half of the engine torque TEMG, and in the latter case, the driving equivalent torque TSE is controlled such that it becomes equal to a half of the engine torque TEMG, whereby as is clear from the above-described function of the generator-motor 30, torque half as large as the rapidly increased engine torque TEMG is transmitted to the first rotor 31 via the second rotor 33, and further to the drive wheels DW and DW to thereby rapidly accelerate the vehicle.

Further, during decelerating traveling of the vehicle, the deceleration-time electric power generation is performed in the same manner as in the eighth embodiment.

As described heretofore, according to the present embodiment, since the engine 3 and the generator-motor 30 are connected to the drive wheels DW and DW without using the transmission, it is possible to avoid power transmission loss in the transmission, thereby making it possible to enhance the driving efficiency of the drive wheels DW and DW by the engine 3 and the generator-motor 30, and the electric power-generating efficiency of the generator-motor 30. Further, the stepless transmission 20 in the ninth embodiment is omitted, and hence it is possible to attain the reduction of the size and costs of the power plant 1K by the size and costs of the omitted stepless transmission 20. Further, during disengagement of the clutch CL3 after the ENG-driven standing start, the power from the engine 3 can be transmitted to the power to the drive wheels DW and DW while steplessly changing the speed thereof, as described hereinabove with reference to FIGS. 55 and 56. It should be noted that in the present embodiment, the stepless transmission 20 is not provided, and hence it is impossible to obtain the effect of enhancing the driving efficiency of the whole power plant 1K by controlling the transmission ratio RATIO, but it is possible to obtain the advantageous effects obtained by the ninth embodiments, except the above-mentioned effect.

Figure 57:
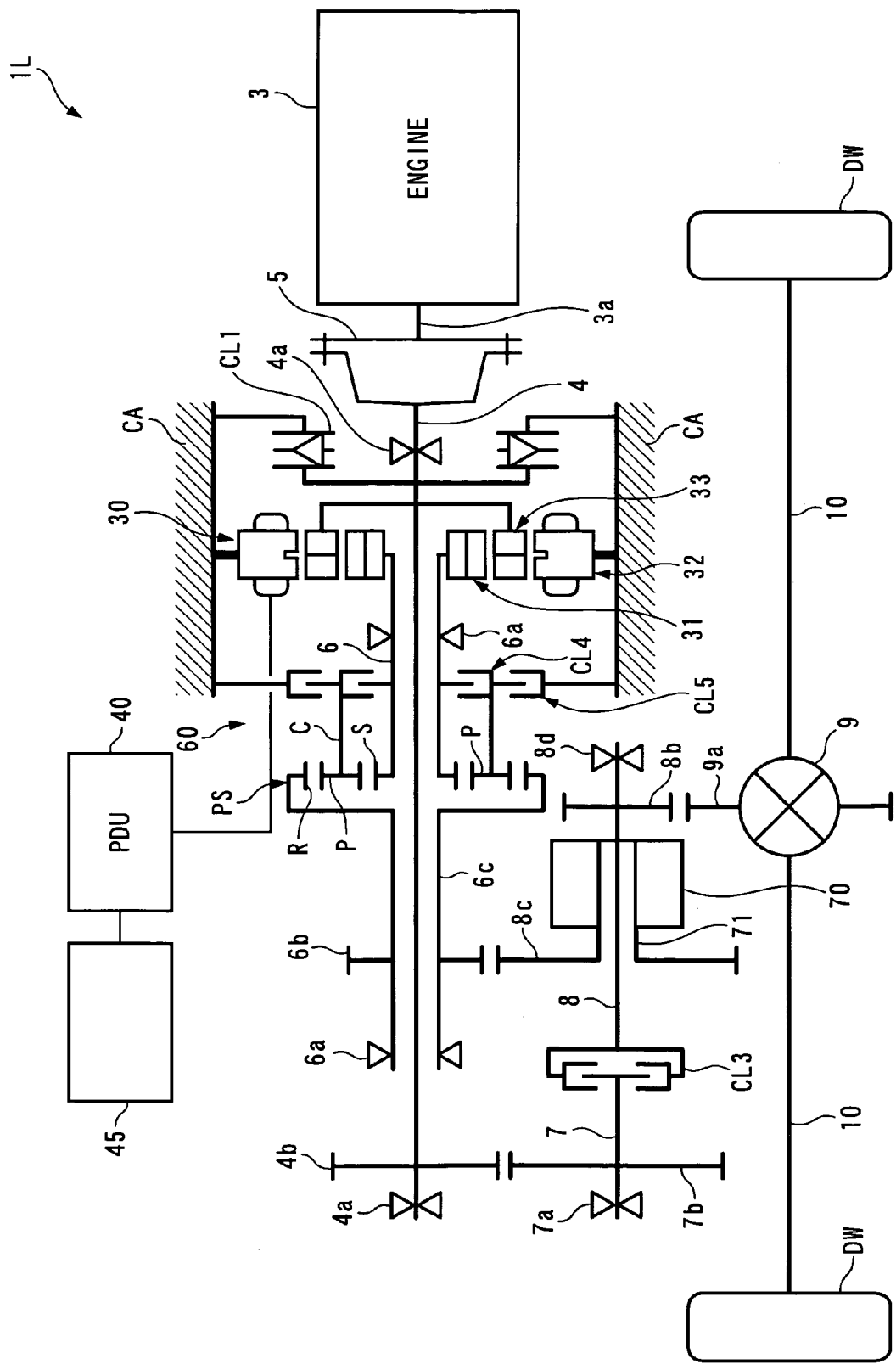
[FIG. 57] A schematic diagram of a power plant according to a thirteenth embodiment.

Next, a power plant 1L according to a thirteenth embodiment of the present invention will be described with reference to FIG. 57. As shown in the figure, this power plant 1L is formed by combining the above-described power plant 1K according to the twelfth embodiment and the above-described transmission 70. In the power plant 1L, the operation already described as to the twelfth embodiment is performed in the same manner, and the transmission 70 (first transmission) is controlled in the same manner as in the third embodiment.

Therefore, according to the present embodiment, it is possible to obtain the same effects as obtained by both the third and twelfth embodiments, mainly, for example, in that it is possible to reduce the size and costs of the generator-motor 30. It should be noted that in the present embodiment, the first rotor 31 is connected to the drive wheels DW and DW via the transmission 70, and hence it is impossible to obtain the effect of enhancing the driving efficiencies of the engine 3 and the generator-motor 30 by preventing power transmission loss in the transmission, which is provided by the twelfth embodiment.

Figure 58:
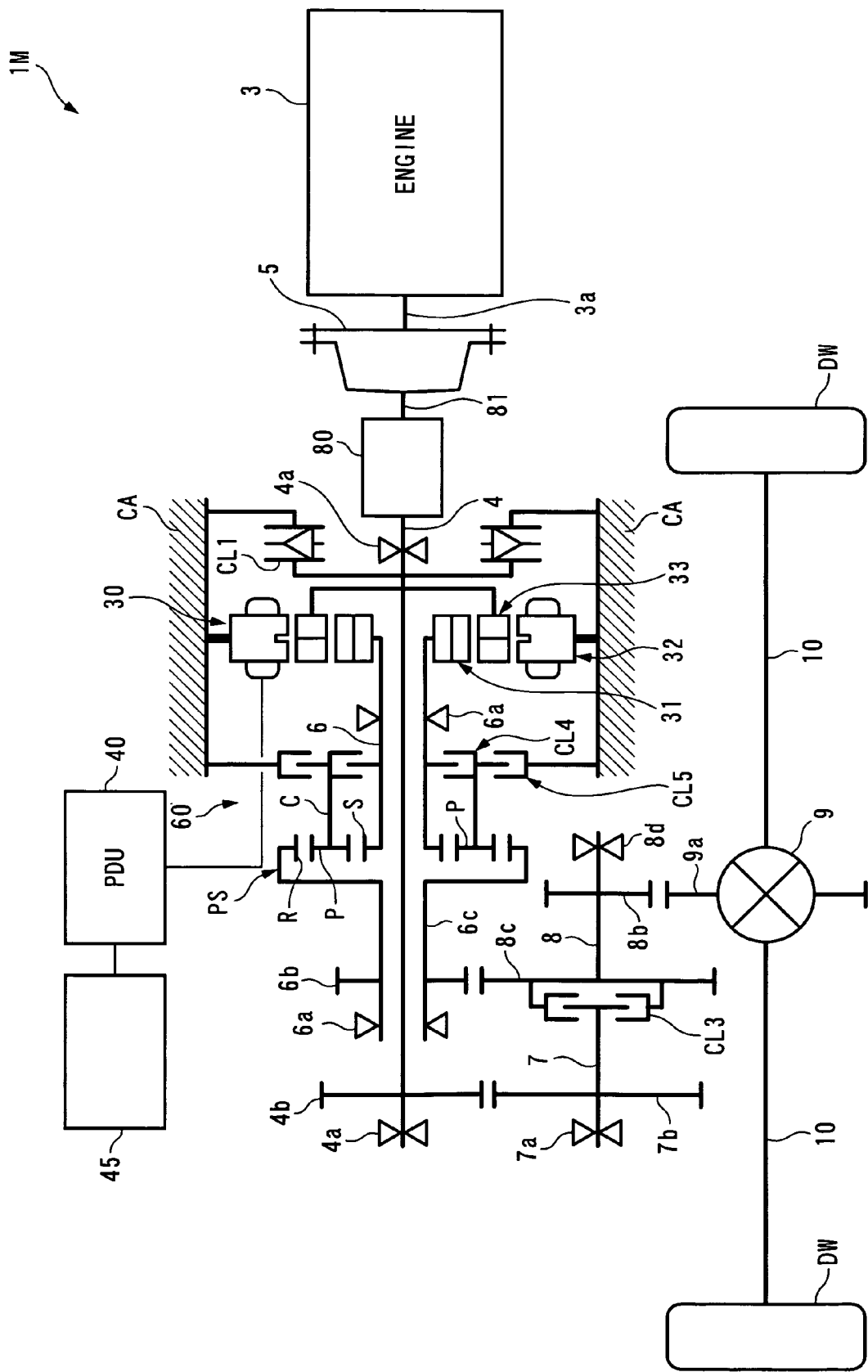
[FIG. 58] A schematic diagram of a power plant according to a fourteenth embodiment.

Next, a power plant 1M according to a fourteenth embodiment of the present invention will be described with reference to FIG. 58. As shown in the figure, this power plant 1M is formed by combining the power plant 1K according to the above-described twelfth embodiment and the above-described transmission 80. In the power plant 1M, the operation already described as to the twelfth embodiment is performed in the same manner, and the transmission 80 (second transmission) is controlled in the same manner as in the fourth embodiment.

Therefore, according to the present embodiment, it is possible to obtain the same effects as obtained by both the fourth and twelfth embodiments, mainly, for example in that it is possible to prevent failure of the generator-motor 30 due to the second rotor rotational speed VR2 becoming too high. It should be noted that in the present embodiment, the crankshaft 3a is connected to the second rotor 33 via the transmission 80, and hence it is impossible to obtain the effect of enhancing the driving efficiency of the engine 3 by preventing power transmission loss in the transmission, which is obtained by the twelfth embodiment.

It should be noted that the present invention is by no means limited to the embodiments described above, but can be practiced in various forms. For example, although in the embodiments, the stepless transmission 20 is used as the first transmission, it is to be understood that a step-type transmission may be used. Further, although in the embodiments, the belt-type stepless transmission is used as the stepless transmission 20, a toroidal-type or a hydraulic-type stepless transmission may be employed. Furthermore, although in the present embodiments, the clutch CL3 is disposed between the stepless transmission 20 and the drive wheels DW and DW, it may be disposed between the stepless transmission 20 of the first main shaft 4 and the first rotor 31. In this case, at the ENG start during EV traveling described hereinabove with reference to FIG. 15, before the clutch LC3 is engaged, differently from the present embodiments, the power from the generator-motor 30 is transmitted to both pulleys 21 and 22 of the stepless transmission 20 to cause rotation of the pulleys 21 and 22, and hence the transmission ratio RATIO can be controlled to a desired value while preventing the contact surfaces of the pulleys 21 and 22 and the transmission belt 23 from being damaged. In addition, at the ENG start during stoppage of the vehicle which is described hereinabove with reference to FIG. 24, the engine 3 can be started without dragging the stepless transmission 20.

Further, although in the present embodiments, the friction multi-disc clutch is used as the clutch CL3, an electromagnetic clutch may be employed. Furthermore, in place of the one-way clutch CL1 and the casing CA according to the present embodiments, it is possible to use a brake mechanism formed e.g. by a hand brake or a wet multi-disc clutch, which prevents the reverse rotation of the crankshaft 3a. Further, in place of the electromagnetic brake CL2 according to the present embodiment, it is possible to use a rotor lock mechanism formed e.g. by a hand brake or a wet multi-disc clutch, which holds the second or first rotor 33 or 31 unrotatable.

Further, in the present embodiments, in place of the one-way clutch CL1, a lock mechanism formed e.g. by an electromagnetic brake or a hand brake may be used for holding the first or second rotor 31 or 33 unrotatable. In this case, as in the first embodiment, when the first rotor 31 is held unrotatable, it is possible to cause the reverse rotations of the drive wheels DW and DW to cause the reverse travel of the vehicle, by causing the first and second rotating magnetic fields to rotate in a direction reverse to the direction of rotation of the crankshaft 3a during the above-described EV traveling. Further, as in the eighth embodiment and the like, when the second rotor 33 is held unrotatable, it is possible to cause the reverse rotations of the drive wheels DW and DW to cause the reverse travel of the vehicle, by causing the first and second rotating magnetic fields to rotate in the same direction as the direction of rotation of the crankshaft 3a during the above-described EV traveling.

Furthermore, although in the present embodiments, the transmission 70 is formed by the belt-type stepless transmission, the transmission 70 may be formed by a toroidal-type or a hydraulic-type stepless transmission or a step-type transmission. Further, although in the present embodiments, the transmission 80 has two speed positions, by way of example, this is not limitative, but it is to be understood that the transmission 80 may have any other suitable number of speed positions. This also applies to the transmission ratios of the speed positions. Furthermore, it is to be understood that a belt-type, a toroidal-type, or a hydraulic-type stepless transmission may be used as the transmission 80.

Further, although in the present embodiments, the combination of the planetary gear unit PS and the clutch CL4 is used as the normal/reverse rotation-switching mechanism 60, it is to be understood that any other suitable type of normal/reverse rotation-switching mechanism may be used insofar as it is capable of selectively switching the direction of rotation of the drive wheels DW and DW to one of the direction of the normal rotation and the direction of the reverse rotation. Furthermore, although in the present embodiment, the sun gear S and the ring gear R of the normal/reverse rotation-switching mechanism 60 are connected to the second main shaft 6 and the third main shaft 6c, respectively, these connection relationships may be reversed. That is, the sun gear S and the ring gear R may be connected to the third main shaft 6c and the second main shaft 6, respectively. Further, it is to be understood that the normal/reverse rotation-switching mechanism 60 may be omitted, as required. In this case, the electromagnetic brake CL2 is used as the rotor lock mechanism in the present embodiments for holding the other rotor unrotatable.

Furthermore, although in the present embodiment, the first and second cores 33a and 33b are made of steel plates, they may be made of any other suitable soft magnetic materials. Further, although in the present embodiment, a control system for controlling the engine 3 and the generator-motor 30 is implemented by the ECU 2 and the PDU 40, this is not limitative, but it may be implemented by a combination of a microcomputer and an electric circuit. Moreover, although the present embodiment is an example of application thereof to an vehicle, this is not limitative, but it is applicable to tanks, boats, aircrafts, and so forth. It is to be further understood that various changes and modifications may be made without departing from the spirit and scope thereof.

INDUSTRIAL APPLICABILITY

As described hereinabove, the power plant according to the present invention is useful in enhancing the driving efficiency and electric power-generating efficiency thereof.

We claim:

1. A power plant for driving a driven part, comprising:
   an internal combustion engine having an output shaft, said output shaft being connected to the driven part;
   a first transmission connected between said output shaft of said engine and the driven part, for changing speed of power from said engine and transmitting the power to the driven part; and
   a generator-motor including an immovable stator for generating a rotating magnetic field, a first rotor provided in a manner opposed to said stator and formed of a magnet, and a second rotor disposed between said stator and said first rotor and formed of a soft magnetic material, for inputting and outputting energy between said stator and said first rotor and said second rotor via a magnetic circuit formed according to generation of the rotating magnetic field, the rotating magnetic field and said first and second rotors rotating along with the input and output of the energy while holding such a linear speed relationship in which a difference between a rotational speed of the rotating magnetic field and a rotational speed of said second rotor, and a difference between a rotational speed of said second rotor and a rotational speed of said first rotor become equal to each other,
   wherein one of said first and second rotors of said generator-motor is connected between said output shaft of said engine and said first transmission, and the other thereof is connected to the driven part.

2. A power plant as claimed in claim 1, wherein said first transmission is formed by a stepless transmission that is capable of steplessly changing a transmission ratio.

3. A power plant as claimed in claim 1, further comprising a second transmission connected between the other of said first and second rotors and the driven part, for changing speed of power from the other and transmitting the power to the driven part.

4. A power plant as claimed in claim 1, further comprising a first clutch for connecting and disconnecting between the one of said first and second rotors and the driven part.

5. A power plant as claimed in claim 4, further comprising a brake mechanism for limiting or inhibiting rotation of the one of said first and second rotors such that said output shaft of said engine does not rotate in a reverse direction.

6. A power plant as claimed in claim 4, further comprising a rotor lock mechanism for holding the other of said first and second rotors unrotatable.

7. A power plant as claimed in claim 4, further comprising a normal/reverse rotation-switching mechanism connected between the other of said first and second rotors and the driven part, for selectively switching a direction of rotation of the driven part rotated by power transmitted from the other to one of a direction of normal rotation and a direction of reverse rotation.

8. A power plant as claimed in claim 7, wherein said normal/reverse rotation-switching mechanism comprises:
   a planetary gear unit including a sun gear, a ring gear, and a carrier for rotatably supporting planetary gears in mesh with said sun gear and said ring gear, one of said sun gear and said ring gear being connected to the other of said first and second rotors, and the other of said sun gear and said ring gear being connected to the driven part;
   a second clutch for connecting and disconnecting between the one of said sun gear and said ring gear and said carrier; and
   a carrier lock mechanism for holding said carrier unrotatable.

9. A power plant as claimed in claim 1, wherein said first rotor is connected between said output shaft of said engine and said first transmission, and said second rotor is connected to the driven part.

* * * * *